United States Patent [19]
Endo et al.

[11] Patent Number: 6,073,126
[45] Date of Patent: Jun. 6, 2000

[54] MULTI-COMPUTER SYSTEM CAPABLE OF ABSTRACTLY AND INTEGRALLY DESCRIBING SYSTEM CONFIGURATION AND CONTROL CONTENTS

[75] Inventors: Kotaro Endo; Shinichiro Suzuki; Katsufumi Fujimoto; Akitomo Yamada, all of Tokyo; Ryoya Mori, Shiki, all of Japan

[73] Assignee: Kabushiki Kaisha Toshiba, Kawasaki, Japan

[21] Appl. No.: 08/943,764

[22] Filed: Oct. 3, 1997

[30] Foreign Application Priority Data

Oct. 4, 1996 [JP] Japan .................................. 8-264495

[51] Int. Cl.[7] .................................................. G06F 17/00
[52] U.S. Cl. .............................. 706/45; 706/46; 706/52
[58] Field of Search ..................................... 395/704, 705, 395/710; 706/45, 46, 47, 48, 49, 50, 55, 59, 60, 52

[56] References Cited

U.S. PATENT DOCUMENTS

| | | | |
|---|---|---|---|
| 4,837,735 | 6/1989 | Allen, Jr. et al. | 706/10 |
| 4,982,340 | 1/1991 | Oyanagi et al. | 706/55 |
| 5,339,392 | 8/1994 | Risberg et al. | 345/333 |
| 5,428,525 | 6/1995 | Cappelaere et al. | 364/148.04 |
| 5,500,802 | 3/1996 | Morris et al. | 700/182 |
| 5,802,253 | 9/1998 | Gross et al. | 76/45 |
| 5,812,850 | 9/1998 | Wimble | 395/704 |

OTHER PUBLICATIONS

Johansson et al "Scenario based performance analysi of routing protocols for mobil ad hoc networks", Mobicom ACM pp 195–206, Sep. 1999.

Fox et al. "The erole of database in knowledge base system", Database Technologies, pp 407–430, 1986.

Moore et al., "Characterzing the error funcation of neural network", IEEE pp 49–57, 1988.

Groendijk et al., Case recognition and startegy classification:, ACM, pp 125–132, Sep. 1993.

Palaniappan et al., "The envoy framework: an open architecture for agents", ACM Trns on Inf, Sys., vol. 10, No. 3, pp. 233–264, Jul. 1992.

Madisetti et al., "Synchronization mechanism for distributed event driven computation", ACM Tran. on Modeling and Computer Simul, vol 2, No. 1, pp 12–51, Jan. 1992.

*Primary Examiner*—Tariq R. Hafiz
*Assistant Examiner*—Anil Khatri
*Attorney, Agent, or Firm*—Oblon, Spivak, McClelland, Maier & Neustadt, P.C.

[57] ABSTRACT

An HA (High Availability) scenario compiler is arranged in one of a group of computers constituting a multi-computer system, or a computer independent of the system. An HA scenerio abstractly and integrally describing the configuration and control contents of the system is read and decomposed into separate processes for the respective computers. An HA script set in a form directly executable by the respective computers is generated from the HA scenario. HA script for each one of the computers are respectively distributed to specific directories of the computers by an HA script distribution mechanism.

9 Claims, 38 Drawing Sheets

FIG. 5A
```
server cpu1 { name= "A" }
server cpu2 { name= "B" }
```

FIG. 5B
```
server cpu1 { name= "C" }
server cpu2 { name= "D" }
```

SERVICE DESCRIPTION 113

```

# SERVICE EVENT DESCRIPTION
# DEFINE FOUR LEAVE HA EVENTS

syncevent Out1 = ( "LEAVE" , cpu1 )
syncevent Out2 = ( "LEAVE" , cpu2 )
syncevent Out3 = ( "LEAVE" , cpu3 )
syncevent Out4 = ( "LEAVE" , cpu4 )
        ⋮

# SERVICE DESCRIPTION
# SHARING FOR COMPUTERS "cpu1" THROUGH "cpu4" AND HA EVENTS
    "Out1" THROUGH "Out4"

syncacion ( cpu1 | cpu2 | cpu3 | cpu4,  Out1 | Out2 | Out3 | Out4 ) {
        #
        # localcpu: INDICATE INTRA NODE OF "cpu1" THROUGH "cpu4"
        # event.cpu: INDICATE SECOND FIELDS OF "Out1"
            THROUGH "Out4"
        #
        if ( localcpu=event.cpu ) {
                # PROCESS OF SERVER TO BE LEFT
        }
        else {
                # PROCESS OF SERVER NOT TO BE LEFT
        }
            ⋮
```

FIG. 6

```
server cpu1 { name = "A" }
server cpu2 { name = "B" }
server cpu3 { name = "C" }
server cpu4 { name = "D" }
        ⋮ service program1 {
        master = cpu1
        slave = cpu4
        ⋮
        ---------- (1) ----------
        ⋮      ⎣ 804_1
                                    ⎫
                                    ⎬ 801 SERVICE DESCRIPTION
                                    ⎭
} service program2 {
        master = cpu2
        slave = cpu4
        ⋮
        ---------- (2) ----------
        ⋮      ⎣ 804_2
                                    ⎫
                                    ⎬ 802 SERVICE DESCRIPTION
                                    ⎭
} service program3 {
        master = cpu3
        slave = cpu4
        ⋮
        ---------- (3) ----------
        ⋮      ⎣ 804_3
                                    ⎫
                                    ⎬ 803 SERVICE DESCRIPTION
                                    ⎭
}
```

FIG. 8

900A~900C···COMPUTER
901,903,904,906~908···HA EVENT
902···HA GROUP
905···FAULT
960A~960C···HA SCRIP EXECUTION MECHANISM

900A~900C···COMPUTER
901,903,904,906~908···HA EVENT
902···HA GROUP
905···FAULT
960A~960C···HA SCRIP EXECUTION MECHANISM

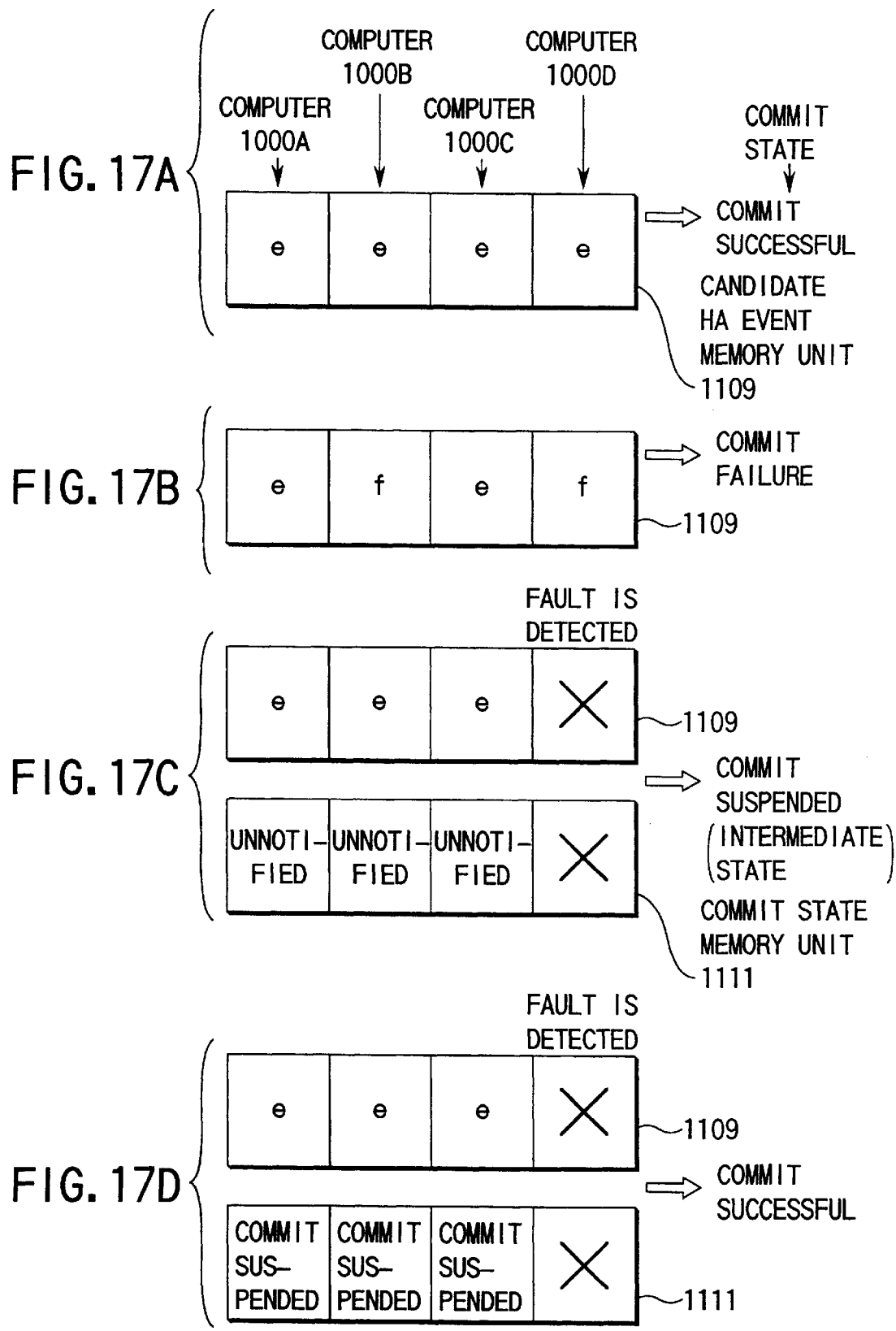
e, f : CANDIDATE HA EVENT

HA STATE TABLE UPDATE DESCRIPTION 1900

```
# # outcpu=FAULTY COMPUTER
# #
get s = state ( outcpu ) ~1901
foreach host ( cpu1 cpu2 cpu3 cpu4 ) {
  get t = state (host) ~1902
  if ( s == "EXECUTION IN PROGRESS" ) {
    if ( t == "EXECUTION IN PROGRESS" ) { put state ( host ) = "FAULT DETECTION" }
    if ( t == "PRIORITY LEVEL 1" ) { put state ( host ) = "EXECUTION IN PROGRESS" }  ⎫
    if ( t == "PRIORITY LEVEL 2" ) { put state ( host ) = "PRIORITY LEVEL 1" }       ⎬ 1911
    if ( t == "PRIORITY LEVEL 3" ) { put state ( host ) = "PRIORITY LEVEL 2" }       ⎪
    if ( t == "PRIORITY LEVEL 4" ) { put state ( host ) = "PRIORITY LEVEL 3" }       ⎭
  }
  if ( s == "PRIORITY LEVEL 1" ) {
    if ( t == "PRIORITY LEVEL 1" ) { put state ( host ) = "FAULT DETECTION" }        ⎫
    if ( t == "PRIORITY LEVEL 2" ) { put state ( host ) = "PRIORITY LEVEL 1" }       ⎬ 1912
    if ( t == "PRIORITY LEVEL 3" ) { put state ( host ) = "PRIORITY LEVEL 2" }       ⎪
    if ( t == "PRIORITY LEVEL 4" ) { put state ( host ) = "PRIORITY LEVEL 3" }       ⎭
  }
  .......
  if ( s == "PRIORITY LEVEL 4" ) {
    if ( t == "PRIORITY LEVEL 4" ) { put state ( host ) = "FAULT DETECTION" }        ⎬ 1915
  }
}
```

FIG. 19

```
syncaction ( cpu1 | cpu2 | cpu3 | cpu4, TakeOver1 | TakeOver2 | TakeOver3 | TakeOver4 ) {
    set outcpu = event.cpu
    get s = state ( event.cpu ) ~2001
    if ( s == "EXECUTION IN PROGRESS" ) {
        get t = state ( localcpu ) ~2003
        if ( t == "PRIORITY LEVEL 1" ) {
            ##
            ## START APPLICATION PROGRAM       ~2002
            ##
        }
    }
    return
}
```

SERVICE DESCRIPTION 2000

FIG.20

2510···SWITCH-OVER HA EVENT

2511···HA SCRIPT FOR SWITCH-OVER

2521···PSEUDO HA EVENT OF STOP REQUEST FOR APPLICATION IN COMPUTER 2500A

2522···PSEUDO HA EVENT OF START REQUEST FOR APPLICATION IN COMPUTER 2500B

2531···HA SCRIPT FOR STOP REQUEST FOR APPLICATION IN COMPUTER 2500A

2532···HA SCRIPT FOR START REQUEST FOR APPLICATION IN COMPUTER 2500B

2610···HA EVENT OF FAULT DETECTION IN COMPUTER 2600A
2611···HA SCRIPT FOR FAULT DETECTION IN COMPUTER 2600A
2613···ERROR RECOVERY HA SCRIPT FOR FAULT DETECTION IN COMPUTER 2600A
2614···PSEUDO HA EVENT OF TAKE-OVER BY COMPUTER 2600C
2615···HA SCRIPT FOR TAKE-OVER BY COMPUTER 2600C

2617···ERROR RECOVERY HA SCRIPT FOR TAKE-OVER BY COMPUTER 2600C

2618···PSEUDO HA EVENT OF TAKE-OVER BY COMPUTER 2600D

2619···HA SCRIPT FOR TAKE-OVER BY COMPUTER 2600D

2621···ERROR RECOVERY HA SCRIPT FOR TAKE-OVER BY COMPUTER 2600D

```
get s = state( event.cpu )  ~3601
if ( s == "EXECUTION IN PROGRESS" ) {
#SINCE CONTENTS OF STATE TABLES OF ALL COMPUTERS ARE SAME,
#THIS CONDITION IS SIMULTANEOUSLY SATISFIED IN ALL COMPUTERS
            var t
            get t = state ( localserver )
            if ( t == "PRIORITY LEVEL1" ) {
#OWING TO INTERLOCK IN WHICH ONLY ONE COMPUTER HAS
  "PRIORITY LEVEL1" ,
#THIS CONDITION IS NOT SIMULTANEOUSLY SATISFIED IN TWO
  COMPUTERS
                fcall mktkdisk ( vg1, "-f" , event.cpu )
            }
            ⋮
```
3602, 3603

FIG. 36

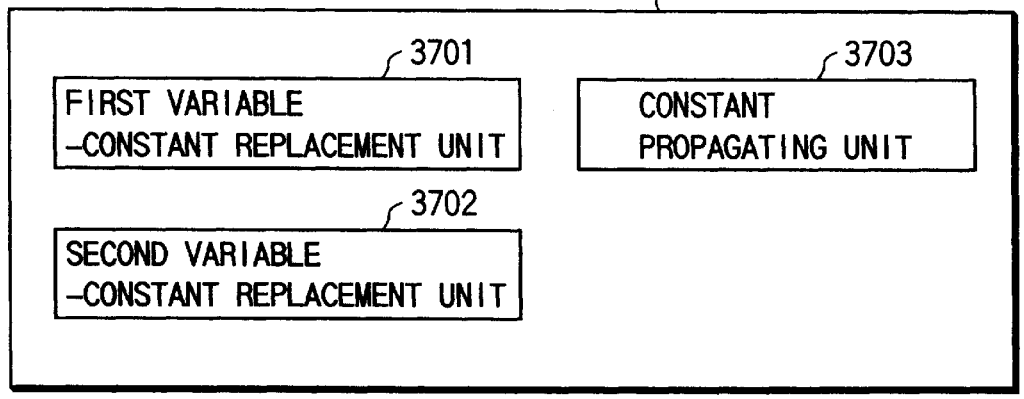

FIG. 37

```
foreach_service s {
            invoke s "In" event.cpu
}
```

FIG. 38

MULTI-COMPUTER SYSTEM CAPABLE OF ABSTRACTLY AND INTEGRALLY DESCRIBING SYSTEM CONFIGURATION AND CONTROL CONTENTS

BACKGROUND OF THE INVENTION

The present invention relates to a multi-computer system constituted by a plurality of computers and, more particularly, to a multi-computer system suitable for defining the system configuration and control contents, and performing an operation in accordance with the defined contents.

Conventionally, the definitions of the configuration and control contents of a multi-computer system constituted by a plurality of computers are generally described as an executable script (program) by the programmer directly or via a simple macro for each computer. Detailed contents of this executable script are a registration only command for the connection relationship between the respective computers, an extraction command for the state of each computer, and a command string which should be executed as an exceptional procedure upon detecting a fault in a CPU, a disk, a network, or the like. In addition to this, the exceptional procedure includes handoff of a server process to another computer, starting of a standby process, take-over of data, a file, or a network address to another computer, and the operation of a specific I/O device for an alarm output or the like.

As described above, the definitions of the configuration and control contents of the multi-computer system are conventionally described as an executable script by the programmer directly or via a simple macro for each computer.

The configuration and control contents, however, must be defined in consideration of all the situations conceivable, and the scripts are generally difficult to describe.

Script description misses such as inconsistency between the respective computers frequently occur.

If an exceptional procedure has a description miss or a mistake (semantic inconsistency), it is difficult to find. It is highly probable that such an error or an omission remain uncorrected until the system operates.

As the number of computers constituting the multi-computer system increases (to, e.g., three or more), the number of assumed fault patterns increases, so an omission easily occurs in describing a script for the procedure upon occurrence of a fault. This may lead to the worst case in which, upon occurrence of a fault, a correct process for circumventing the fault fails to abnormally stop the system.

BRIEF SUMMARY OF THE INVENTION

It is an object of the present invention to provide a multi-computer system in which the definitions of the system configuration and control contents can be easily described, description and operation errors can be eliminated, anticipation failure of conceivable faults rarely occurs and reliable operation in accordance with the defined contents is guaranteed.

The present invention is characterized in that scenario compiling means for decomposing a scenario serving as a program abstractly and integrally describing a configuration and control contents of a multi-computer system into separate processes for the respective computers, and generating process scripts serving as command strings in a form directly executable by the respective computers from the scenario is arranged, and script execution means for executing, of the separate process scripts for the respective computers which are generated by the scenario compiling means, an applicable computer process script corresponding to a computer state is arranged in each computer.

A practical example of the control contents of the multi-computer system is system operations for various events which occur in the computers.

An actual example of the abstractness of the scenario is a form in which, in descriptions defining the system configuration (e.g., computer descriptions defining the computers constituting the multi-computer system), an actual computer name (constant) is defined as a closed variable (i.e., a variable not appearing in the process script generated from the scenario), and this variable is referred to in the remaining descriptions of the scenario.

A practical example of the integration (sharing) of the scenario includes a form in which a process for a certain event that is shared by a plurality of computers is described, a form in which a process shared by a plurality of events is described, and a form in which, even when some of the computers, a certain computer, or a given event requires a special process, a shared process is described by setting a special variable indicating the self node, and a variable indicating an event portion. In addition, in another form, the descriptions of, e.g., master and slave computers in a specific unit within the scenario are defined by variables (second variables) different from variables (first variables) which are related to constants used in the process scripts and used in the scenario, and the second variables are referred to at the remaining portion within the specific unit.

Since the scenario (program) abstractly and integrally describing the configuration and control contents of the multi-computer system is applicable in this arrangement, the definitions of the system configuration and control contents can be easily described, unlike a conventional multi-computer system in which a scenario must be described as an executable script for each computer. Particularly, with the abstractness and integration (sharing) of the scenario, since separate processes for the same computer state (event) in the respective computers can be described as if they were one process, the number of process descriptions can be decreased. This effect becomes more prominent as the number of computers constituting the multi-computer system increases. In applying an arrangement in which a specific group (to be described later) serving as a computer group in which the scenario operates is set, state memory means for storing the state of each computer in the group is arranged on each computer, and operation contents upon occurrence of an event are determined from the contents of the state memory means, the state memory means is updated for the same event by the same operation of all the computers in the specific group, greatly decreasing the number of process descriptions.

The present invention is characterized in that script distribution means for distributing separate process scripts for the respective computers which are generated by the scenario compiling means to the memory areas of the corresponding computers is arranged, and the script execution means executes, of the process scripts distributed to a certain computer, a process script corresponding to a computer state (event which has occurred) in accordance with the computer state of the computer (e.g., occurrence of an event). The scenario compiling means generates separate process scripts for the respective computers, and in addition a distribution script serving as a command string for distributing each process script to a corresponding computer. If the script distribution means executes this distribution script, the process script is distributed to each computer.

In this manner, the scenario compiling means automatically generates a program (distribution script) for allowing the script distribution means to distribute the products such as the process scripts generated by the scenario compiling means to the respective computers (of the multi-computer system defined in the scenario). With this arrangement, a description error can be eliminated, unlike a case wherein the programmer describes a program of this type for each computer, and thus, a distribution operation error and inconsistency between the computers can be eliminated.

The present invention is characterized in that the script execution means comprises a mechanism for allowing setting in an initial state and resetting upon occurrence of an event for each computer as for permission or inhibition of execution of the process script, and the specific group serving as a computer group in which the scenario operates is automatically changed upon occurrence of an event.

With this arrangement, a desired computer can be removed or joined without stopping the system for maintenance or the like (for the purpose of exchange or test of the operation system).

The present invention is characterized in that the script execution means further comprises a mechanism for guaranteeing the delay of the starting of a next process script until the execution orders of process scripts for a plurality of events become all the same in the specific group, and execution of a process script for one event is complete in the specific group.

This arrangement realizes a synchronous event multi-computer system capable of correct take-over even if faults almost simultaneously occur in a plurality of computers.

The present invention is characterized in that the state memory means for storing the state of each computer in the specific group is arranged on each computer, and in executing a process script along with occurrence of an event, the script execution means on each computer in the specific group refers to the state memory means of the self node to determine operation contents upon occurrence of the event, and performs the same update process on the respective computers in accordance with the contents of the state memory means.

In this arrangement, for example, when a fault occurs in a computer of the specific group, the state of each computer in the specific group at that time can be obtained by referring to the state memory means of the self node. If the faulty computer is a computer executing a service (application program), a computer which will take over the process can be automatically determined. For this purpose, the state of the computer may contain the process take-over priority.

Further, if a plurality of specific groups which do not overlap each other are constituted, and operation contents upon occurrence of an event are changed in accordance with the contents of the state memory means of the respective specific groups which are different from each other, an independent system corresponding to the plurality of specific groups can be freely constructed though it is physically one system.

The present invention is characterized in that the script execution means further comprises a function of obtaining the process script end states about all the computers in the group upon completion of execution of a process script along with occurrence of an event in the specific group, and executing an error recovery process script in accordance with the end states.

In this arrangement, the process can be recovered from an error upon occurrence of an event.

The present invention is characterized in that the process script includes a command for generating at least one pseudo event as part of its process, when the process script is executed by the script execution means, at least one pseudo event is generated, and upon completion of execution of the process script, a process script corresponding to the generated pseudo event is executed.

In this arrangement, a plurality of process scripts can be executed upon occurrence of one event. Since at least one pseudo event is generated by executing the error recovery process script, multi-error recovery is possible.

The present invention is characterized in that the scenario compiling means comprises at least one of errata/error detection means for detecting errata/error of description contents of the scenario, and semantic confirmation means for confirming the meanings of the description contents of the scenario, and determining consistency, and comprises error output means for, when the errata/error detection means detects a description error, or the semantic confirmation means detects inconsistency, outputting an error message to that effect.

In this manner, since the errata/error confirmation function for the description contents of the scenario is applied to the scenario compiling means for generating the process scripts which give functions equivalent to the description contents from the description contents of the scenario, a description error in the scenario can be easily found. As means for realizing this errata/error confirmation function (errata/error detection means), description value incongruence detection means for detecting that a description value represented by a command argument is incongruent, or the like can be applied.

If the scenario compiling means has a function of confirming the meanings of the description contents of the scenario, or a simulation function assuming various faults which may occur, such as a device failure, a semantically inconsistent portion of the scenario can be easily found, and problems of the control algorithm which are difficult to know before execution can be recognized before execution. As means for realizing the semantic confirmation function (semantic confirmation means), at least one of endless loop detection means for detecting that events occur in an endless loop, state memory means content noncorrespondence detection means for detecting that updated operation contents for the state memory means are not the same in a specific group, interlock detection means for detecting that updated operation contents for the state memory means do not conform to conditions which predetermined contents of the state memory means should satisfy, and shared device operation inconsistency detection means for detecting that the operation contents of the respective computers with respect to a shared device for one event are inconsistent can be applied.

Particularly when the errata/error means detects an error in the description contents (when the description value incongruence detection means detects that a description value represented by a command argument is incongruent), generation of process scripts by the scenario compiling means is stopped. With this arrangement, generation of an erroneous process script which leads to an execution error of the process script can be prevented.

Similarly, when the semantic confirmation means detects a semantically inconsistent portion in the scenario, generation of process scripts by the scenario compiling means is stopped. With this arrangement, generation of process scripts having no consistency between the respective computers, which brings about take-over failure or the like upon occurrence of a fault can be prevented.

In particular, if generation of process scripts is stopped when it is detected that events occur to form an endless loop, execution stop of a series of process scripts for one event is always guaranteed. If generation of process scripts is stopped when it is detected that updated operation contents for the state memory means are not the same in a specific group, the contents of the state memory means are guaranteed to be always the same in the specific group. If generation of process scripts is stopped when it is detected that updated operation contents for the state memory means do not conform to conditions (interlock) which predetermined contents of the state memory means should satisfy, the contents of the state memory means are guaranteed to always satisfy the designated conditions. The designated conditions may be described in the scenario, which is convenient for a detection process by the interlock detection means. If generation of process scripts is stopped when it is detected that the operation contents of the respective computers with respect to a shared device for one event is inconsistent, prevention of inconsistency between the processes of process scripts with respect to the shared device is warranted.

Further, if an operation simulation means for interpreting the contents described in the scenario, and arbitrarily combining and simulating various events which may asynchronously occur is applied as the semantic confirmation means, meanings can be dynamically confirmed.

If the scenario compiling means comprises replacement means for replacing the variable used in the scenario with a constant, and constant propagation means for propagating the constant replaced by the replacement means within the scenario, the respective detection means can be effectively applied to a description using a variable. If the scenario compiling means comprises loop development means for internally developing a description using a loop statement, the respective detection means can be effectively applied to a statement using a loop variable.

As described in detail above, according to the present invention, since the program (scenario) abstractly and integrally describing the configuration and control contents of the multi-computer system can be applied, the definitions of the system configuration and control contents can be easily described, unlike the conventional multi-computer system in which a scenario must be described as an executable script for each computer. Since a process script (command string) which each computer should execute is automatically generated from the scenario (HA (High Availablilty) scenario), occurrence of errors such as inconsistency between the respective computers when the programmer describes the command string can be prevented.

According to the present invention, a description error in the scenario can be easily found by applying the errata/error confirmation function for the description contents of the scenario to the scenario compiling means for generating the process scripts which give functions equivalent to the description contents from the description contents of the scenario.

According to the present invention, since the scenario compiling means comprises the function of confirming the meanings of the description contents of the scenario, or the simulation function assuming various faults which may occur, such as a device failure, a semantically inconsistent portion of the scenario can be easily found, and problems of the control algorithm which are difficult to know before execution can be recognized before execution.

According to the present invention, since the scenario compiling means comprises the function of using the scenario compiling means to automatically generate the program (distribution script) for distributing the products such as the process scripts generated by the scenario compiling means to the respective computers constituting the multi-computer system defined in the scenario, description errors can be eliminated, unlike the case wherein the programmer describes a program of this type for each computer. Therefore, a distribution operation error and inconsistency between the computers can be eliminated.

Additional objects and advantages of the invention will be set forth in the description which follows, and in part will be obvious from the description, or may be learned by practice of the invention. The objects and advantages of the invention may be realized and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIGS. 5A and 5B are views for explaining the abstractness of the HA scenario 110;

FIG. 6 is a view for explaining integration (sharing) of the HA scenario 110;

FIG. 8 is a view for explaining sharing of the service description of an HA scenario in the system of FIG. 7;

FIGS. 17A through 17D are views for explaining determination of a commitment state in the fourth embodiment;

FIG. 19 is a view showing an example of an HA state table update description applied in the fifth embodiment;

FIG. 20 is a view showing an example of a service description applied in the fifth embodiment;

FIG. 36 is a view showing an example of a shared device operation description in the 13th embodiment;

FIG. 37 is a view showing a plurality of elements added to a development unit in an HA scenario compiler that is applied in a multi-computer system according to the 14th embodiment of the present invention;

FIG. 38 is a view showing an example of a description written by a loop statement.

DETAILED DESCRIPTION OF THE INVENTION

Embodiments of the present invention will be described below with reference to the several views of the accompanying drawing.

First Embodiment

Figure 1:
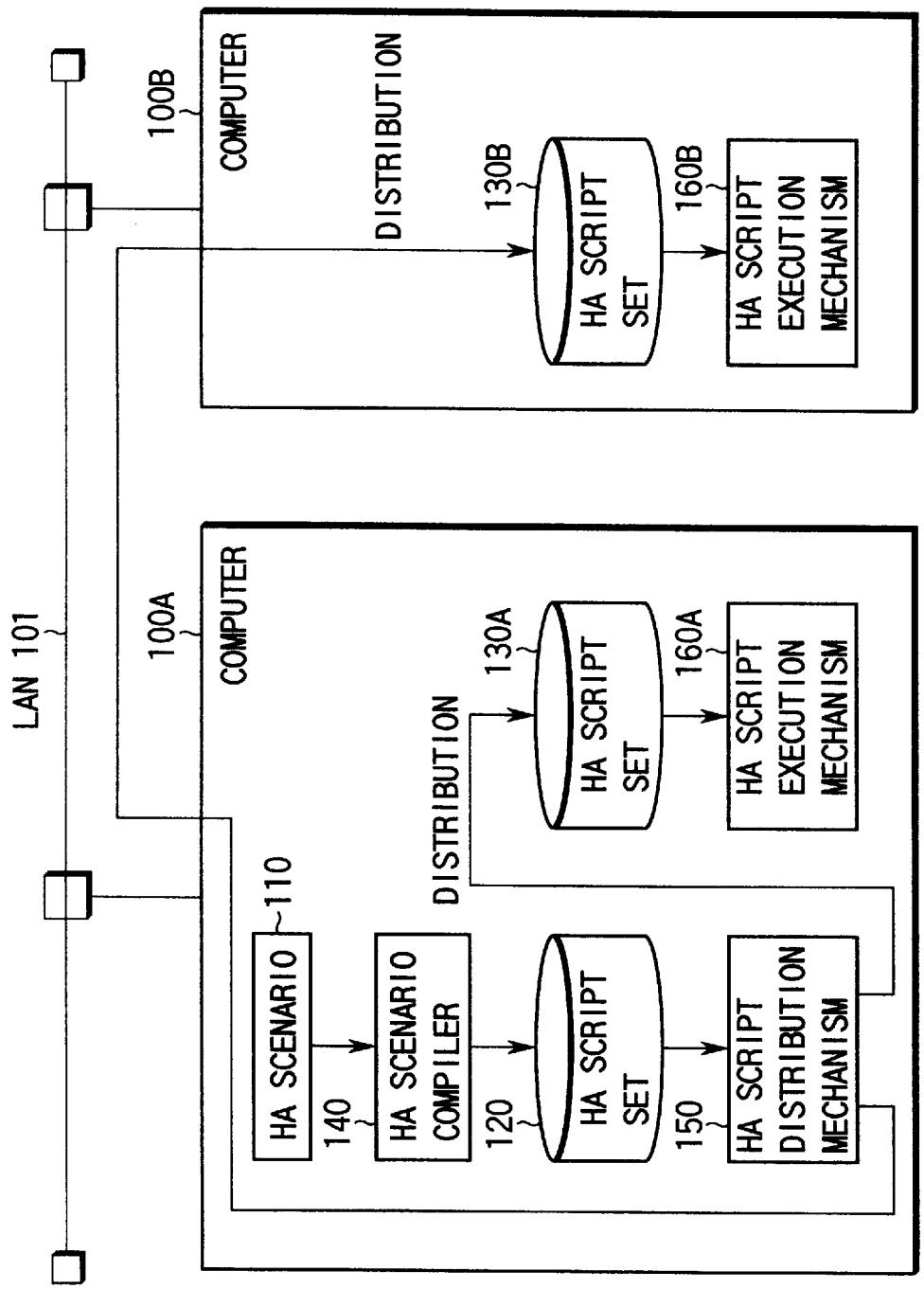
FIG. 1 is a block diagram of a multi-computer system according to the first embodiment of the present invention.

FIG. 1 is a block diagram of a multi-computer system according to the first embodiment of the present invention.

In FIG. 1, reference numerals 100A and 100B denote computers constituting the multi-computer system, which are mutually connected via a LAN (Local Area Network) 101 serving as an inter-computer connection means.

Figure 2:
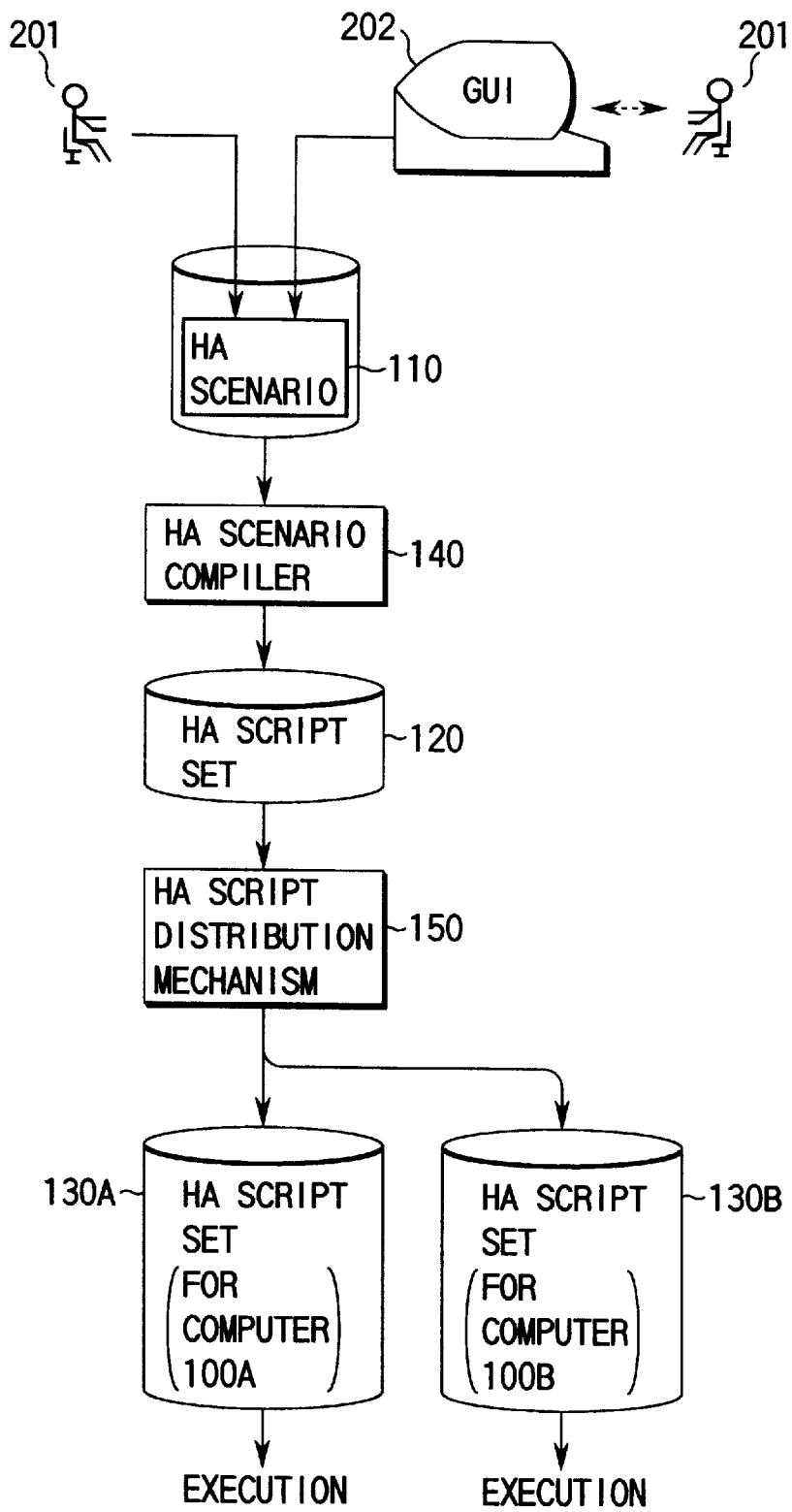
FIG. 2 is a view showing the main configuration and the flow of data conversion in the system of FIG. 1.

Of the computers 100A and 100B, e.g., the computer 100A has a program (to be referred to as an HA scenario hereinafter) 110 which abstractly and integrally describes the defined contents of the configuration and control (particularly, system operations for various events caused by a fault, an operator's operation, and the like) of the multi-computer system. As shown in FIG. 2, the HA (High Availability) scenario 110 is described by a programmer 201 directly or via a graphical user interface (GUI) 202.

The computer 100A incorporates a compiler (to be referred to as an HA scenario compiler hereinafter) 140 for compiling the HA scenario 110 to generate a command string set (to be referred to as an HA script set hereinafter) 120 in a form executable by, e.g., the computers 100A and 100B in order to give a function in accordance with the description contents of the HA scenario 110, and an HA script distribution mechanism 150 for selecting HA script sets 130A and 130B for the computers 100A and 100B from the HA script set 120, and distributing them to the corresponding computers 100A and 100B.

In the multi-computer system having the arrangement in FIG. 1, the HA scenario 110 described by the programmer 201 directly or via the GUI 202 is read in the HA scenario compiler 140 (on the computer 100A), as shown in FIG. 2. The HA scenario compiler 140 analyzes the lexical unit and syntax of the read HA scenario 110 in accordance with the format, and breaks them up into separate processes for the respective computers in the system, e.g., separate processes for the computers 100A and 100B to generate the HA script set 120 in a form directly executable by the computers 100A and 100B. The detailed operation of the HA scenario compiler 140 will be described below.

The HA script distribution mechanism 150 on the computer 100A selects portions to be executed by the computers 100A and 100B from the HA script set 120 generated by the HA scenario compiler 140, and distributes (copies) them as the HA script sets 130A and 130B for the computers 100A and 100B to specific directories in, e.g., large-capacity memory devices of the corresponding computers 100A and 100B. The distribution mechanism 150 on the computer 100A distributes the HA script set 130B to the computer 100B via the LAN 101 which mutually connects the computers 100A and 100B.

HA script execution mechanisms 160A and 160B of the computers 100A and 100B execute (HA scripts in) the HA script sets 130A and 130B distributed to the specific directories of the computers 100A and 100B by the HA script distribution mechanism 150.

Details of the HA scenario 110 and the HA script set 120 generated from the HA scenario 110 will be described with reference to FIGS. 3 through 6 exemplifying a case wherein one application program (to be simply referred to as an application hereinafter) is executed on one of the computers 100A and 100B, e.g., the computer 100A, while the other computer, e.g., the computer 100B stands by.

Various events which occur in the computers 100A and 100B in this system include five events: (1) fault detection in another computer, (2) a forcible application take-over request (to be referred to as take-over hereinafter), (3) a normal application switch-over request (to be referred to as switch-over hereinafter), (4) an application start request, and (5) an application end request.

Figure 3:
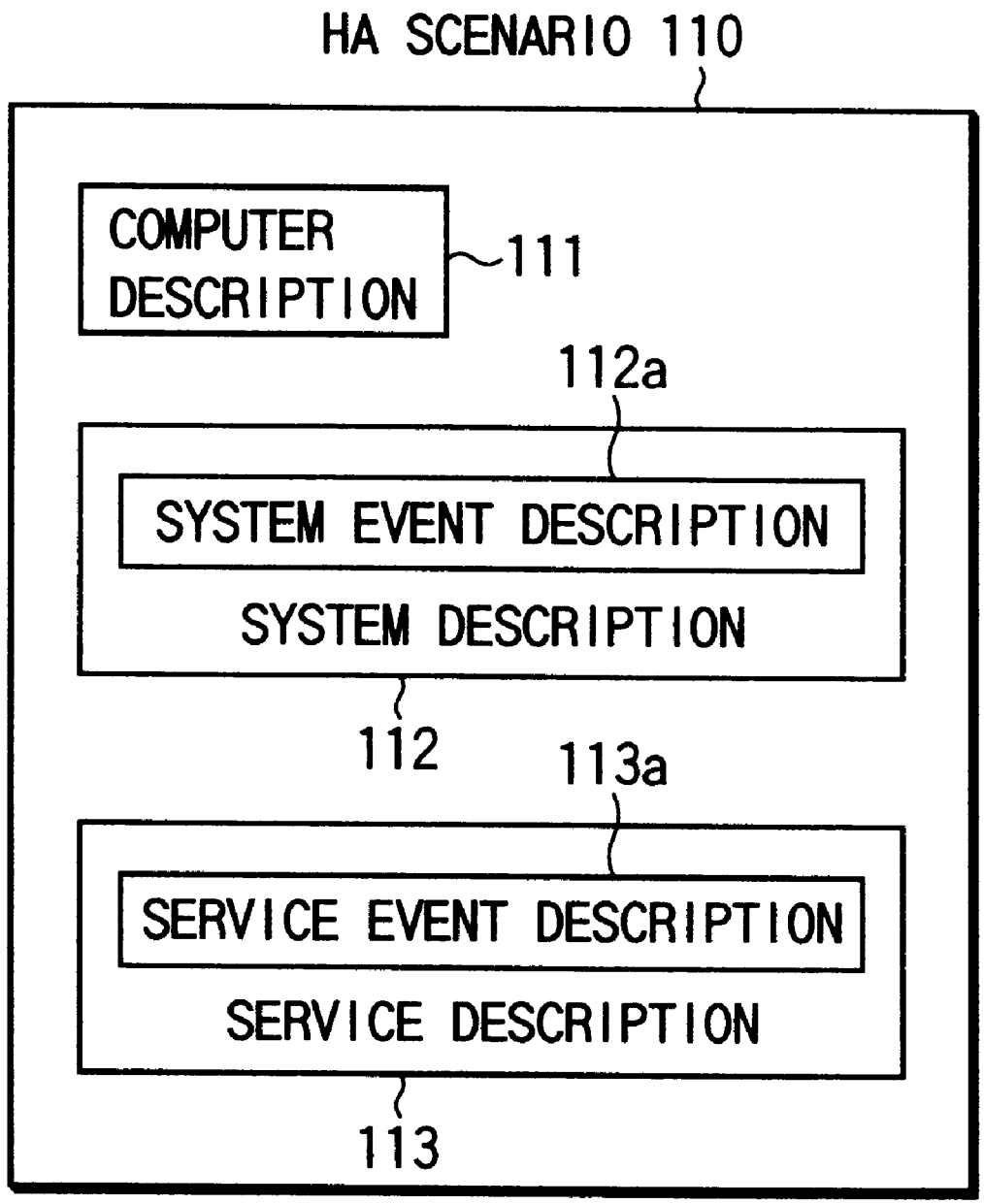
FIG. 3 is a view showing the schematic structure of an HA scenario 110 in FIG. 1.

As shown in FIG. 3, the HA scenario 110 includes a computer description 111, a system description 112, and a service description 113.

The computer description 111 defines information unique to a computer, e.g., defines the name, network address, and the like of the computer.

The system description 112 defines the operation of the system for each event (to be referred to as an HA event hereinafter) in the computer independently of the application the execution of which is in progress. The system description 112 mainly describes a process of controlling the HA script execution mechanisms (160A and 160B) upon detecting a fault in another computer. The system description 112 includes a system event description 112a which defines an HA event independently of the application being executed, e.g., fault detection in another computer.

The service description 113 defines the operation of an application for each event, and mainly defines processes on each computer for the respective HA events of application take-over, switch-over, start request, and end request. The service description 113 includes a service event description 113a which defines HA events for each application, e.g., take-over, switch-over, a start request, and an end request.

As described above, the HA scenario 110 abstractly and integrally describes the defined contents of the configuration and control (system operations in the event of an error and an operator's operation) of the multi-computer system.

The abstractness of the HA scenario 110 will be explained.

In this embodiment, a name (constant) used in the HA script is discriminated from a name (variable) used in the HA scenario 110, and the relationship between the name (variable) used in the HA scenario 110 and the name (constant) used in the HA script is defined in the HA scenario 110. The HA scenario 110 has a format in which the actual computer name (constant) is defined as a closed variable (i.e., a variable not appearing in an HA script generated from the HA scenario 110), and this variable is referred to in the remaining descriptions of the HA scenario 110.

With this abstractness of the HA scenario 110, the actual computer name is described at only one portion of the computer description in the HA scenario 110. Accordingly, when the system function handoff to another system is to be done, the HA scenario can be easily changed.

For example, when computers C and D respectively replace computers A and B, the description of the HA scenario is simply changed from the one in FIG. 5A to the one in FIG. 5B. The description "{name="X"}" (X=A, B, C, D) in FIGS. 5A and 5B is a portion describing the actual computer name. For example, the description "server cpu1 {name="B"}" indicates that computer B is defined as the "server cpu1" (first server computer).

The abstractness of the HA scenario 110 has been described.

The integration of the HA scenario 110 will be explained.

The HA scenario 110 describes a process shared by a plurality of computers (computers 100A and 100B in this case) for an HA event in the system description 112 and the service description 113. The HA scenario 110 also describes a process shared by a plurality of HA events. Further, even when only some computers, a given computer, or a certain HA event requires a special process, the process is shared by setting a special variable indicating the self node, and a variable indicating an HA event portion.

The integration (sharing) of the HA scenario 110 has been described above. This integration (sharing) facilitates formation of the HA scenario 110.

FIG. 6 shows an example of the integration (sharing) of the HA scenario 110 by exemplifying the service description 113 in which a process for a leave HA event is shared. This example assumes not two computers "cpu1" and "cpu2" but four computers "cpu1" through "cpu4" which constitute the system.

The description "syncevent OutX=("leave", cpuX)" (X=1, 2, 3, 4) in FIG. 6 defines that the description portion "syncevent OutX" indicates a leave HA event of leaving "cpuX".

"syncaction (cpu1|cpu2|cpu3|cpu4, Out1|Out2|Out3|Out4)" describes a processing computer and an event to be processed by the computer, and is shared by the four computers "cpu1" through "cpu4" and the four events "Out1" through "Out4", i.e., a total of 4×4=16 combinations. "localcpu" in "if (localcpu==event.cpu)" is a variable indicating the self node of "cpu1" through "cpu4". "event.cpu" is a variable indicating the second field ("cpuX") of the leave HA events "Out1" through "Out4", and is used to determine whether the self node is a computer indicated by the second field of the HA events "Out1" through "Out4".

The description lines with "#" in FIG. 6 are comment description lines.

The HA scenario compiler 140 on the computer 100A reads the HA scenario 110 in the above-described format.

The HA scenario compiler 140 obtains information about the type of computer from the contents of the computer description 111, the type of event from the contents of the system event description 112a and the service event description 113a, and process contents from the contents of the system description 112 and the service description 113, thereby generating the HA script set 120 (as a set of event process HA scripts).

Figure 4:
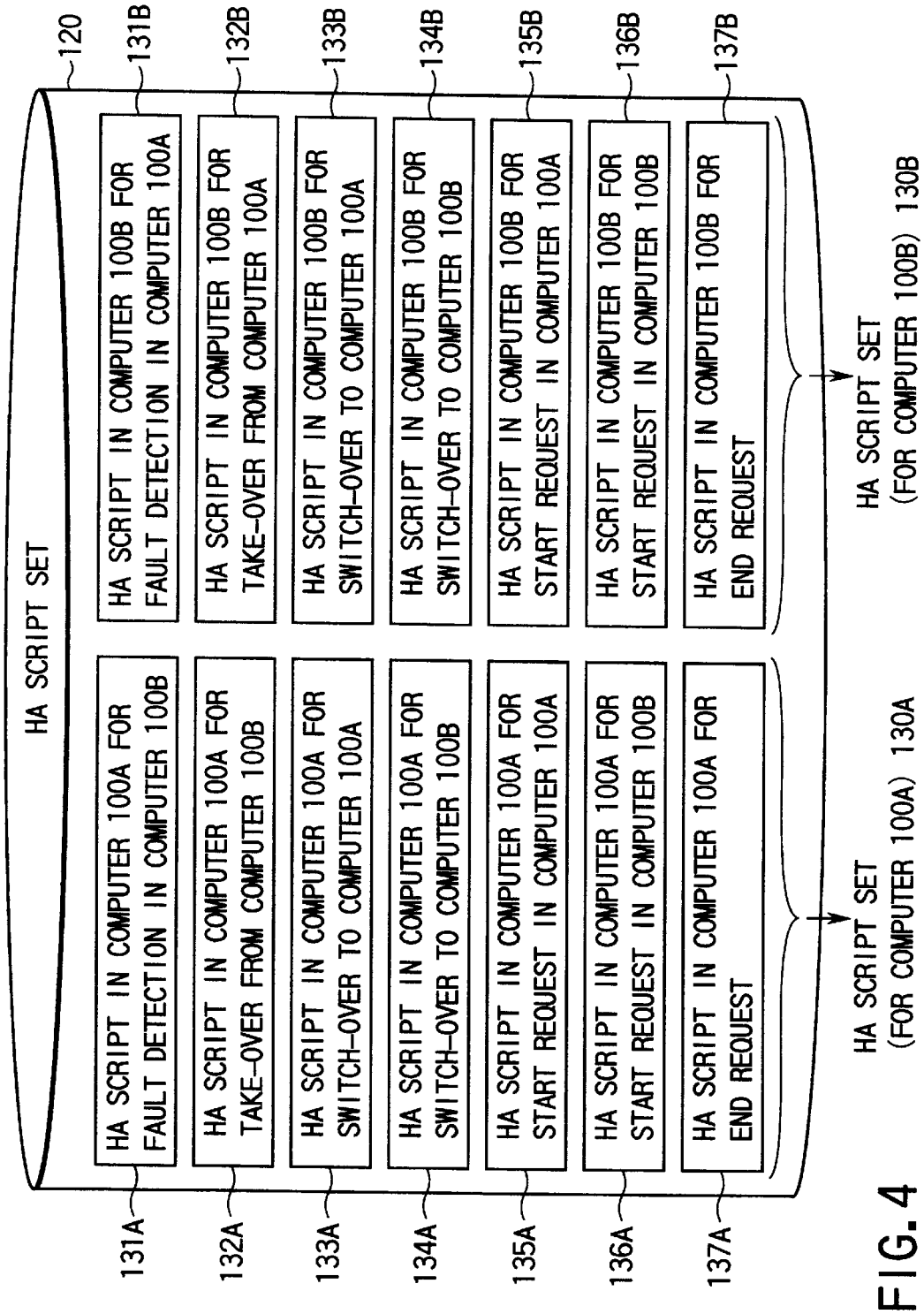
FIG. 4 is a view showing an example of an HA script set 120 (which gives functions equivalent to the contents of the HA scenario 110) generated by an HA scenario compiler 140 in FIG. 1.

As shown in FIG. 4, the HA script set 120 has an HA script 131A which describes a process in the computer 100A for fault detection in the computer 100B, an HA script 132A which describes a process in the computer 100A for take-over from the computer 100B, an HA script 133A which describes a process in the computer 100A for switch-over to the computer 100A, an HA script 134A which describes a process in the computer 100A for switch-over to the computer 100B, an HA script 135A which describes a process in the computer 100A for a start request in the computer 100A, an HA script 136A which describes a process in the computer 100A for a start request in the computer 100B, and an HA script 137A which describes a process in the computer 100A for an end request.

The HA script set 120 also has an HA script 131B which describes a process in the computer 100B for fault detection in the computer 100A, an HA script 132B which describes a process in the computer 100B for take-over from the computer 100A, an HA script 133B which describes a process in the computer 100B for switch-over to the computer 100A, an HA script 134B which describes a process in the computer 100B for switch-over to the computer 100B, an HA script 135B which describes a process in the computer 100B for a start request in the computer 100A, an HA script 136B which describes a process in the computer 100B for a start process in the computer 100B, and an HA script 137B which describes a process in the computer 100B for an end request.

In this embodiment, there are two types of fault detection events, two types of take-over events, two types of switch-over events, and two types of start request events. Nonetheless, only one computer requires HA scripts for each of the fault detection and take-over events, like the HA scripts 131A and 131B and the HA scripts 132A and 132B.

The HA script distribution mechanism 150 on the computer 100A selects the HA scripts 131A to 137A to be executed by the computer 100A from the HA script set 120 generated by the HA scenario compiler 140, and distributes them as the HA script set 130A for the computer 100A to a specific directory in the large-capacity memory device of the computer 100A. The HA script distribution mechanism 150 selects the HA scripts 131B to 137B to be executed by the computer 100B from the HA script set 120, and distributes them as the HA script set 130B for the computer 100B to a specific directory in the large-capacity memory device of the computer 100B via the LAN 101.

The HA scenario compiler 140 and the HA script distribution mechanism 150 may be arranged on the computer 100B (instead of the computer 100A).

The HA script execution mechanisms 160A and 160B on the computers 100A and 100B execute corresponding HA scripts in the HA script sets 130A and 130B every time an event occurs.

Second Embodiment

The second embodiment of the present invention will be described below with reference to the several views of the accompanying drawing.

Figure 7:
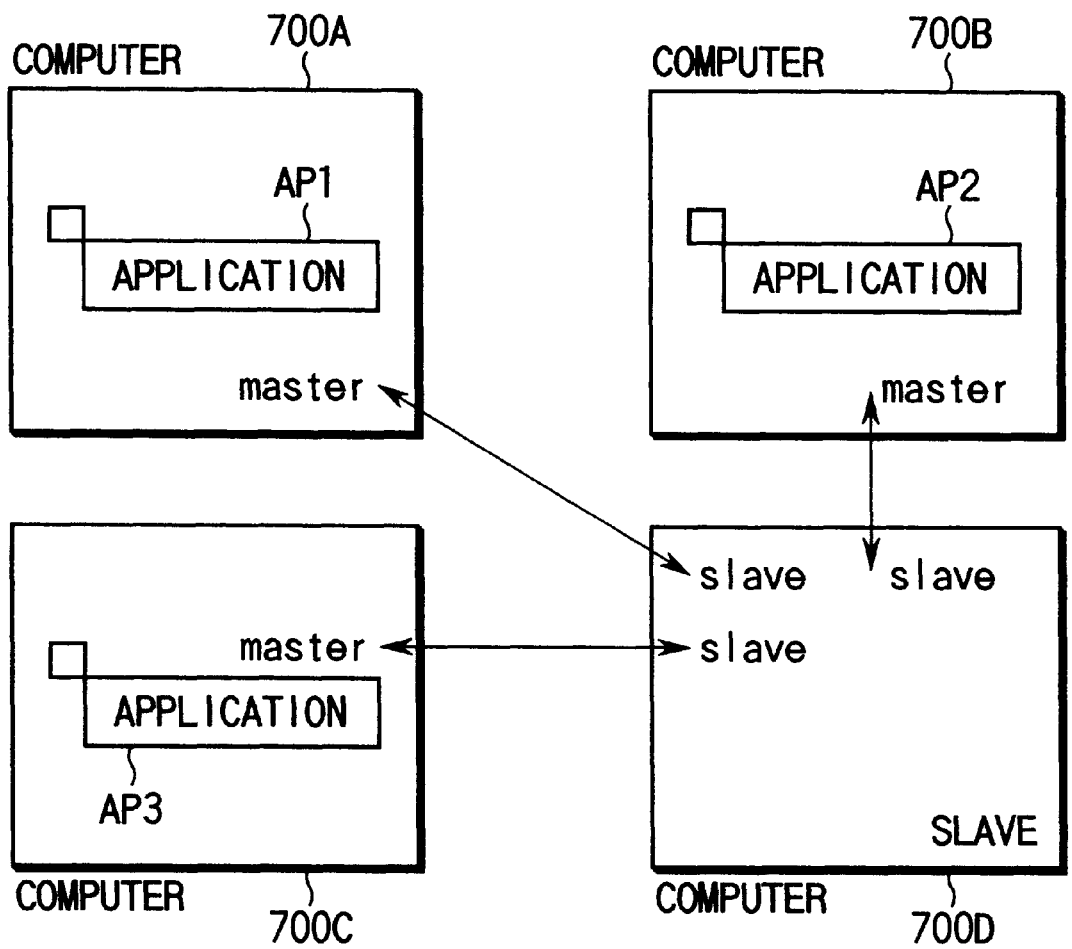
FIG. 7 is a view showing an example of masters and a slave in a multi-computer system according to the second embodiment of the present invention.

FIG. 7 is a block diagram showing a multi-computer system constituted by four computers according to the second embodiment.

In the system of FIG. 7, assume that, of four computers 700A, 700B, 700C, and 700D, three computers, e.g., the computers 700A, 700B, and 700C serve as masters in which independent applications AP1 through AP3 operate on the corresponding computers, and one remaining computer 700D stands by as a slave shared by the computers 700A through 700C.

In this system, an HA scenario (corresponding to the HA scenario 110 in the first embodiment) generally requires three service descriptions (corresponding to the service description 113).

However, the three service descriptions can be substantially shared if a name (first variable; e.g., "CPU1") that is related to a name (constant) used in the HA script and used in the HA script used in the HA scenario is discriminated from a name (second variable; e.g., "master" or "slave") used in a specific unit within the HA scenario, and their relationship is described in a specific unit within the HA scenario. FIG. 8 shows an example of this HA scenario.

This HA scenario uses a format in which master and slave computers are defined by the descriptions "master=cpuX" and "slave=cpu4" (X=1, 2, 3) at the heads of three service descriptions 801, 802, and 803, and these variables are referred to at the remaining portions 804-1 through 804-3 ((1), (2), and (3) in FIG. 8) in the service descriptions 801 through 803.

Third Embodiment

The third embodiment of the present invention will be described below with reference to the several views of the accompanying drawing.

FIGS. 9A through 9G are views for explaining join/leave of a computer by an operator request, and automatic leave of a faulty computer in a multi-computer system according to the third embodiment of the present invention. This embodiment assumes a synchronous event multi-computer system constituted by three computers 900A, 900B, and 900C in which the computers 900A through 900C simultaneously execute event process HA scripts defined in the respective computers 900A through 900C for each event such as a hardware or software fault or an operator operation (operator input) in synchronism with each other, thereby performing fault processes or requested processes.

HA events in this system include four types of events: (1) a formation request for a new HA group serving as a special HA event whose execution cannot be inhibited, (2) fault detection in another computer, (3) a computer join request, and (4) a computer leave request. The HA group (specific group) means a set of computers which execute HA scripts in synchronism with each other. The HA group (new HA group) consists of only one computer in the initial state.

The above HA events (1) through (4) are described in the system event description (corresponding to the system event description 112a in the first embodiment) of the HA scenario. The HA events except for HA event (2) are generated in accordance with operator operations, and HA event (2) is automatically generated upon detecting a fault in a computer.

A process for "(1) a new HA group formation request" includes a process of permitting a designated computer to execute an HA script.

A process for "(2) fault detection in another computer" includes a process of inhibiting a faulty computer from executing an HA script.

A process for "(3) a computer join request" includes a process of permitting a designated computer to execute an HA script.

A process for "(4) a computer leave request" includes a process of inhibiting a designated computer from executing an HA script.

Note that "(1) a new HA group formation request" and "(3) a computer join request" are different functions, as will be described below. The former means that a new HA group is formed, whereas the latter means that a computer is joined in a certain HA group which has already been formed. Particularly, the former is an event which occurs in a computer inhibited from executing an HA script, while the latter is an event which occurs in a computer authorized to execute an HA script (i.e., a computer within the HA group).

Join/leave of a computer is mainly used when only one computer is stopped for the purpose of maintenance or the like.

The computers 900A through 900C in FIGS. 9A through 9H are mutually connected via a LAN (not shown). HA script execution mechanisms 960A through 960C (corresponding to the HA script execution mechanisms 160A and 160B in the first embodiment) are respectively arranged on the computers 900A through 900C. The HA script execution mechanisms 960A through 960C on the computers 900A through 900C can cooperate with each other particularly to authorize each other to execute an HA script. In this case, a computer which is permitted HA script execution is recognized to be in the same group as that of a computer which granted this permission.

Figure 9A:
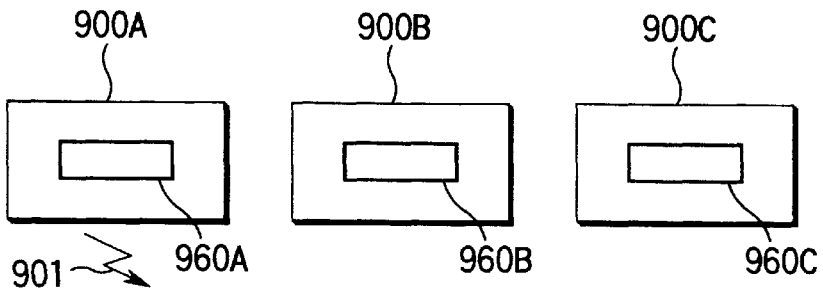
FIGS. 9A through 9H are state transition views for explaining join/leave of a computer in a multi-computer system according to the third embodiment of the present invention.

Assume that an HA event 901 of a formation request for a new HA group constituted by the computer 900A is generated by an operator operation in the computer 900A, as shown in FIG. 9A. In this case, the computer 900A sets the self node in an HA script execution permission state to form an HA group 902 constituted by only the self node, as shown in FIG. 9B.

Figure 9B:
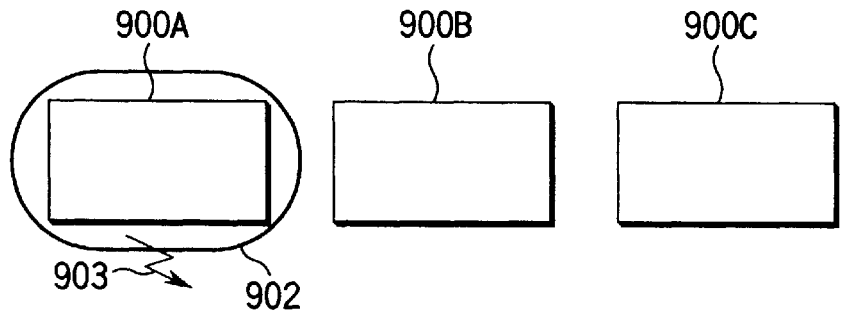
Figure 9C:
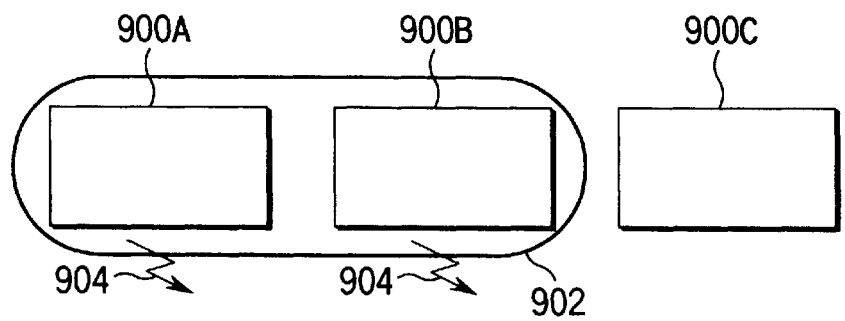

Assume that an HA event 903 of a join request for the computer 900B (to the HA group 902) is generated by an operator operation in the computer 900A of the HA group 902, as shown in FIG. 9B. In this case, the computer 900A sets the computer 900B designated by the HA event 903 in an HA script execution permission state to join the computer 900B in the HA group 902, as shown in FIG. 9C. As a result, the computer 900A, and the computer 900B newly joined in the HA group 902, cooperate with each other.

Figure 9D:
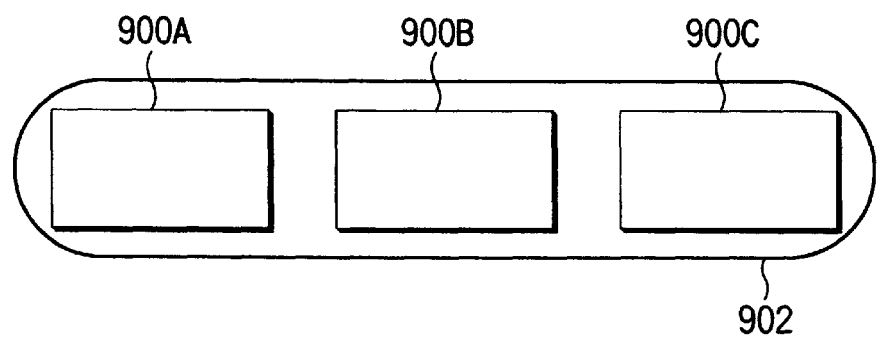

Assume that an HA event 904 of a join request for the computer 900C (to the HA group 902) is generated by an operator operation (to the computer 900A or 900B) in the computers 900A and 900B of the HA group 902, as shown in FIG. 9C. In this case, the computers 900A and 900B set the computer 900C designated by the HA event 904 in an HA script execution permission state to join the computer 900C in the HA group 902, as shown in FIG. 9D. Consequently, the computers 900A and 900B, and the computer 900C newly joined in the HA group 902, cooperate with each other.

Figure 9E:
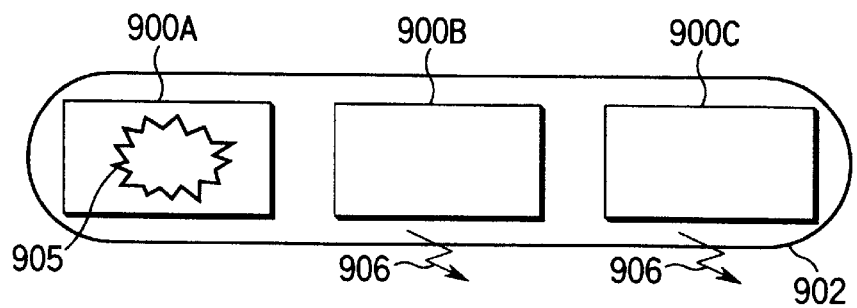

Assume that a fault 905 has occurred in the computer 900A in this state, and has been detected by the computers 900B and 900C, as shown in FIG. 9E. Then, an HA event 906 of fault detection in the computer 900A is generated in the computers 900B and 900C, as shown in FIG. 9E. In this case, the computers 900B and 900C regard the computer 900A having the fault 905 to be in an HA script execution inhibition state, and automatically leave the computer 900A off the HA group 902, as shown in FIG. 9F.

Figure 9F:
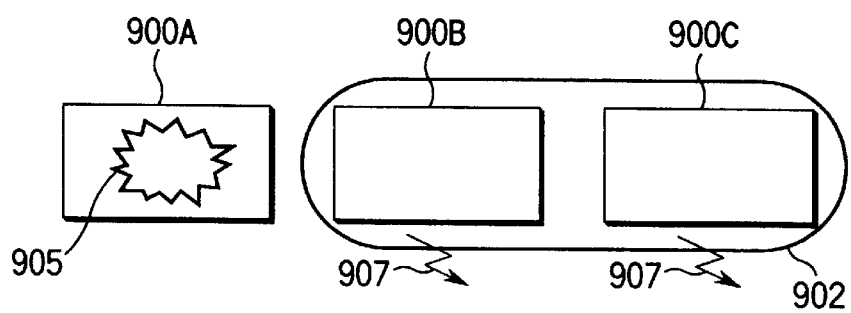

Assume that an HA event 907 of a leave request for the computer 900B (off the HA group 902) is generated by an operator operation in the computers 900B and 900C of the HA group 902, while the computer 900A is left off the HA group 902, as shown in FIG. 9F. In this case, the computers 900B and 900C set the computer 900B designated by the HA event 907 in an HA script execution inhibition state to leave the computer 900B off the HA group 902, as shown in FIG. 9G.

Figure 9G:
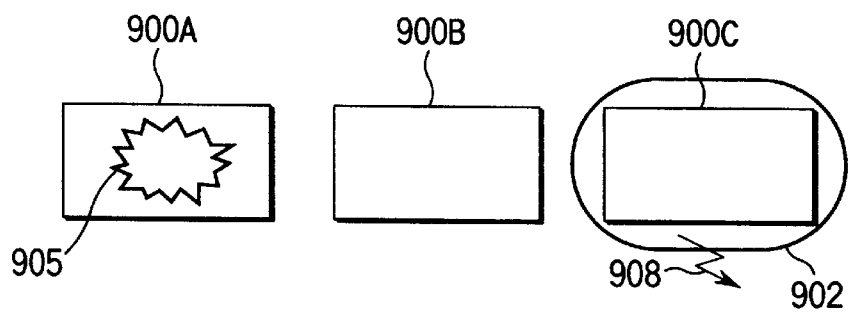
Figure 9H:
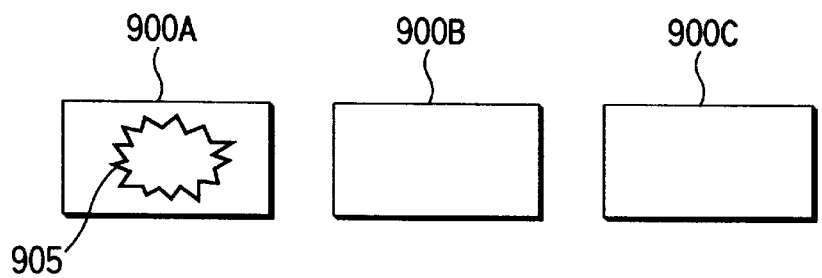

Assume that an HA event 908 of a leave request for the computer 900C itself (off the HA group 902) is generated by an operator operation in the computer 900C of the HA group 902, while the computers 900A and 900B are left off the HA group 902, as shown in FIG. 9G. In this case, the computer 900C sets the computer 900C itself designated by the HA event 908 in an HA script execution inhibition state to leave the computer 900C itself off the HA group 902, as shown in FIG. 9H.

In this manner, with the mechanism capable of setting of HA script execution permission/inhibition in an initial state, and resetting upon occurrence of an HA event for each of the computers 900A through 900C, the HA group is automatically changed upon occurrence of an HA event. Join/leave of a computer in an on-line state in accordance with an operator operation, and automatic leave of a faulty computer are easily performed.

This is particularly suitable for leaving or joining a desired computer for maintenance or the like (for the purpose of exchange or test of the operation system) without stopping the system. In the prior art, if a computer is joined/left without stopping the system, this is erroneously detected as a fault, and a take-over process is undesirably performed. Therefore, the computer must be joined/left after temporarily stopping the system.

Fourth Embodiment

The fourth embodiment of the present invention will be described below with reference to the several views of the accompanying drawing.

Figure 10:
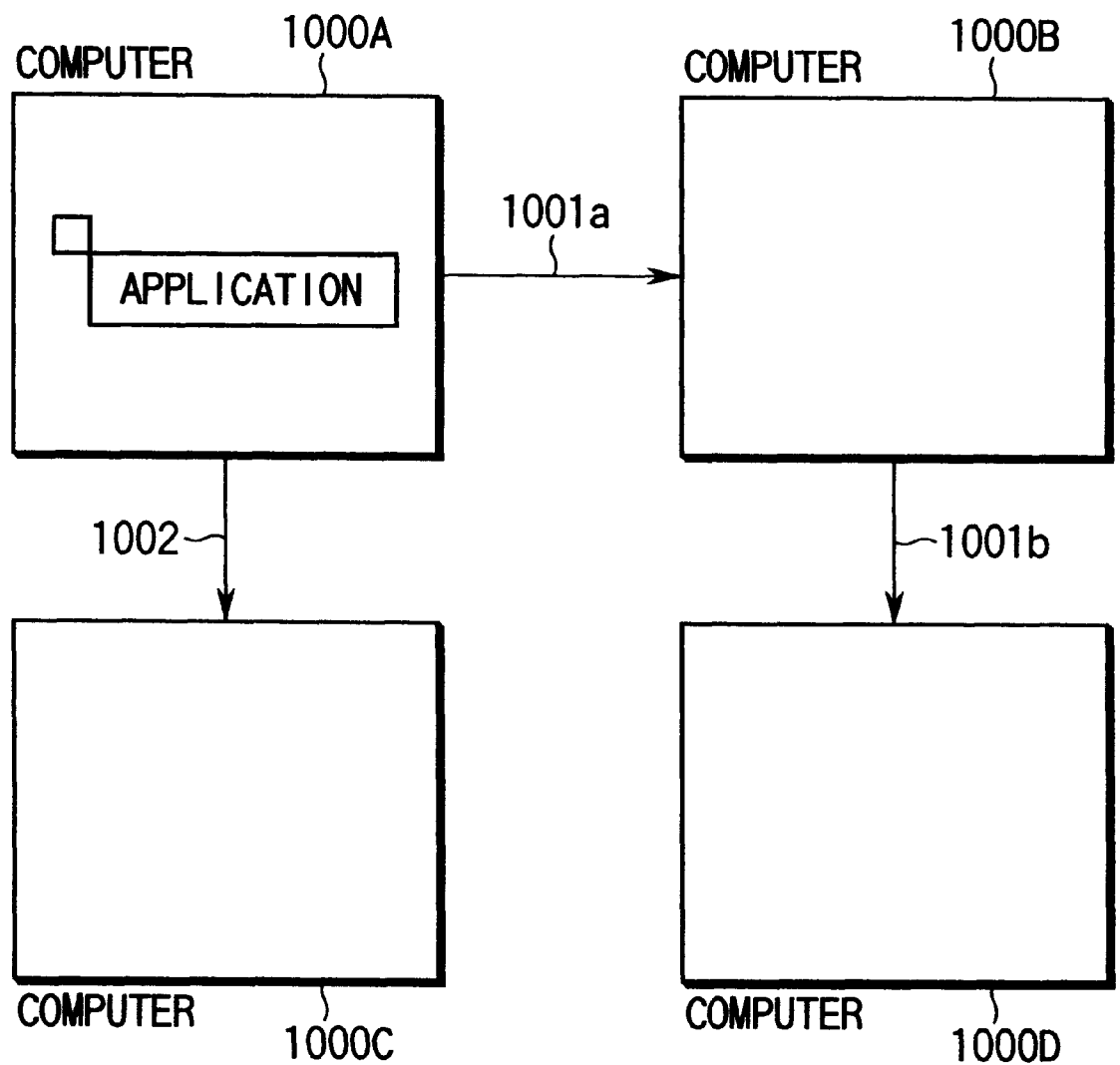
FIG. 10 is a view for explaining a problem that arises when a conventional application take-over method is applied to a multi-computer system according to the fourth embodiment of the present invention.

FIG. 10 is a view for explaining a manner in which the application operating in a computer wherein a fault has occurred is automatically taken over by another computer in a multi-computer system. This embodiment assumes a multi-computer system constituted by four computers 1000A, 1000B, 1000C, and 1000D.

An HA scenario (corresponding to the HA scenario 110 in the first embodiment) applied in this system describes application take-over in accordance with the following conditions.

(1) If the computer 1000B is normal upon occurrence of a fault in the computer 1000A, the application operating in the computer 1000A is taken over by the computer 1000B.

(2) If the computer 1000B is not normal and the computer 1000C is normal upon occurrence of a fault in the computer 1000A, the application operating in the computer 1000A is taken over by the computer 1000C.

(3) If the computer 1000D is normal upon occurrence of a fault in the computer 1000B, the application operating in the computer 1000B is taken over by the computer 1000D.

(4) If the computer 1000D is normal upon occurrence of a fault in the computer 1000C, the application operating in the computer 1000C is taken over by the computer 1000D.

In FIG. 10, assume that faults have substantially simultaneously occurred in the computers 1000A and 1000B. In this case, although an HA event of fault detection in the computer 1000A, and an HA event of fault detection in the computer 1000B are almost simultaneously generated in the computers 1000C and 1000D, the generation order in the computer 1000C is not always the same as that in the computer 1000D because of a detection delay or a communication delay.

In the prior art, when the application operating in a computer in which a fault has occurred is taken over by another computer, the generation order of fault detection HA events is important, as will be described below.

For example, if faults are detected in the order of the computers 1000A and 1000B, the application executed by the computer 1000A is (temporarily) taken over by the computer 1000B via a take-over path denoted by reference numeral 1001*a* in FIG. 10 in accordance with the above condition (1). When a fault in the computer 1000B is detected, the application is taken over by the computer 1000D via a take-over path denoted by reference numeral 1001*b* in FIG. 10 in accordance with the above condition (3). That is, when a fault in the computer 1000A is first detected, the application executed by the computer 1000A is finally taken over by the computer 1000D.

If faults are sequentially detected in the order of the computers 1000B and 1000A, the application executed by the computer 1000B is (temporarily) taken over by the computer 1000D in accordance with the above condition (3). When a fault in the computer 1000A is detected, this take-over is canceled, and the application executed by the computer 1000A is newly taken over by the computer 1000C via a take-over path denoted by reference numeral 1002 in FIG. 10 in accordance with the above condition (2). That is, when a fault in the computer 1000B is detected, the application executed by the computer 1000A is taken over by the computer 1000C.

When, therefore, faults are detected by both the computers 1000C and 1000D in the order of the computers 1000A and 1000B, the application executed by the computer 1000A is correctly taken over by the computer 1000D via the paths 1001*a* and 1001*b*. Similarly, when faults are detected by both the computers 1000C and 1000D in the order of the computers 1000B and 1000A, the application executed by the computer 1000A is correctly taken over by the computer 1000C via the path 1002.

When, however, faults are detected by the computer 1000C in the order of the computers 1000A and 1000B, and by the computer 1000D in the reverse order of the computers 1000B and 1000A, no application taken-over by either the computer 1000C or 1000D takes place. That is, the computer 1000C determines that the application executed by the computer 1000A is to be taken over by the computer 1000B, and upon detecting the fault in the computer 1000B, that the application executed by the computer 1000B is to be taken over by the computer 1000D. On the other hand, the computer 1000D determines upon detecting the fault in the computer 1000B that the application executed by the computer 1000B is to be taken over by the computer 1000D, and upon detecting the fault in the computer 1000A, that the application executed by the computer 1000A is to be taken over by the computer 1000C. Therefore, the application executed by the computer 1000A is not taken over by either the computer 1000C or 1000D. When faults are detected by the computer 1000C in the order of the computers 1000B and 1000A, and by the computer 1000D in the reverse order of the computers 1000A and 1000B, the application executed by the computer 1000A is taken over by the computer 1000C via the path 1002, and also to the computer 1000D via the paths 1001*a* and 1000*b*.

That is, in the prior art, when the order of an HA event of fault detection in the computer 1000A and an HA event of fault detection in the computer 1000B which are generated in the computers 1000C and 1000D is different in the computers 1000C and 1000D, both or neither of the computers 1000C and 1000D erroneously take over (the application executed by the computer 1000A).

Figure 11:
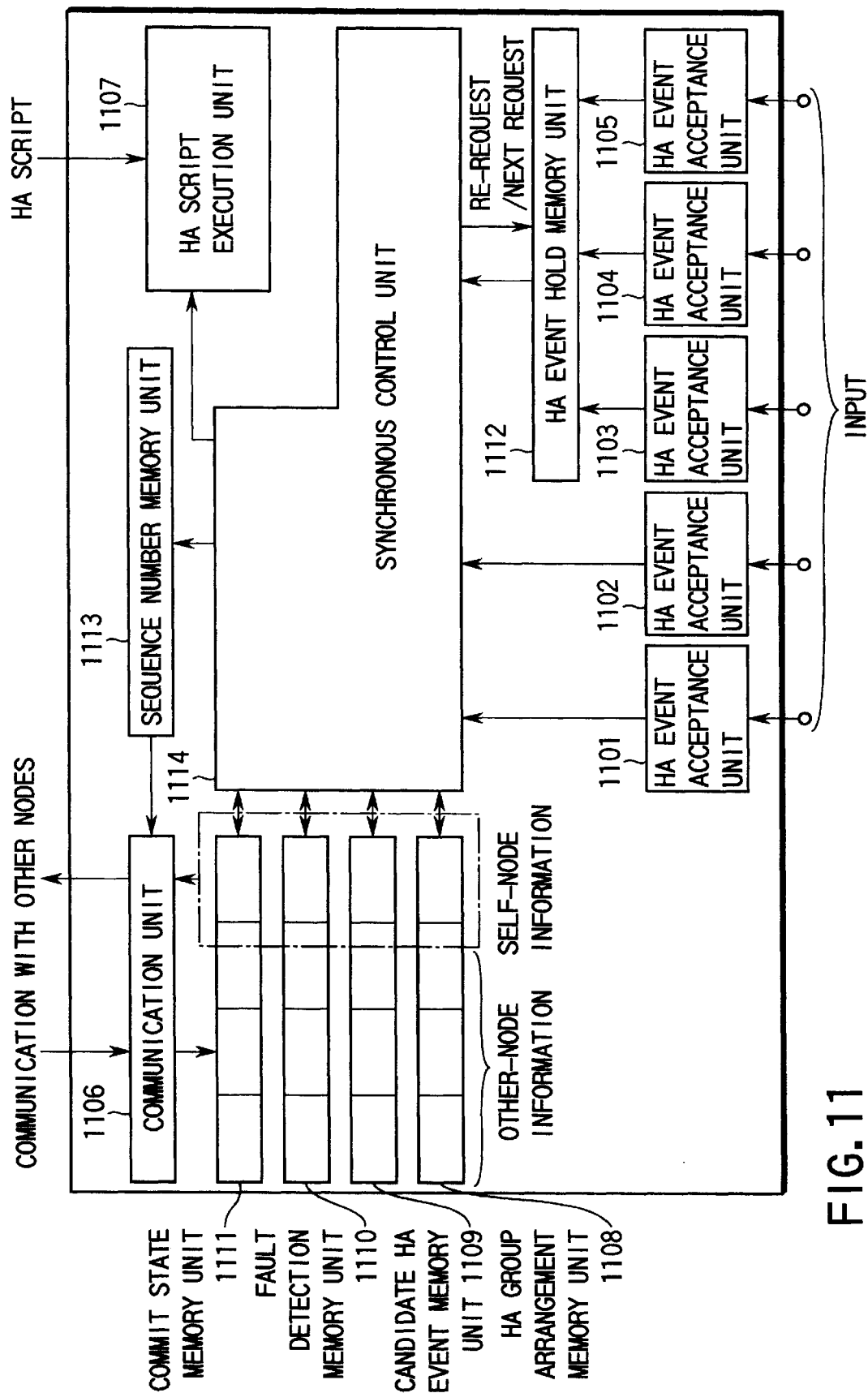
FIG. 11 is a block diagram of an HA script execution mechanism applied in the fourth embodiment.

In this embodiment, to avoid this inconvenience, the HA script execution mechanisms (corresponding to the HA script execution mechanisms 160A and 160B in the first embodiment) in the computers 1000A through 1000D are constituted as shown in FIG. 11.

The HA script execution mechanism in each of the computers 1000A through 1000D has an HA event acceptance unit 1101 which accepts a new HA group formation request HA event, an HA event acceptance unit 1102 which accepts a computer fault detection HA event, an HA event acceptance unit 1103 which accepts a computer join request HA event, an HA event acceptance unit 1104 which accepts a computer leave request HA event, and an HA event acceptance unit 1105 which accepts other HA events.

The HA script execution mechanism also has a communication unit 1106 which communicates with the HA script execution mechanisms of other nodes, and an HA script execution unit 1107 which executes HA scripts.

The HA script execution mechanism further comprises an HA group arrangement memory unit 1108 which stores information about an HA group arrangement, a candidate HA event memory unit 1109 which stores, as a candidate HA event, an HA event which may cause an HA script to be executed next, a fault detection memory unit 1110 which stores information about a detected fault, and an commitment state memory unit 1111 which stores the commitment state of the candidate HA event. Each of the memory units 1108 through 1111 has a memory area for storing corresponding information about the self node, and a memory area corresponding to three computers for storing corresponding information about other nodes.

The HA script execution mechanism further comprises a FIFO (First-In First-Out) HA event hold memory unit 1112 for temporarily storing (holding) HA events accepted by the HA event acceptance units 1103 through 1105, a sequence number memory unit 1113 for storing sequence numbers used to manage the execution order of a series of HA scripts, and a synchronous control unit 1114 which manages synchronous control for allowing the computers in the HA group to perform HA event processes in cooperation with each other.

The schematic operation of the HA script execution mechanism having the arrangement in FIG. 11 will be described below.

The new HA group formation request HA event acceptance unit 1101 accepts a corresponding HA event only when the self-node computer has not joined the HA group.

The computer fault detection HA event acceptance unit 1102 unconditionally accepts a fault detection HA event. The computer join request HA event acceptance unit 1103, the computer leave request HA event acceptance unit 1104, and the acceptance unit 1105 for other HA events unconditionally accept corresponding HA events.

The respective HA events accepted by the new HA group formation request HA event acceptance unit 1101 and the computer fault detection HA event acceptance unit 1102 are directly input to the synchronous control unit 1114.

To the contrary, the respective HA events accepted by the computer join request HA event acceptance unit 1103, the computer leave request HA event acceptance unit 1104, and the acceptance unit 1105 for other HA events are temporarily held by the HA event hold memory unit 1112, and then input to the synchronous control unit 1114 in response to a request from the synchronous control unit 1114.

The communication unit 1106 notifies (the HA script execution mechanism of) other nodes of information about the self node stored in the self-node memory areas of the HA group arrangement memory unit 1108, the candidate HA event memory unit 1109, the fault detection memory unit 1110, and the commitment state memory unit 1111. At the same time, the communication unit 1106 stores information sent from (the communication unit 1106 in the HA script execution mechanism of) other nodes in corresponding memory areas of the memory units 1108 through 1111 corresponding to the information. Other nodes are notified of information together with a sequence number stored in the sequence number memory unit 1113. Upon reception of information from another node, information is stored in a corresponding information unit of the memory units 1108 through 1111 together with the sequence number added to the information.

The synchronous control unit 1114 determines the latest self-node state on the basis of information about the self node and another node which are respectively stored in the HA group arrangement memory unit 1108, the candidate HA event memory unit 1109, the fault detection memory unit 1110, and the commitment state memory unit 1111, and stores this state in the self-node memory areas of the corresponding memory units 1108 through 1111.

At this time, if the self-node commitment state is "successful commitment", the HA script execution unit 1107 executes an HA script corresponding to a candidate HA event stored in the candidate HA event memory unit 1109 to update the sequence number. If the self-node commitment state is "commitment failure", the HA script execution unit 1107 discards the candidate HA event stored in the candidate HA event memory unit 1109 to update the sequence number.

A typical process performed when the HA script execution mechanism having the arrangement in FIG. 11 is arranged in each of the computers 1000A through 1000D of the multi-computer system in FIG. 10 will be described with reference to FIGS. 12 through 16 exemplifying the following processes: (1) a normal process (process when no fault is detected) in a case except for formation of a new HA group, and join/leave of a computer, (2) a process upon fault detection in a case except for formation of a new HA group, and join/leave of a computer, (3) a process in forming a new HA group, (4) a process in joining a computer, and (5) a process in leaving a computer.

(1) Normal Process in Case Except for Formation of New HA Group and Join/Leave of Computer This process is performed in a computer in the HA group. Assume that all the computers 1000A through 1000D in FIG. 10 are included in the HA group.

Assume that an HA event (except for a new HA group formation HA event and a computer join/leave HA event) located at the head of the HA event hold memory unit 1112, e.g., an HA event (another HA event or a normal HA event) which is accepted by the HA event acceptance unit 1105 and stored in the HA event hold memory unit 1112 in the FIFO scheme is input in response to an input request from the synchronous control unit 1114 of the HA script execution mechanism of a given computer in the HA group. In this case, the synchronous control unit 1114 stores the input HA event as a candidate HA event in the self-node memory area of the candidate HA event memory unit 1109 (step S1).

The communication unit 1106 notifies other nodes of the self-node candidate HA event stored in the candidate HA event memory unit 1109 (step S2).

The candidate HA event sent to other nodes is stored in a memory area for the source node in the candidate HA event memory unit 1109 of each node (step S3). When no candidate HA event is determined in the node notified of the candidate HA event, this event is used as the candidate HA event of this node, and also stored in the self-node memory area of the candidate HA event memory unit 1109 of this node. In step S3, other nodes are notified of the contents of the self-node memory area in the candidate HA event memory unit 1109.

In this manner, as far as no fault is detected in any computer (step S4), the communication units 1106 of the HA script execution mechanisms of the computers 1000A through 1000D in the HA group receive all the candidate HA events of other nodes (step S5).

If the candidate HA events of other nodes stored in the candidate HA event memory unit 1109 are the same as the candidate HA event of the self node, i.e., all the candidate HA events of the computers 1000A through 1000D are the same (step S6), the synchronous control units 1114 of the computers 1000A through 1000D in the HA group decide the self-node commitment state as "successful commitment" (step S7); if NO in step S6, the commitment state as "commitment failure" (step S8). FIG. 17A shows an example of "successful commitment", and FIG. 17B shows an example of "commitment failure". In FIGS. 17A and 17B, e and f represent different candidate HA events.

If commitment succeeds, the HA script execution unit 1107 of each of the computers 1000A through 1000D executes an HA script for the corresponding HA event under the control of the synchronous control unit 1114 (step S9). If an HA event located at the head of the HA event hold memory unit 1112 is the same as the established HA event upon completion of the execution, it is deleted (step S10). The commitment state representing "successful commitment" is stored in the self-node memory area of the commitment state memory unit 1111.

If commitment fails, the self-node candidate HA event stored in the candidate HA event memory unit 1109 is discarded (step S11), and the synchronous control unit 1114 requests an HA event from the HA event hold memory unit 1112 again (step S13). The time interval between determination of "commitment failure" and re-request of an HA event is randomly set (step S12). The commitment state representing "commitment failure" is stored in the self-node memory area of the commitment state memory unit 1111.

After step S10 or S13, the synchronous control unit 1114 increments the sequence number in the sequence number memory unit 1113 by one to wait for input of a next HA event (step S14).

In this embodiment, execution of a next HA event is inhibited until all the computers in the HA group have the same candidate HA event, in other words, execution of a process script for one HA event is complete in the HA group. As a result, the execution order of HA scripts for a plurality of HA events is the same in the HA group.

The commitment state for one sequence number is finally determined as "successful commitment" or "commitment failure" in all the computers 1000A through 1000D in the HA group, but is not simultaneously determined in all the computers 1000A through 1000D due to communication delay times. Therefore, whether the computer of another node proceeds to a process having a next sequence number must be determined from the sequence number added to information from this node, and if so, this process must be suspended until the self node starts a process having the next sequence number. For this reason, two memory areas for the current state and a state one before are ensured in each of the memory units 1108 through 1111.

(2) Process Upon Fault detection in Case Except for Formation of New HA Group and Join/Leave of Computer When a fault detection HA event is input to a certain computer in the HA group, other nodes are notified of the fault detection HA event in the same manner as that upon reception of a normal HA event.

When the fault detection HA event is input to a certain computer in the HA group, and other nodes are notified of this event, i.e., a fault is detected in a computer within the HA group (step S4), the communication unit 1106 of each computer except for the faulty computer in the HA group receives all candidate HA events except for that of the faulty computer (step S15).

If all the candidate HA events stored in the candidate HA event memory units 1109 of the computers except for the faulty computer, and the candidate HA event of the self node are the same (step S16), the synchronous control unit 1114 of each computer except for the faulty computer in the HA group determines the self-node commitment state as "commitment suspension" (step S17); if NO, the commitment state is determined as "commitment failure" (step S18). This "commitment suspension" indicates an intermediate state between "successful commitment" and "commitment failure". FIG. 17C shows an example of this "commitment suspension". FIG. 17C also shows the contents of the commitment state memory unit 1111 in determining "commitment suspension".

The self-node commitment state is stored in the self-node memory area of the commitment state memory unit 1111, and other nodes are notified of this state (step S19).

Each of the computers except for the faulty computer in the HA group receives all the commitment states except for that of the faulty computer (step S20). Consequently, the commitment state memory unit 1111 of each of the computers except for the faulty computer in the HA group has the contents shown in FIG. 17D.

If all the commitment states stored in the commitment state memory unit 1111 except for that of the faulty computer are "commitment suspension" or "successful commitment" (step S21), the synchronous control unit 1114 of each of the computers except for the faulty computer in the HA group determines the commitment state as "successful commitment" (step S7); if NO in step S21, the commitment state as "commitment failure" (step S8).

In this embodiment, execution of an HA script is inhibited until the commitment states of all the computers except for the faulty computer in the HA group are determined as "commitment suspension" or "successful commitment". By applying this process upon fault detection to the example in FIG. 10, the HA script is executed only when the commitment states of, of the computers 1000A through 1000D, the computers 1000C and 1000D free from any fault are determined as "commitment suspension" or "successful commitment". Accordingly, the application executed by the computer 1000A is correctly taken over by only either one of the computers 1000C and 1000D.

(3) Process in Forming New HA Group

Assume that a new HA group formation request HA event is input to (the synchronous control unit 1114 of the HA script execution mechanism of) a given computer in the HA group. In this case, no communication is performed between the computers. Of the computers 1000A through 1000D, the computer which receives the new HA group formation request HA event initializes all the memory units 1108 through 1111 so as to constitute the HA group with one computer (step S31).

(4) Process in Joining Computer

Figure 12:
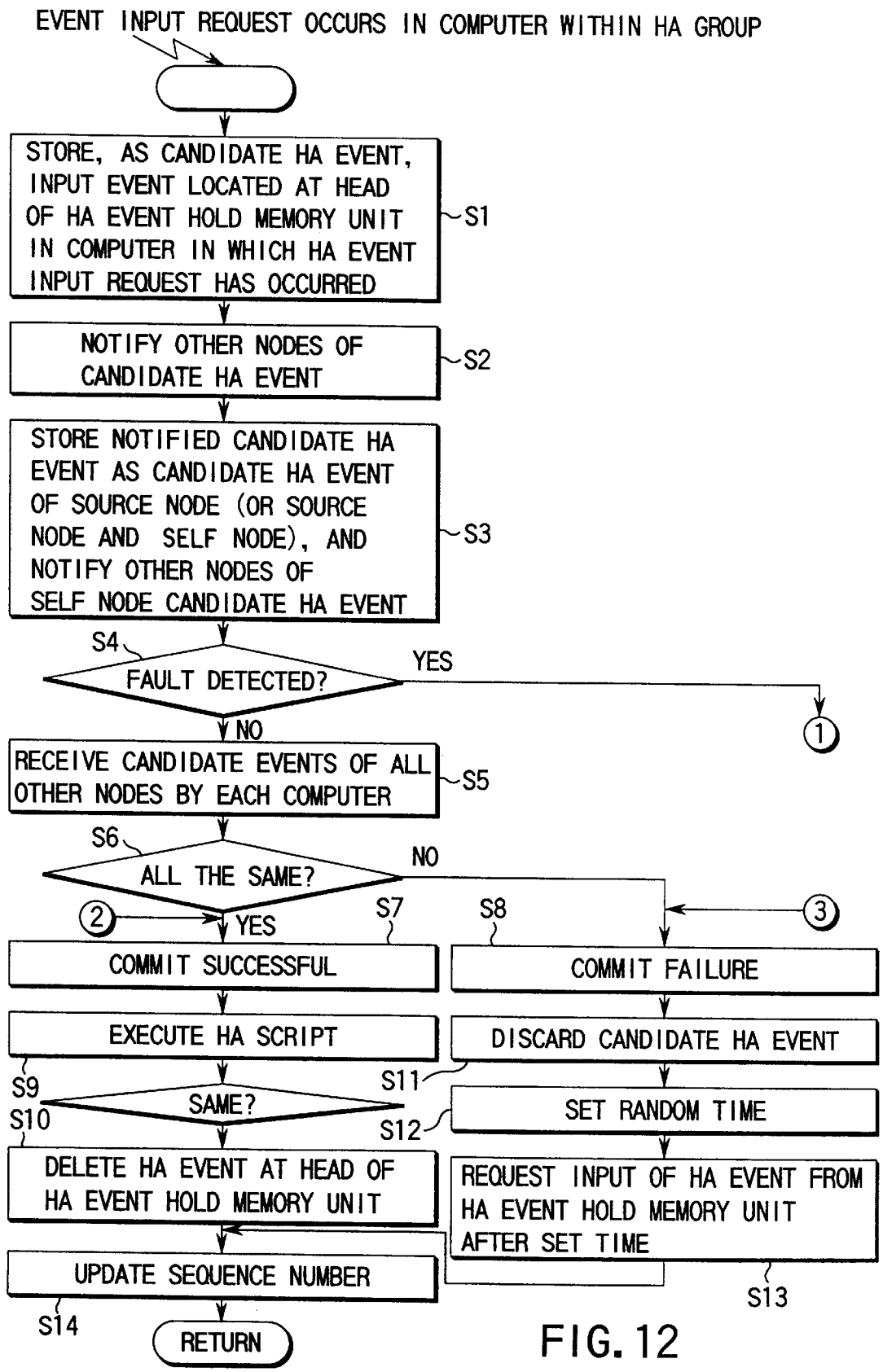
FIG. 12 is a view showing part of a flow chart for explaining an operation in the fourth embodiment when a computer in an HA group receives an HA event except for a new HA group formation event and a computer join/leave event.
Figure 13:
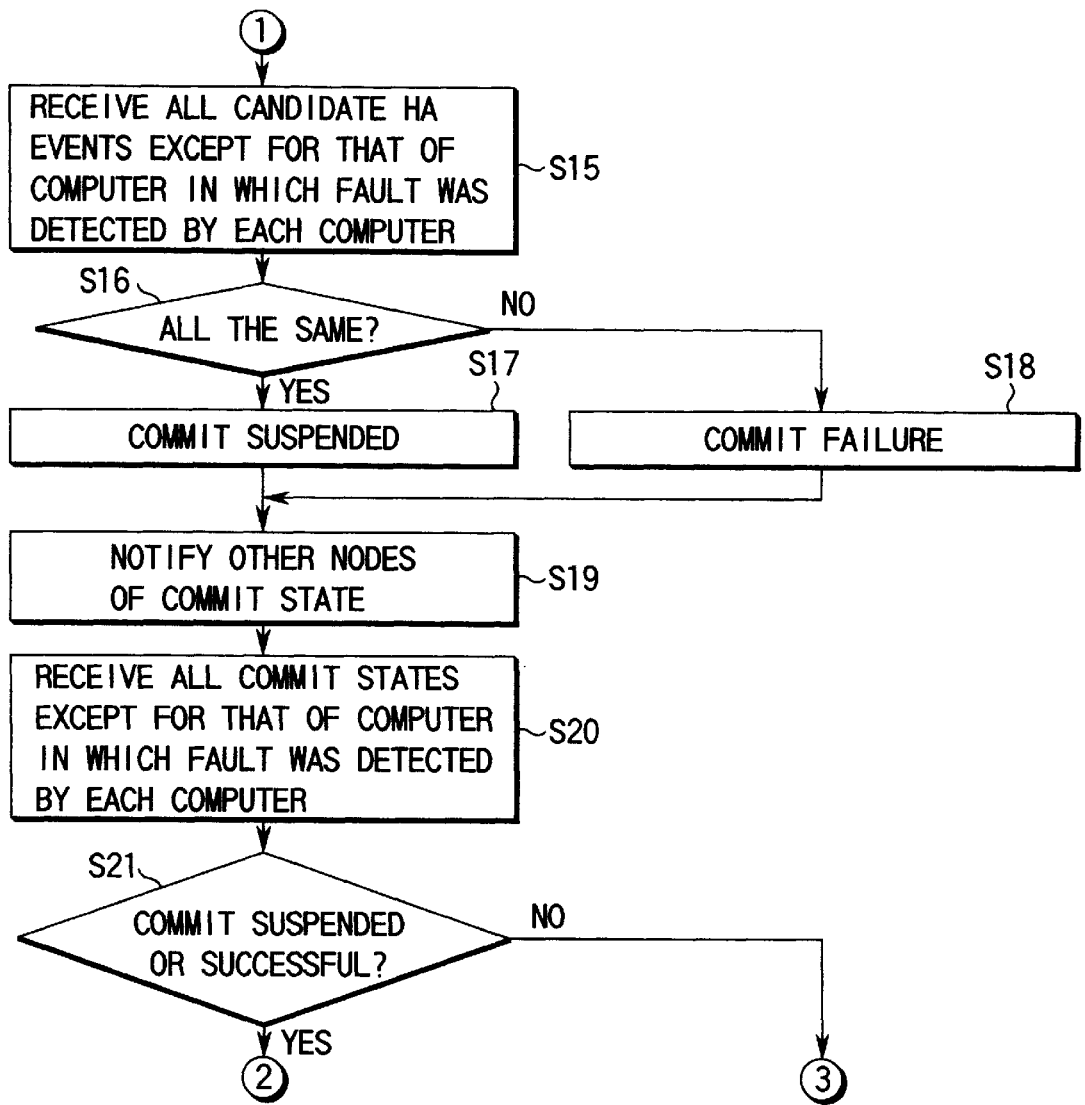
FIG. 13 is a view showing the remaining part of the flow chart for explaining an operation in the fourth embodiment when the computer in the HA group receives an HA event except for a new HA group formation event and a computer join/leave event.
Figure 14:
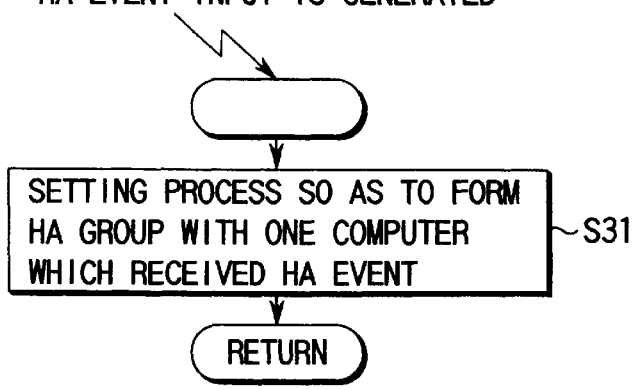
FIG. 14 is a flow chart for explaining an operation in the fourth embodiment when a computer in the HA group receives a new HA group formation request HA event.
Figure 15:
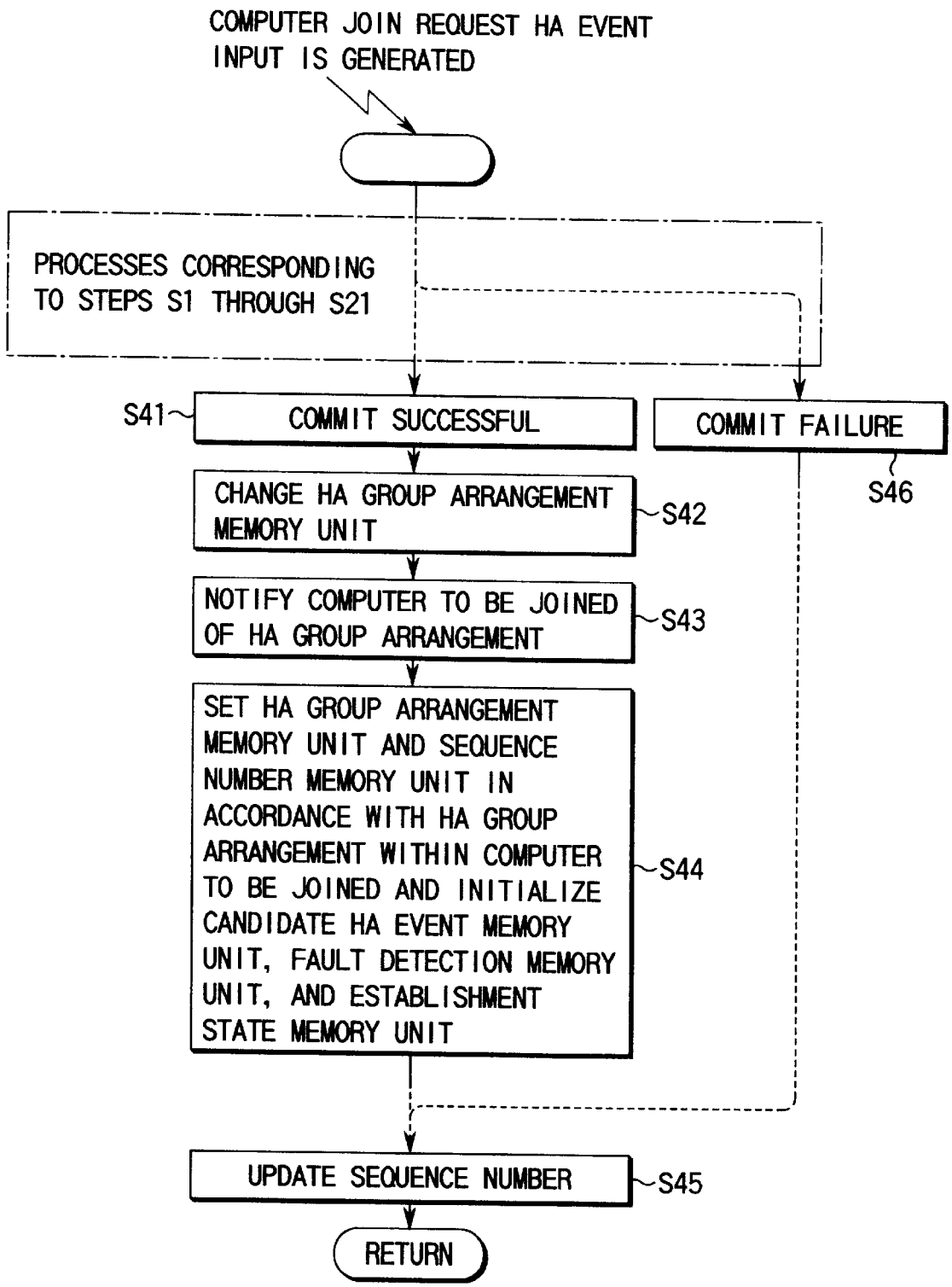
FIG. 15 is a flow chart for explaining an operation in the fourth embodiment when a computer in the HA group receives a join request HA event.
Figure 16:
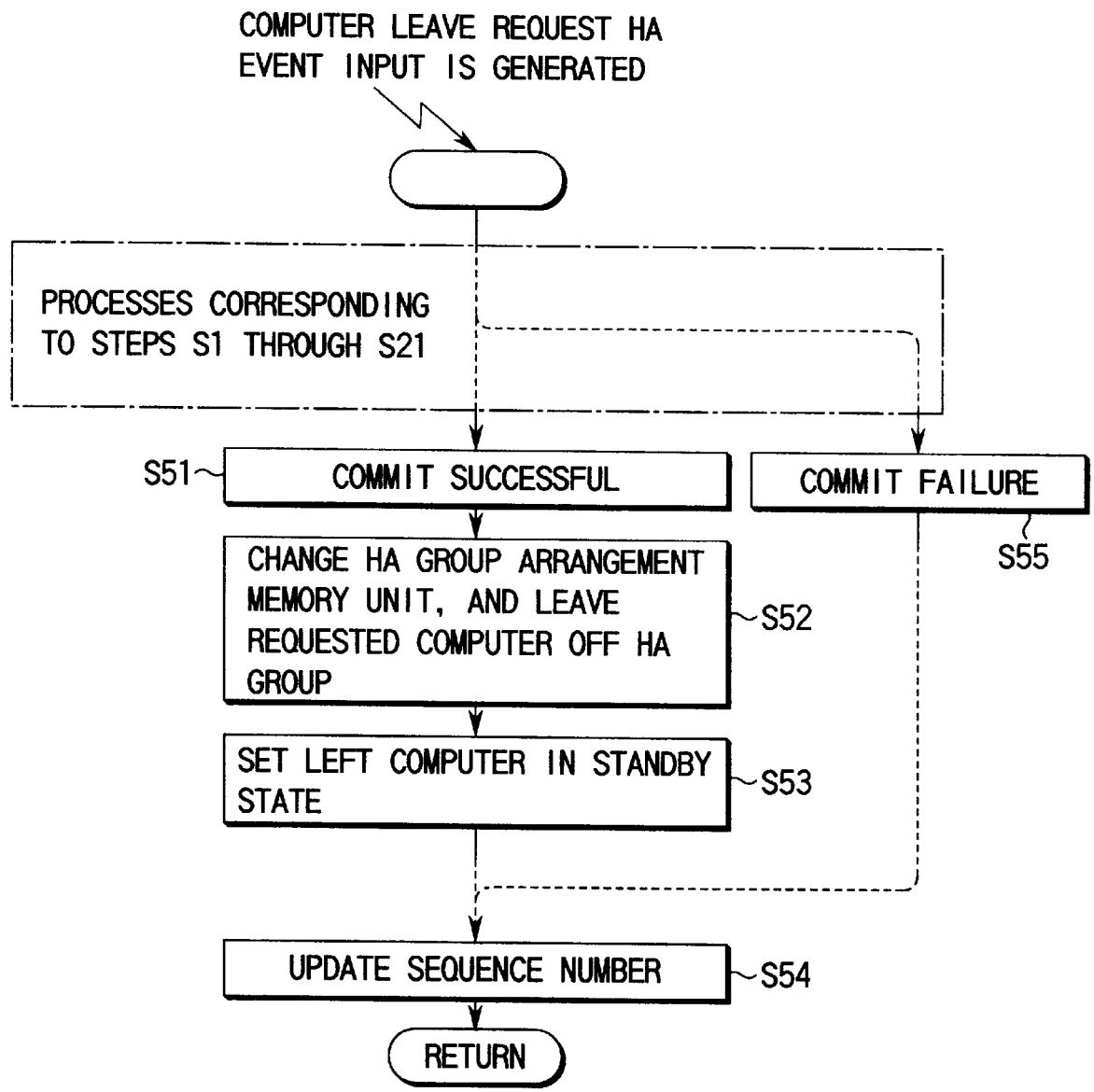
FIG. 16 is a flow chart for explaining an operation in the fourth embodiment when a computer in the HA group receives a leave request HA event.

Assume that a computer join request HA event is input to (the synchronous control unit 1114 of the HA script execution mechanism of) a certain computer in the HA group. In this case, the same processes as those of steps S1 through S21 in the flow charts of FIGS. 12 and 13 are performed. As a result, if commitment of the computer join request HA event succeeds (step S41), (the synchronous control unit 1114) of each of the computer except for the computer to be joined changes the HA group arrangement memory unit 1108 of the self node so as to join the computer requested by the join request HA event in the HA group (step S42), and notifies the computer to be joined of the HA group arrangement (step S43).

Upon reception of this information, the computer to be joined sets information for the HA group arrangement memory unit 1108 and sequence number memory unit 1113 of the self node on the basis of the notified HA group arrangement, and initializes the candidate HA event memory unit 1109, the fault detection memory unit 1110, and the commitment state memory unit 1111 (step S44).

(The synchronous control unit 1114 of) each of the computers in the HA group including the computer requested by the join request HA event increments the sequence number in the sequence number memory unit 1113 by one to wait for input of a next HA event (step S45).

To the contrary, if commitment of the computer join request HA event fails (step S46), (the synchronous control unit 1114 of) each of the computers except for the computer to be joined increments the sequence number in the sequence number memory unit 1113 by one to wait for input of a next HA event (step S45).

(5) Process in Leaving Computer

Assume that a computer leave request HA event is input to (the synchronous control unit 1114 of the HA script execution mechanism of) a given computer in the HA group. In this case, the same processes as those of steps S1 through S21 in the flow charts of FIGS. 12 and 13 are performed. As a result, if commitment of the computer leave request HA event succeeds (step S51), (the synchronous control unit 1114) of each of the computers except for the computer to be left changes the contents (HA group arrangement) of the HA group arrangement memory unit 1108 of the self node to leave the computer requested by the leave request HA event off the HA group (step S52).

The computer to be left stands by until a new HA group formation request HA event is input, or an HA group arrangement for join is received from another node (step S53).

(The synchronous control unit 1114 of) each of the computers in the HA group except for the left computer increments the sequence number in the sequence number memory unit 1113 by one to wait for input of a next HA event (step S54).

To the contrary, if commitment of the computer leave request HA event fails (step S55), (the synchronous control unit 1114 of) each of the computers in the HA group including the computer requested to be left increments the sequence number in the sequence number memory unit 1113 by one to wait for input of a next HA event (step S54).

In this embodiment, the execution order of HA scripts for a plurality of HA events is the same in the HA group, and execution of a next HA script is not started until execution of an HA script for one HA event is complete in the HA group. Therefore, operations for a plurality of HA events can be performed without any contradiction.

Fifth Embodiment

The fifth embodiment of the present invention will be described below with reference to the several views of the accompanying drawing.

Figure 18A:
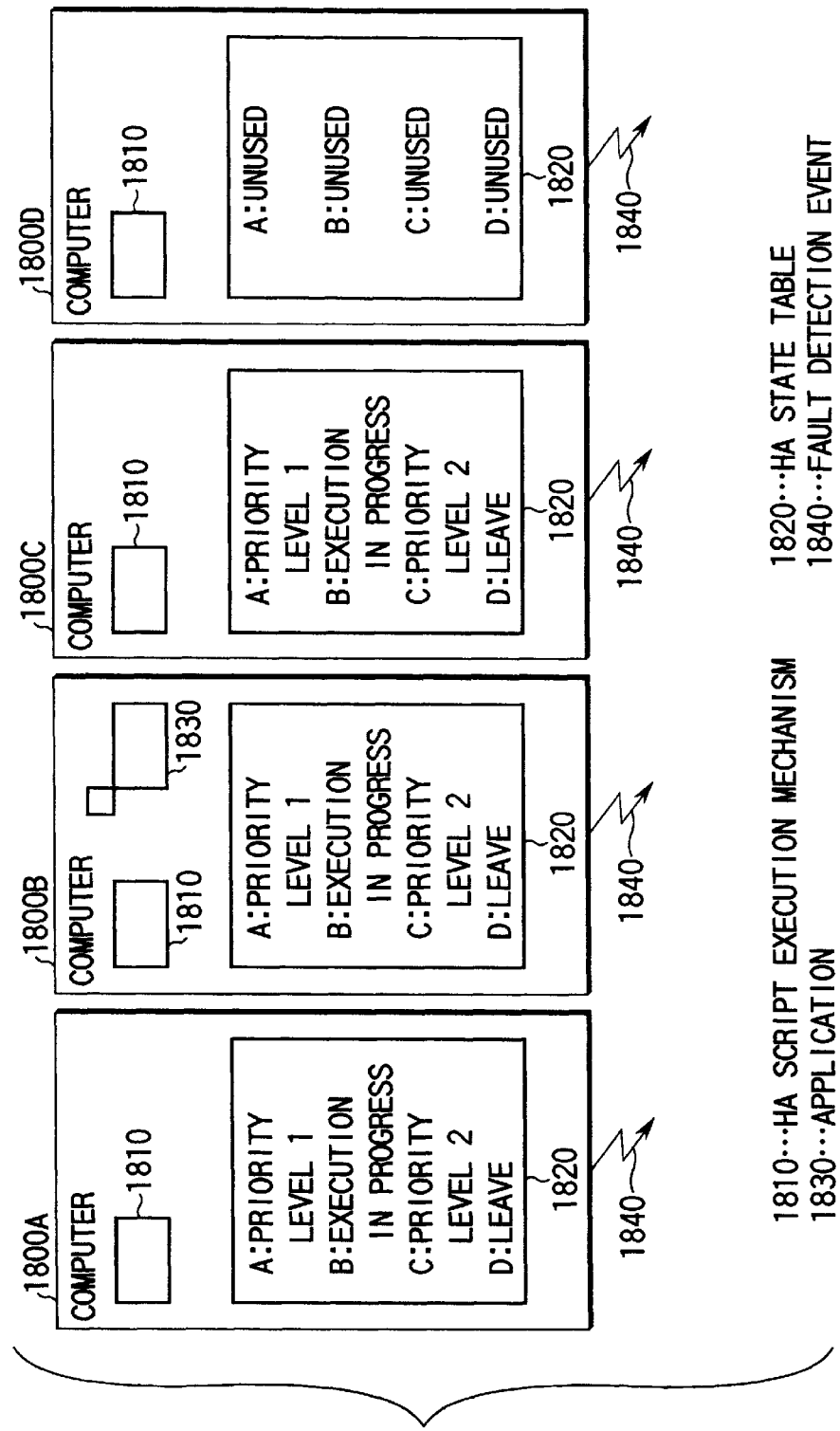
FIGS. 18A through 18C are views for explaining a form in which the application take-over computer is determined in accordance with dynamically changeable priority in a multi-computer system according to the fifth embodiment.
Figure 18B:
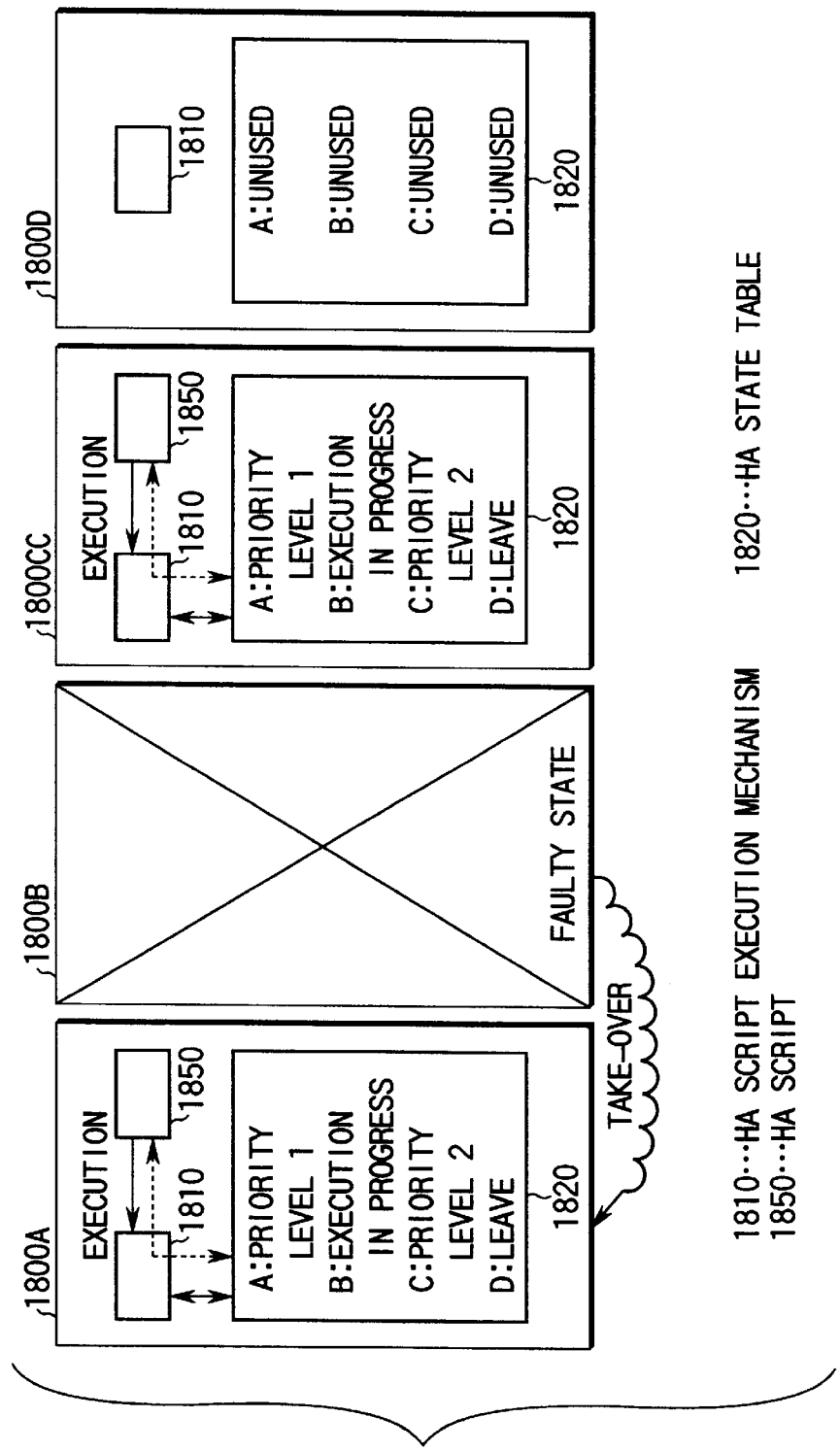
Figure 18C:
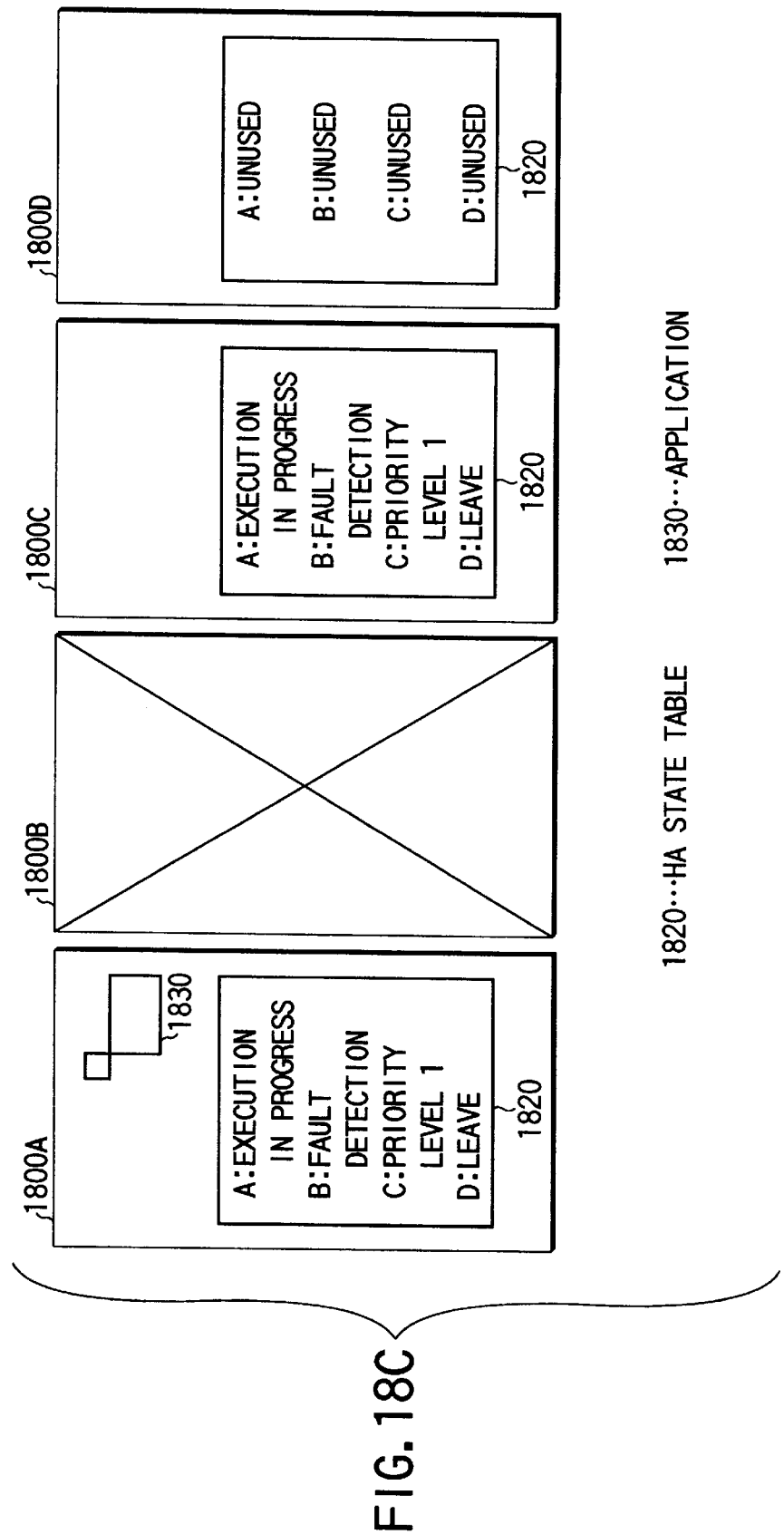

FIGS. 18A through 18C are views for explaining a form in which the application take-over computer is determined in accordance with dynamically changeable priority in a multi-computer system. This embodiment assumes a multi-computer system constituted by four computers 1800A, 1800B, 1800C, and 1800D.

Each of the computers 1800A, 1800B, 1800C, and 1800D has an HA script execution mechanism 1810 having the same arrangement as that in FIG. 11 described in the fourth embodiment, and in addition an HA state table 1820 which stores the states (application take-over priority levels, and the like) of the computers 1800A through 1800D in the HA group. The states of the computers 1800A through 1800D in the HA group which are stored in the HA state table 1820 include "execution in progress" representing that an application is being executed in the HA group, "priority level 1" through "priority level 4" (a smaller numerical value has higher priority) representing the application take-over priority in the HA group (when a fault occurs in a computer during execution), "fault detection" representing detection of a fault, and "leave" representing that a computer is left off the HA group.

An HA state table reference description usable in the system and services descriptions of an HA scenario, HA state table update descriptions present in the system and service descriptions of the HA scenario, and HA state table reference and update commands usable in an HA script are prepared.

The HA script execution mechanism 1810 has a function (HA state table distribution function) of distributing the contents of the HA state table 1820 to a joined computer in joining the computer, and a function (HA state table initialization function) of initializing the contents of the HA state table 1820 in forming a new HA group.

To update the HA state table 1820, (the system and service descriptions in) the HA scenario (corresponding to the HA scenario 110 in the first embodiment) includes an HA state table update description 1900 like the one shown in FIG. 19. Since all the HA state tables (1820) in the HA group are similarly updated, the HA state table update description 1900 is shared and described independently of the computers.

"get s=state (outcpu)" in the HA state table update description 1900 is an HA state table reference command 1901 instructing to get as a variable s the state of a computer ("outcpu") having an error detected in the HA group with reference to the HA state table.

"get t=state (host)" is an HA state table reference command 1902 instructing to get the state of the computer ("host") in the HA group as a variable t for the computers 1800A through 1800D represented by "host=cpu1 through cpu4".

The HA state table update description 1900 includes HA state table update command groups 1911 through 1915 (some of which are not shown in FIG. 19) designating how to update the state of the HA state table 1820 of a computer represented by "host" depending on whether the state s of the faulty computer ("outcpu") in the HA group that is acquired in accordance with the reference commands 1901 and 1902 represents "execution in progress", "priority level 1", "priority level 2", "priority level 3", or "priority level 4".

The HA state table update command groups 1911 through 1915 are a set of HA state table update commands for determining the state of the HA state table 1820 of the computer indicated by "host" in accordance with the state t of the computer ("host") in the HA group that is acquired in accordance with the reference commands 1901 and 1902. For example, when the state of the faulty computer ("outcpu") is "execution in progress", the HA state table update command group 1911 designates the state of the computer indicated by "host" as "fault detection" if the current state of the computer indicated by "host" is "execution in progress", as "execution in progress" for "priority level 1" (in order to take over an application), as "priority level 1" for "priority level 2", as "priority level 2" for "priority level 3", or as "priority level 3" for "priority level 4". Similarly, the remaining HA state table update command groups 1912 through 1915 designate the state of the computer indicated by "host" as "fault detection" if the state of the faulty computer ("outcpu") coincides with the state of the computer indicated by "host", and if not so, the state of the computer indicated by "host" at a level higher by one than the current state of the faulty computer.

The HA scenario includes a service description 2000 (corresponding to the service description 113 in the first embodiment) like the one shown in FIG. 20. This service description 2000 describes a process upon fault detection.

"syncaction (cpu1|cpu2|cpu3|cpu4, TakeOver1|TakeOver2|TakeOver3|TakeOver4)" in FIG. 20 describes a processing computer and a take-over request event to be processed by the computer, and is shared by the four computers "cpu1" through "cpu4" and the four events "TakeOver1" through "Takeover4", i.e., a total of 4×4=16 combinations.

"set outcpu=event.cpu" is a description portion for setting a computer ("event.cpu") having a fault detected as a variable "outcpu".

"get s=state (event.cpu)" is an HA state table reference command 2001 instructing to get and set as a variable s the state of the faulty computer ("event.cpu") in the HA state table.

A description 2002 starting from "if (s=="execution in progress")" describes a process depending on the state of the self node ("localcpu") of one of "cpu1" through "cpu4" when the state of the HA state table indicated by the variable s, i.e., the state of the faulty computer ("event.cpu") in the HA state table is "execution in progress". This description 2002 includes an HA state table reference command 2003 instructing to get the state in the self-node HA state table as the variable t.

Assume that, of the computers 1800A through 1800D, only the computer 1800D is out of the HA group in the multi-computer system of FIGS. 18A through 18C, as shown in FIG. 18A.

In this state, the contents of all the HA state tables 1820 (storing the take-over priorities of the computers 1800A through 1800D in the system, and the like) arranged in the computers 1800A through 1800C within the HA group are controlled to be the same, as shown in FIG. 18A. More specifically, in joining a computer in the HA group, each computer in the HA group distributes the contents of its HA state table 1820 to the joining computer in order to hold the same contents in the HA state table 1820 of this computer as those of the HA state table 1820 of each computer in the HA group. This is performed as part of the join process along with the computer join request HA event.

As is apparent from the contents of the HA state tables 1820 on the computers 1800A through 1800C, assume that the computer 1800B is executing an application 1830, and the application take-over priority is set such that the computer 1800A has priority level 1, and the computer 1800C priority level 2. The contents of the HA state table 1820 are referred to and updated along with execution of an HA script as needed.

Assume that a fault detection event 1840 with respect to the computer 1800B (executing the application 1830) has occurred in the computers 1800A, 1800C, and 1800D, as shown in FIG. 18A.

Of the computers 1800A, 1800C, and 1800D, the HA script execution mechanisms 1810 of the computers 1800A and 1800C in the HA group execute an HA script 1850 for the fault detection event 1840 with respect to the computer 1800B, as shown in FIG. 18B.

In this embodiment, since the application take-over priority is set such that the computer 1800A has priority level 1, and the computer 1800C has priority level 2, the application 1830 executed by the computer 1800B is taken over by the computer 1800A, as shown in FIG. 18C. The contents of the HA state tables 1820 on the computers 1800A and 1800C are updated to set the computer 1800A in "execution in progress". The priority of the computer 1800C is updated from priority level 2 to priority level 1. The faulty computer 1800B is left off the HA group, and the state of the computer 1800B in the HA state tables 1820 on the computers 1800A and 1800C is updated from "execution in progress" to "fault detection".

In this embodiment, the application take-over computer upon occurrence of a fault detection event (i.e., operation contents upon occurrence of an HA event) can be determined (changed) depending on the state of (each computer in) the HA group which is represented by the HA state table 1820.

The above description concerns the case wherein only one HA group exists in the system. However, a plurality of HA groups which do not overlap each other (i.e., a plurality of HA groups having no shared computer as a constituent element) can be set.

Figure 21:
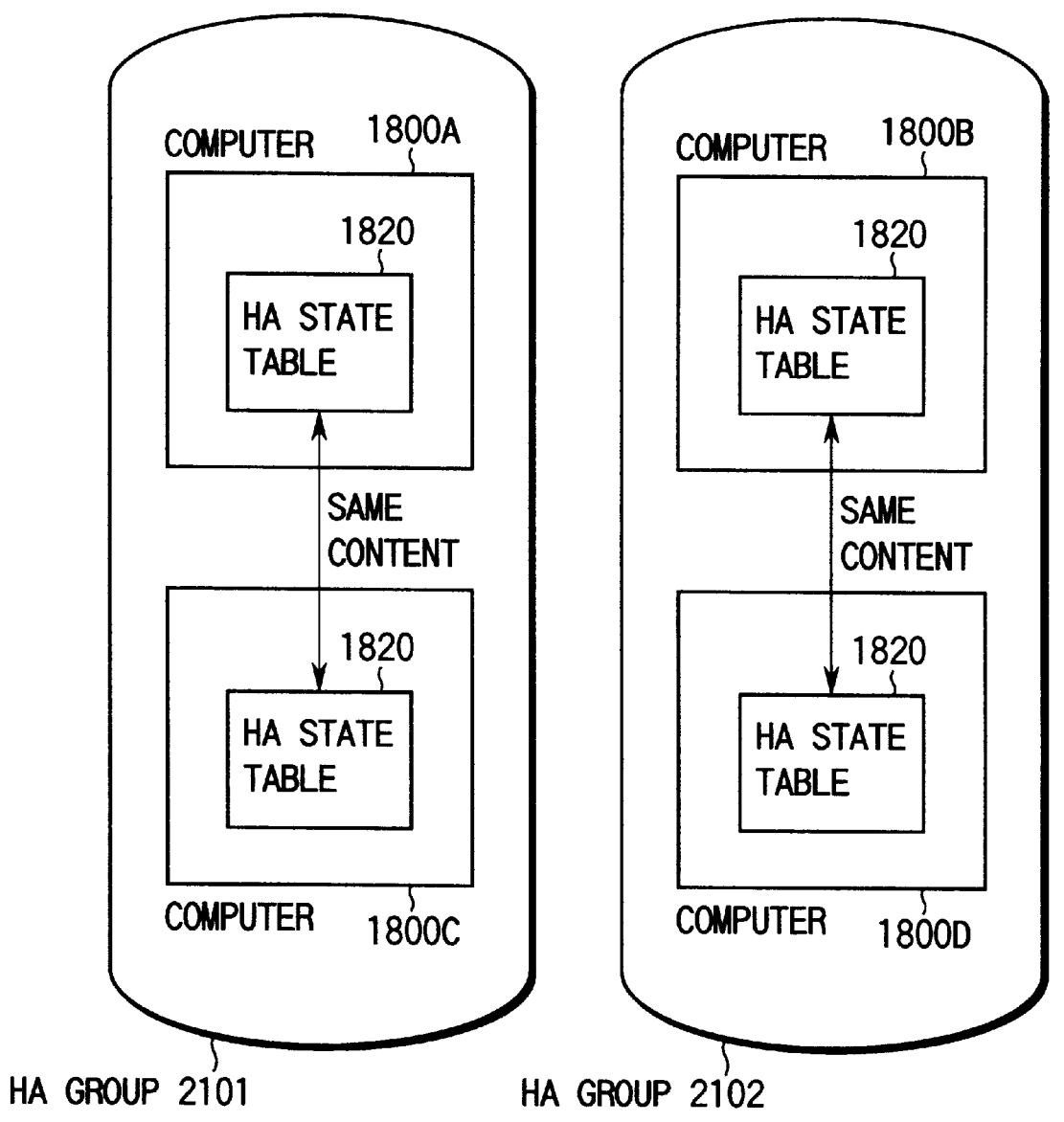
FIG. 21 is a view for explaining setting of a plurality of HA groups in the fifth embodiment.

FIG. 21 shows an example wherein the computers 1800A and 1800C constitute one HA group 2101, and the computers 1800B and 1800D constitute another HA group 2102 in the system of FIGS. 18A through 18C.

In the HA group arrangement like the one shown in FIG. 21, the contents of the HA state tables 1820 in the HA groups 2101 and 2102 can be independently updated, and the operation contents upon occurrence of an HA event can be determined depending on the states of the HA groups which are different from each other.

Sixth Embodiment

The sixth embodiment of the present invention will be described below with reference to the several views of the accompanying drawing.

Figure 22:
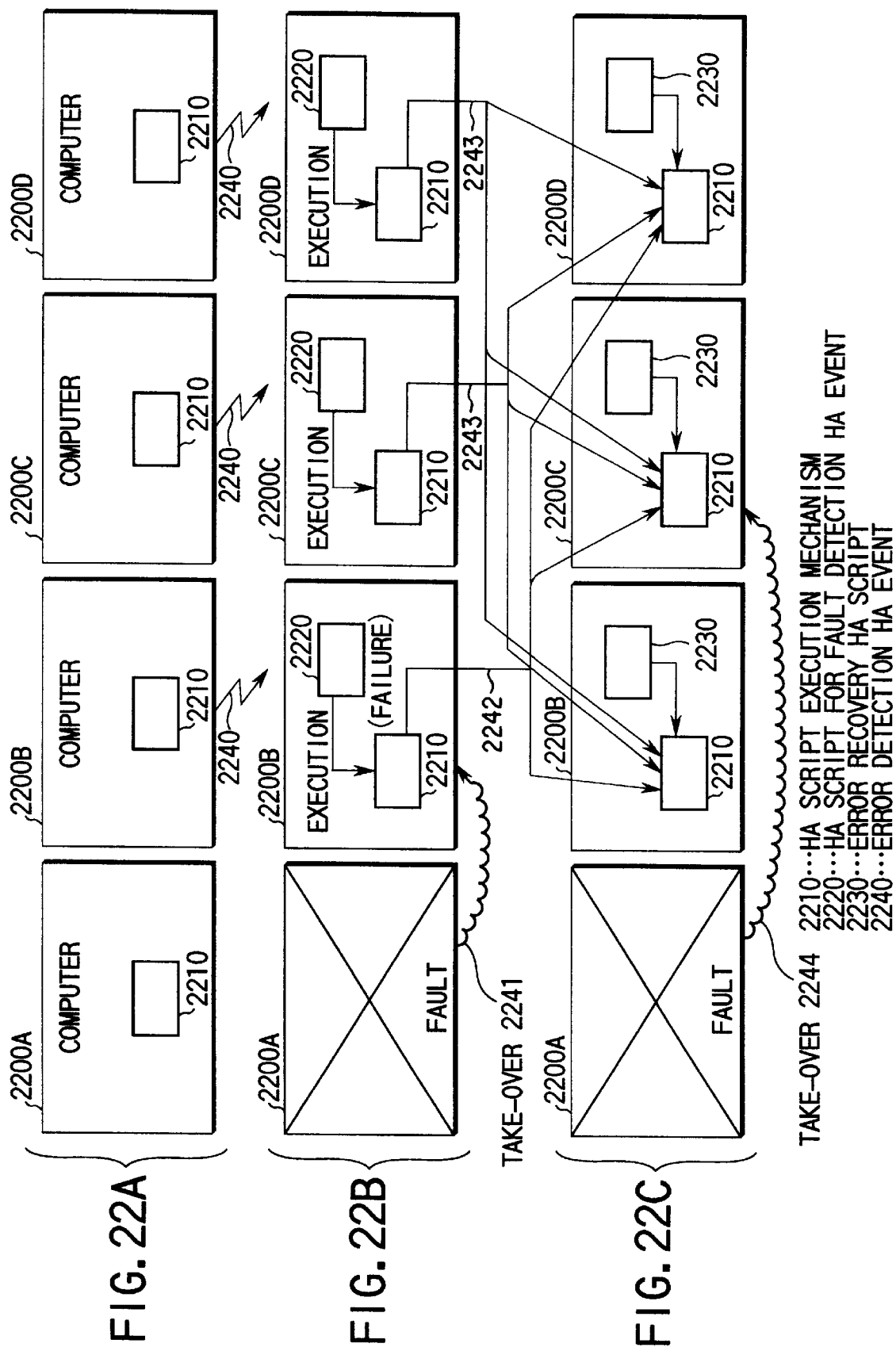
FIGS. 22A through 22C are views for explaining a form in which the process can be recovered from an error upon occurrence of an HA event in a multi-computer system according to the sixth embodiment of the present invention.

FIGS. 22A through 22C are views for explaining a form in which a process can be recovered from an error upon occurrence of an HA event in a multi-computer system.

In FIGS. 22A through 22C, each of computers 2200A through 2200D comprises an HA script execution mechanism 2210 having the same arrangement as that in FIG. 11 described in the fourth embodiment. This HA script execution mechanism 2210 has a function of executing an error recovery HA script 2230 when an HA script for an HA event (e.g., an HA script 2220 for a fault detection HA event 2240) ends, then the end state is sent within the HA group, and all the end states of other necessary nodes are received. The end state of the HA script includes four types of states: a state (normal state) representing that the HA script has normally ended, a state (abnormal end) representing that the HA script has abnormally ended, a state (fault detection) representing that a fault has occurred in a computer, and a state (HA group leave) representing that the computer is out of the HA group.

An error recovery process description portion is prepared in each of the system and service descriptions of an HA scenario applied in this embodiment. This error recovery process description portion can describe a command for obtaining the end state of the HA script for the HA event (the HA script has ended in each computer normally or abnormally, a fault has occurred in a computer, or the computer is out of the HA group).

Figure 23:
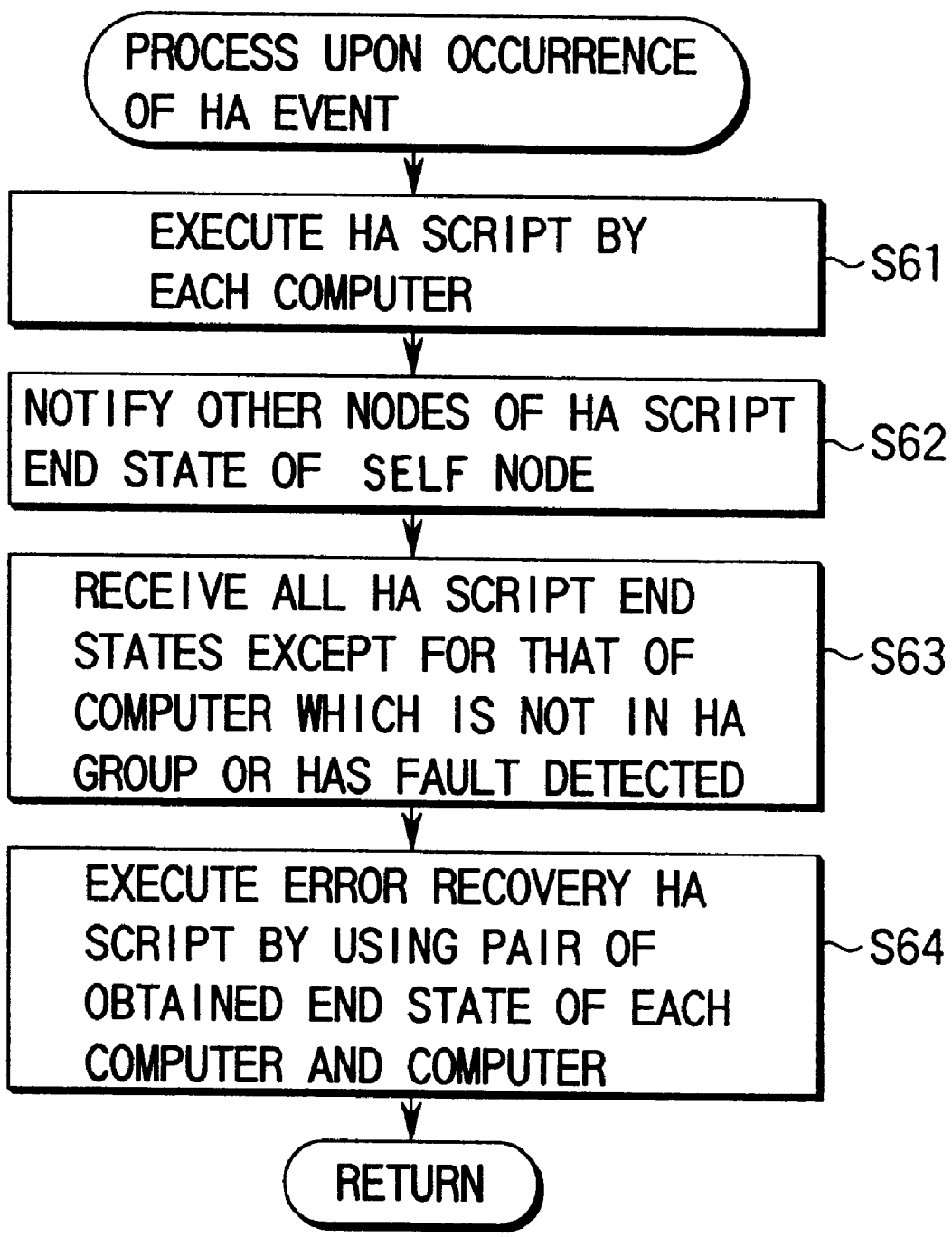
FIG. 23 is a flow chart for explaining the basic operation of each computer in the sixth embodiment.

The basic operation of each computer in the system of FIGS. 22A through 22C will be explained with reference to a flow chart in FIG. 23.

In the system of FIGS. 22A through 22C, if any HA event occurs, a corresponding HA script is executed by an HA script execution mechanism 2210 in each computer, e.g., each of the computers 2200A through 2200D (except for a computer having a fault detected in the case of a fault detection HA event) (step S61).

Upon completion of execution of the HA script, the HA script execution mechanism 2210 notifies other nodes of the HA script end state of the self node (step S62).

The HA script execution mechanism 2210 waits for notification of the HA script end states of all the computers except for the computer which is not in the HA group, or has the fault detected (step S63).

Upon reception of the HA script end states of all the computers except for the computer which is not in the HA group, or has the fault detected, the HA script execution mechanism 2210 executes the error recovery HA script 2230 by using pairs of the received end states (normal end, abnormal end, fault detection, or HA group leave) and the computers as arguments (step S64). In step S64, a proper error process is selected and executed in accordance with the error recovery HA script 2230. When the HA script executed on the basis of the generated HA event normally ends in the HA group, substantially no process is performed though the error recovery HA script 2230 itself is executed.

A detailed example of error recovery will be explained by exemplifying a case wherein a fault has occurred in the computer 2200A.

Assume that the computers 2200A through 2200D are present in the HA group. Assume that a fault occurs in the computer 2200A in this state, and as a result, the fault detection HA event 2240 with respect to the computer 2200A occurs in the remaining computers 2200B through 2200D within the HA group, as shown in FIG. 22A.

The HA script execution mechanism 2210 in each of the computers 2200B through 2200D executes the HA script 2220 for the fault detection HA event 2240, as shown in FIG. 22B.

This embodiment assumes that an HA scenario describes that an application operating in the computer 2200A is taken over by the computer 2200B. In this case, upon execution of the HA script 2220, the computer 2200B is originally to take over the application operating in the computer 2200A. However, this embodiment assumes that execution of the HA script 2220 by the computer 2200B has abnormally ended, and take-over 2241 by the computer 2200B has failed, as shown in FIG. 22B.

When the take-over 2241 by the computer 2200B fails, the computer 2200B sends an abnormal end notification 2242 of the HA script (2220) to other nodes, as shown in FIG. 22B. If execution of the HA script 2220 normally ends in the computers 2200C and 2200D, the computers 2200C and 2200D send normal end notification 2243 of the HA script (2220) to other nodes, as shown in FIG. 22B.

After obtaining the HA script end states of all the computers except for the faulty computer 2200A, (the HA script execution mechanism 2210 in) each of the computers 2200B through 2200D executes the error recovery HA script 2230 by using pairs of the obtained end states and the computers as arguments, as shown in FIG. 22C.

Assume that the HA scenario describes that error recovery is performed by taking over the application by the computer 2200C if take-over by the computer 2200B fails. In this case, (the HA script execution mechanism 2210 in) the computer 2200C executes the error recovery HA script 2230 to obtain information indicating that the HA script in the computer 2200B has abnormally ended, and executes take-over 2244 of the application operating in the faulty computer 2200A, as shown in FIG. 22C.

Seventh Embodiment

The seventh embodiment of the present invention will be described below with reference to the several views of the accompanying drawing.

Figure 24:
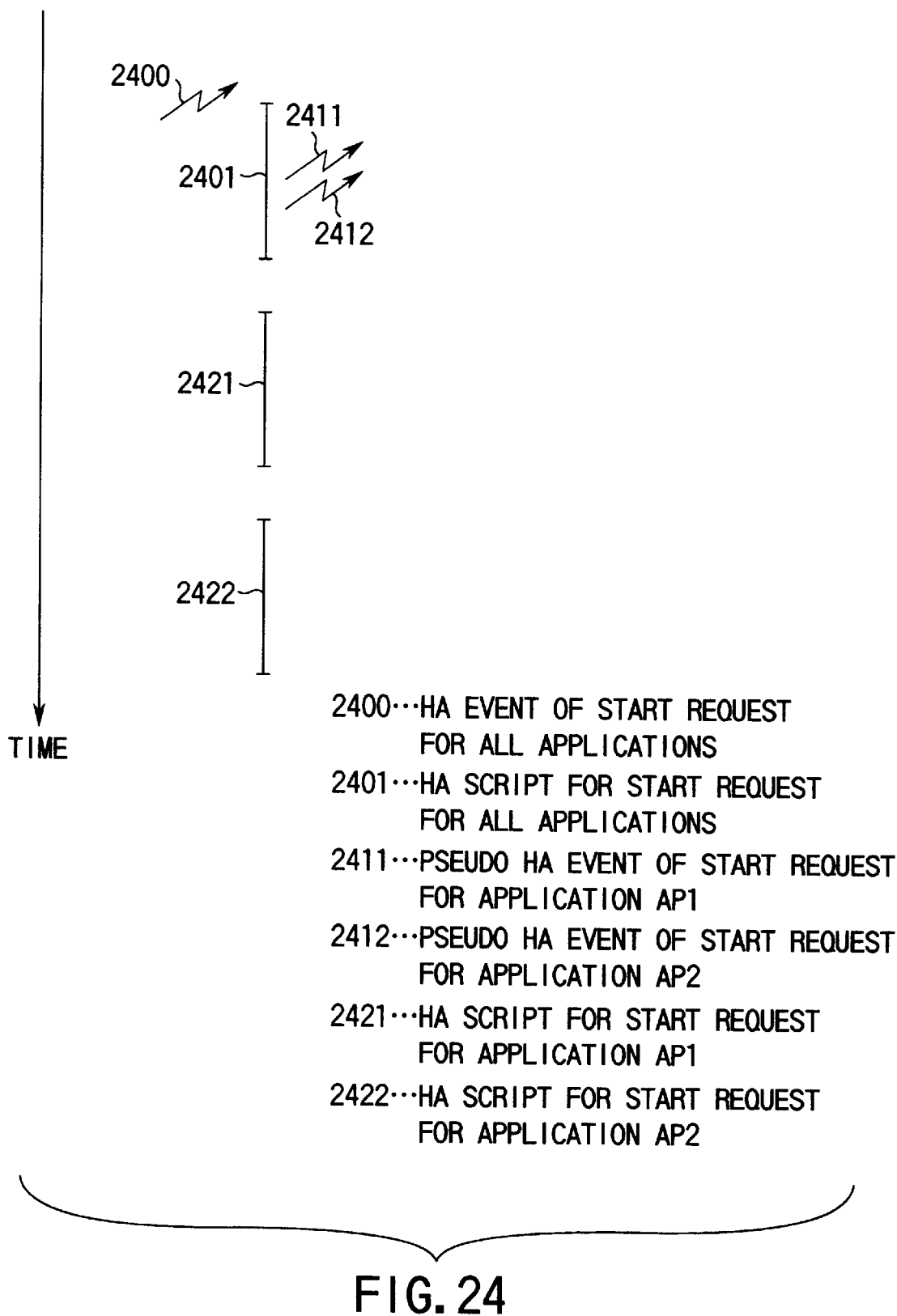
FIG. 24 is a view for explaining a form in which a plurality of HA scripts can be executed upon occurrence of one HA event by generating a pseudo HA event as part of an HA script process in a multi-computer system according to the seventh embodiment of the present invention.

FIG. 24 is a view for explaining a form in which a plurality of HA scripts can be executed owing to one HA event by generating a pseudo HA event as part of an HA script process in a multi-computer system.

Each computer constituting this system has an HA script execution mechanism (not shown) having the same arrangement as that in FIG. 11 described in the fourth embodiment. This HA script execution mechanism has a function of accepting a generated pseudo HA event prior to a normal HA event.

In this system, a pseudo HA event generation description usable in the system and service descriptions of an HA scenario, and a pseudo HA event generation command usable in an HA script (corresponding to this pseudo HA event generation description) are prepared.

In this system, when an HA event occurs, and an HA script for this HA event is executed by each computer, a pseudo HA event is generated in accordance with the pseudo HA event generation command. Consequently, upon completion of execution of the HA script, an HA event for the pseudo HA event generated during execution of the HA script is executed.

A detailed example of generation of the pseudo HA event will be explained with reference to FIG. 24.

Assume that, in an HA scenario applied in this embodiment, application start requests are defined as separate HA events for each service description, and start of an application can be independently instructed. The HA scenario describes HA events of start requests for all applications such that the HA events are generated as pseudo HA events. Assume that a command for generating pseudo HA events 2411 and 2412 for start requests for applications AP1 and AP2 is prepared in an HA script 2401 for an HA event 2400 of start requests for all the applications (AP1 and AP2), and that HA scripts 2421 and 2422 for the pseudo HA events 2411 and 2412 are prepared.

In this system, when the HA event 2400 of the start request for all the applications is generated, the HA script 2401 for the HA event 2400 is executed to generate the pseudo HA events 2411 and 2412 of the start requests for the applications AP1 and AP2.

Upon completion of execution of the HA script 2401 for the HA event 2400 of the start request for all the applications, the HA script 2421 for an application AP1 start request generated first as the pseudo HA event 2411 in the HA script 2401 is executed.

When the HA script 2421 for this application AP1 start request is complete, the HA script 2422 for an application AP2 start request generated as the pseudo HA event 2412 is executed. Then, the HA script 2422 for the application AP2 start request ends.

The case wherein a pseudo HA event of an application start request is generated has been described as an example of generating a pseudo HA event as part of the HA script process. However, the present invention is not limited to this. For example, a normal application switch-over request can be generated as an application stop request, and a pseudo HA event of each start request, which can be realized by being described in the HA scenario.

Eighth Embodiment

The eighth embodiment in which a normal application switch-over request is generated as an application stop request, and a pseudo HA event of each start request, will be described with reference to FIG. 25.

Figure 25:
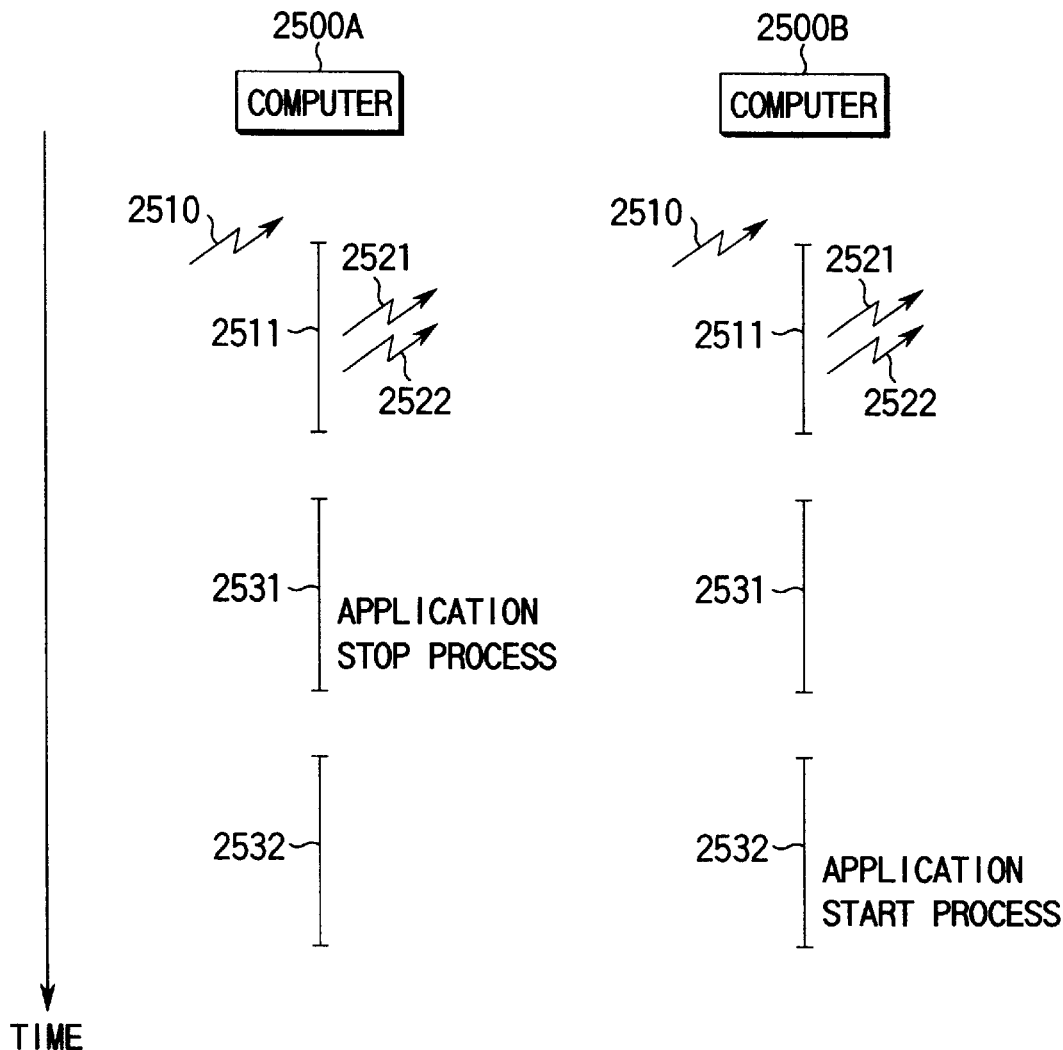
FIG. 25 is a view for explaining a form in which a normal application switch-over request is generated as pseudo HA events of application stop and start requests in a multi-computer system according to the eighth embodiment of the present invention.

FIG. 25 shows an example of application switch-over from a computer 2500A to a computer 2500B. Assume that a switch-over HA event 2510 occurs in the computers 2500A and 2500B, and an HA script 2511 for the HA event 2510 is executed. In this HA script 2511, a pseudo HA event 2521 of a stop request for an application in the computer 2500A, and a pseudo HA event 2522 of a start request for an application in the computer 2500B are sequentially generated.

Upon completion of execution of the switch-over HA script 2511, an HA script 2531 for a stop request of the application in the computer 2500A that is first generated as the pseudo HA event 2521 in the HA script 2511 is executed.

When the HA script 2531 for the stop request of application in the computer 2500A is complete, an HA script 2532 for a start request of the application in the computer 2500B that is generated as the pseudo HA event 2522 is executed. Then, the HA script 2532 for the start request of the application in the computer 2500B ends.

In this embodiment, an HA scenario can be easily formed by sharing a switch-over process, and process for start and stop requests.

Since the switch-over process is divided into processes for two HA events (2521 and 2522), start of a start process upon completion of a stop process is warranted.

The seventh and eighth embodiments in which a pseudo HA event is generated as part of an HA script process have been described above. If the technique generating a pseudo HA event from an HA script is applied to the sixth embodiment, and a pseudo HA event is also generated from an error recovery HA script, error recovery can be realized even when error recovery fails.

Ninth Embodiment

The ninth embodiment in which, even when error recovery fails, error recovery can be enabled by generating a pseudo HA event also from an error recovery HA script will be described with reference to FIGS. 26 and 27.

The ninth embodiment is different from the sixth embodiment in that an application take-over request is generated as a pseudo HA event from an error recovery HA script. The fundamental process combines the process flows applied in the sixth and seventh embodiments.

Figure 26:
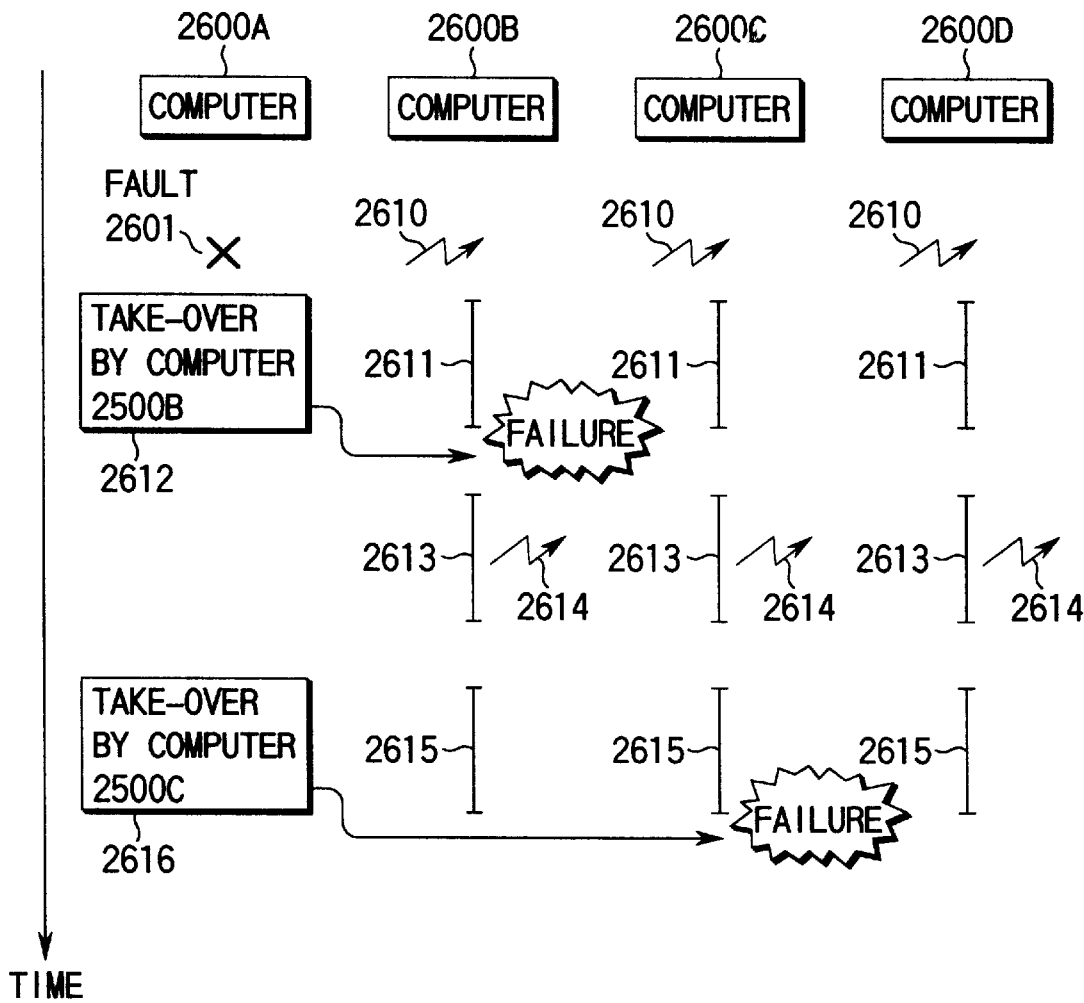
FIG. 26 is a view showing some of state transition views for explaining a form in which, even when error recovery fails, a pseudo HA event is generated also from an error recovery HA script to enable error recovery in a multi-computer system according to the ninth embodiment of the present invention.
Figure 27:
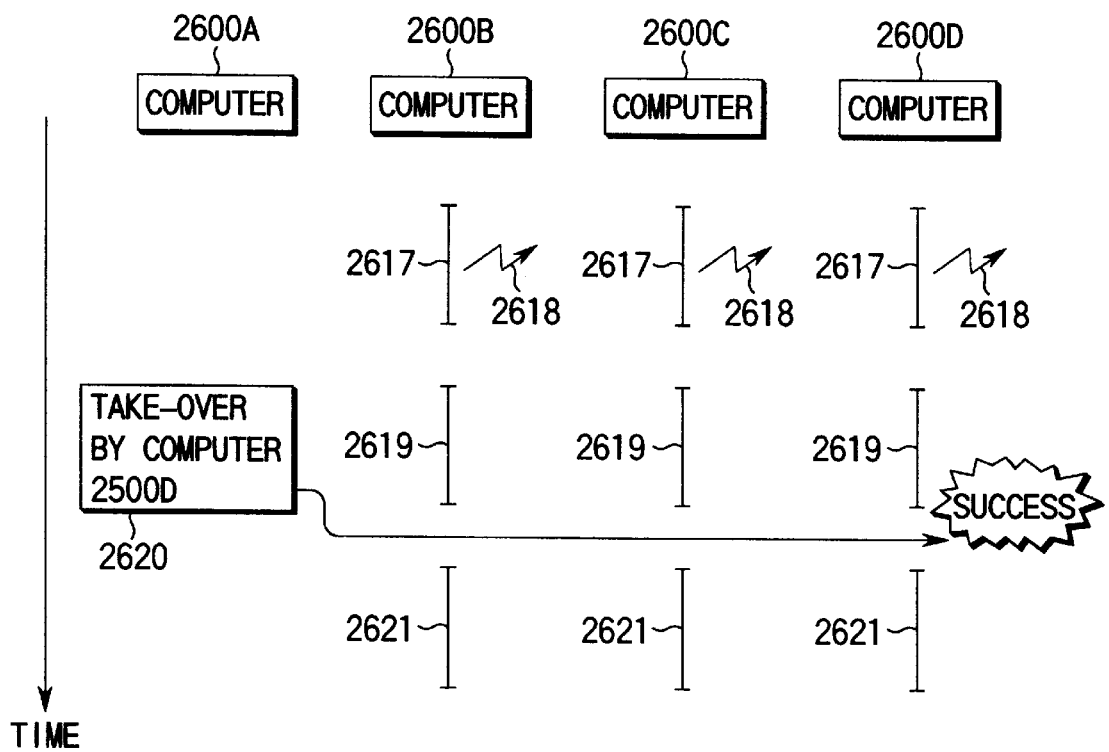
FIG. 27 is a view showing the remaining state transition views for explaining the form in which, even when error recovery fails, a pseudo HA event is generated also from the error recovery HA script to enable error recovery in the multi-computer system according to the ninth embodiment of the present invention.

An example of FIGS. 26 and 27 assumes that computers 2600A through 2600D (corresponding to the computers 2200A through 2200D in the sixth embodiment) are in an HA group, and as a result of occurrence of a fault 2601 in the computer 2600A, a fault detection HA event 2610 with respect to the computer 2600A has occurred in the remaining computers 2600B through 2600D within the HA group.

When the fault detection HA event 2610 with respect to the computer 2600A occurs in the computers 2600B through 2600D, an HA script 2611 for the fault detection HA event 2610 is executed by the computers 2600B through 2600D, as shown in FIG. 26. This HA script 2611 describes that an application operating in the computer 2600A (computer having name "A") is to be taken over by the computer 2600B (computer having name "B"). Assume that execution of the HA script 2611 in the computer 2600B has abnormally ended, and take-over 2612 to the computer 2600B has failed, like the example in FIG. 26.

Assume that a pseudo HA event 2614 of take-over (take-over request upon occurrence of a fault) by the computer 2600C (computer having name "C") has occurred in an error recovery HA script 2613. In this case, upon completion of execution of the error recovery HA script 2613, the computers 2600B through 2600D execute an HA script 2615 for take-over by the computer 2600C that occurred as the pseudo HA event 2614 within the HA script 2613.

The HA script 2615 describes that the application operating in the computer 2600A is to be taken over by the computer 2600C. Assume that execution of the HA script 2615 in the computer 2600C has abnormally ended, and take-over 2616 to the computer 2600C has failed, as shown in FIG. 26.

When the take-over 2616 to the computer 2600C fails, the computer 2600C notifies other nodes of the abnormal end of the HA script (2615). If execution of the HA script 2615 normally ends in the computers 2600B and 2600D, the computers 2600B and 2600D notify other nodes of the normal end of the HA script (2615).

When the computers 2600B through 2600D obtain the HA script end states of all the computers except for the faulty computer 2600A, they execute an error recovery HA script 2617 for take-over by the computer 2600C by using pairs of the obtained end states and the computers as arguments, as shown in FIG. 27.

Assume that a pseudo HA event 2618 of take-over by the computer 2600D (computer having name "D") has occurred in the error recovery HA script 2617. In this case, upon completion of execution of the error recovery HA script 2617, the computers 2600B through 2600D execute an HA script 2619 for take-over by the computers 2600D that occurred as the pseudo HA event 2618 within the HA script 2617.

The HA script 2619 describes that the application operating in the computer 2600A is to be taken over by the computer 2600D. Assume that take-over 2620 to the computer 2600D has succeeded because execution of the HA script 2619 in the computer 2600D has normally ended, as shown in FIG. 27. In this case, although the computers 2600B through 2600D execute an error recovery HA script 2621 for take-over by the computer 2600D, substantially no process is performed because the take-over 2620 to the computer 2600D has been successful.

The seventh through ninth embodiments in which a pseudo HA event is generated in an HA script have been described above. In this case, a pseudo HA event occurs in synchronism with occurrence of an HA event. If one HA event occurs, a series of HA scripts are sequentially executed. Therefore, if an endless loop of pseudo HA events exists, execution of a series of HA scripts permanently fails to stop.

This problem arises from the way of writing an HA scenario. This inconvenience cannot be detected by a conventional compiler technique (e.g., syntax analysis). Also in many case, no inconvenience is experienced until a fault occurs after starting the operation because no symptom appears until a corresponding HA event occurs.

10th Embodiment

The 10th embodiment in which an HA scenario compiler (corresponding to the HA scenario compiler 140 in the first embodiment) has a function of detecting an endless loop of HA events will be described with reference to FIG. 28.

Figure 28:
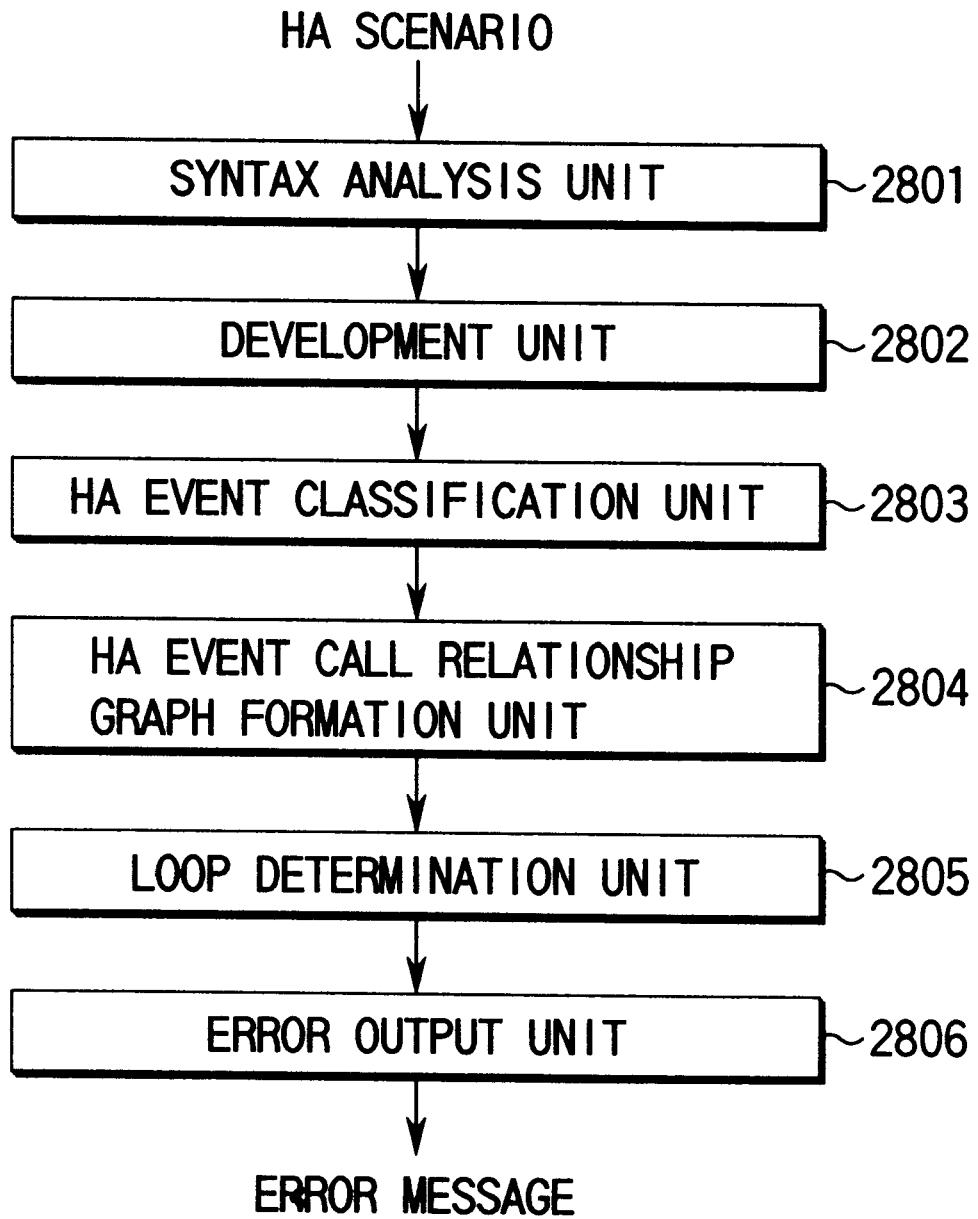
FIG. 28 is a block diagram of an HA scenario compiler having a function of detecting an endless loop of HA events that is applied in a multi-computer system according to the 10th embodiment of the present invention.

The HA scenario compiler shown in FIG. 28 comprises a syntax analysis unit 2801 which analyzes the syntax of an HA scenario (corresponding to the HA scenario 110 in the first embodiment), a development unit 2802 which develops the syntax into an internal structure (intermediate code in an internal form) upon reception of the results of the syntax analysis, an HA event classification unit 2803 which divides (classifies) HA events into HA events which asynchronously occur, and HA events which occur as pseudo HA events, an HA event call relationship graph formation unit 2804 which forms a pseudo HA event call relationship graph, a loop determination unit 2805 which determines the presence of a loop from the pseudo HA event call relationship graph, and an error output unit 2806 which outputs an error message on the basis of the determination results of the loop determination unit 2805. In FIG. 28, an optimization unit which optimizes the developed internal structure to generate a code string serving as a target HA script set, and the like are not shown.

Figure 29:
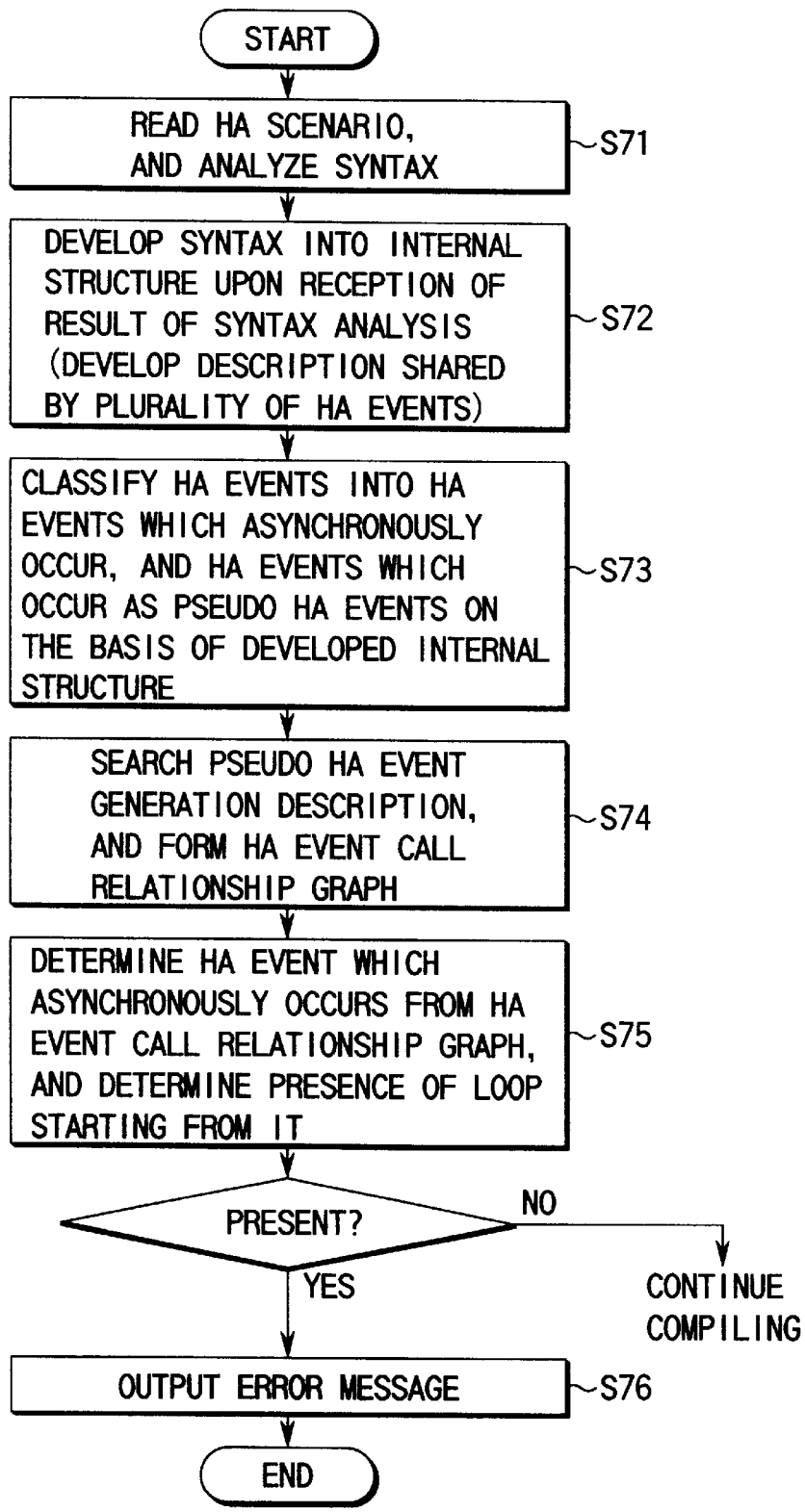
FIG. 29 is a flow chart for explaining the main operation of the HA scenario compiler having the arrangement in FIG. 28.

The operation of the HA scenario compiler having the arrangement in FIG. 28 will be described below with reference to a flow chart in FIG. 29.

The syntax analysis unit 2801 in the HA scenario compiler reads an HA scenario to analyze its syntax (step S71). The development unit 2802 develops the syntax into an internal structure upon reception of the results of the syntax analysis of the syntax analysis unit 2801 (step S72). With this process, e.g., a description shared by a plurality of HA events is developed into descriptions corresponding to a plurality of scripts.

The HA event classification unit 2803 classifies HA events into HA events that asynchronously occur due to occurrence of a fault and an operator input, and HA events that occur as pseudo HA events, on the basis of the internal structure developed by the development unit 2802 (step S73).

The HA event call relationship graph formation unit 2804 checks a pseudo HA event generation description on the basis of the classification results of the HA event classification unit 2803, thereby forming an HA event call relationship graph (step S74).

The loop determination unit 2805 searches the HA event call relationship graph by depth-first search for an HA event which asynchronously occurs, and determines the presence of a loop starting from this HA event (endless loop of pseudo HA events) (step S75).

When the presence of the loop is determined by the loop determination unit 2805, the error output unit 2806 outputs an error message to stop the operation of the HA scenario compiler (step S76).

In this embodiment, the meanings of description contents of an HA scenario can be confirmed using an HA event call relationship to detect the presence of an endless loop of pseudo HA events, preventing permanently stop failure of execution of a series of HA scripts due to the presence of the endless loop.

Miswriting of a device name in an HA scenario, miswriting of an option, and the like (erroneous description contents of the HA scenario) depend on the OS (Operating System) and the application involved, so they cannot be detected by a normal compiler technique.

11th Embodiment

The 11th embodiment in which miswriting of a device name in an HA scenario, miswriting of an option, and the like can be detected will be described with reference to FIG. 30.

Figure 30:
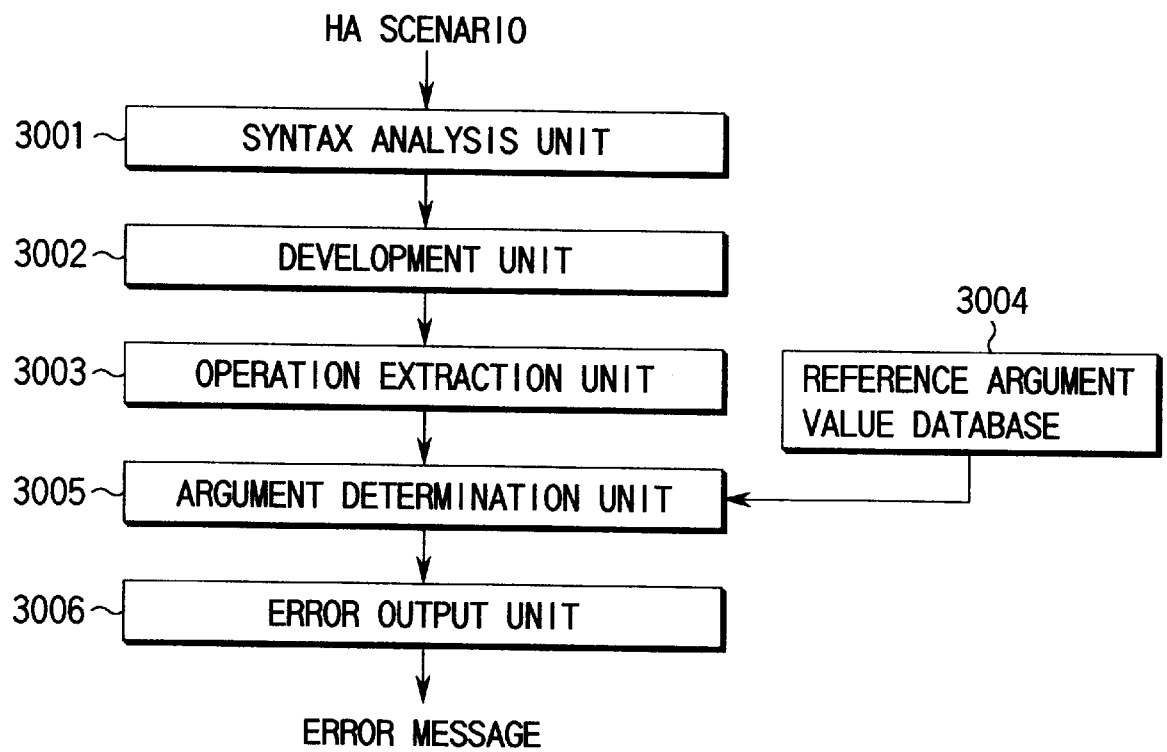
FIG. 30 is a block diagram of an HA scenario compiler having a function of detecting errors in the description contents of an HA scenario that is applied in a multi-computer system according to the 11th embodiment of the present invention.

An HA scenario compiler shown in FIG. 30 comprises a syntax analysis unit 3001 which analyzes the syntax of an HA scenario, a development unit 3002 which develops the syntax into an internal structure (intermediate code in an internal form) upon reception of the results of the syntax analysis, an operation extraction unit 3003 which extracts an operation in the process of each computer, a reference argument value database 3004 which stores, for each computer, the expected value of an argument used in an operation (e.g., an HA state table operation, a disk operation, a network operation, or an application operation) in the process of each computer, an argument determination unit 3005 which determines the integrity of an argument used in the extracted operation, and an error output unit 3006 which outputs an error message on the basis of the determination results of the argument determination unit 3005. In FIG. 30, an optimization unit which optimizes the developed internal structure to generate a code string serving as a target HA script set, and the like are not shown.

Figure 31:
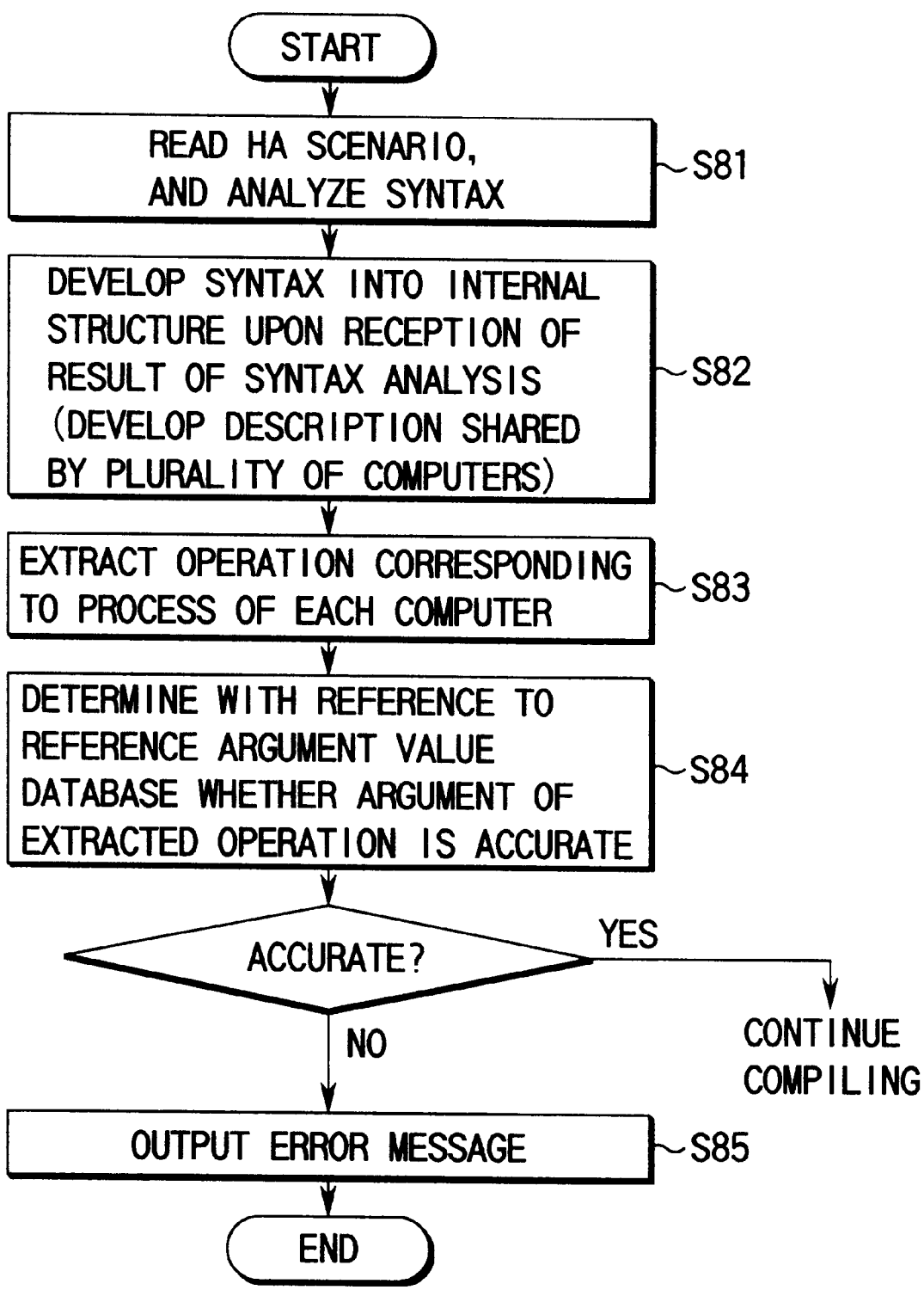
FIG. 31 is a flow chart for explaining the main operation of the HA scenario compiler having the arrangement in FIG. 30.

The operation of the HA scenario compiler having the arrangement in FIG. 30 will be described below with reference to a flow chart in FIG. 31.

The syntax analysis unit 3001 in the HA scenario compiler reads an HA scenario to analyze its syntax (step S81). The development unit 3002 develops the syntax into an internal structure upon reception of the results of the syntax analysis by the syntax analysis unit 3001 (step S82). With this process, e.g., a description shared by a plurality of computers is developed into descriptions corresponding to a plurality of scripts.

The operation extraction unit 3003 searches the internal structure developed by the development unit 3002 for a corresponding operation (e.g., an HA state table operation, a disk operation, a network operation, an application operation, or the like) with respect to the process of each computer, and extracts the operation (step S83).

With reference to the reference argument value database 3004, the argument determination unit 3005 determines whether the argument used in each operation extracted by the operation extraction unit 3003 with respect to the process of each computer is accurate (step S84).

When the argument determination unit 3005 determines the use of an inaccurate argument in an HA state table operation, a disk operation, a network operation, an application operation, or the like, the error output unit 3006 outputs an error message to stop the operation of the HA scenario compiler (step S85).

In this embodiment, the "accuracy" of the description contents of an HA scenario is confirmed for an argument used in an HA state table operation, a disk operation, a network operation, an application operation, or the like. Accordingly, inconveniences such as miswriting of a device name in the HA scenario, miswriting of an option, or the like can be detected without constructing an actual system in compiling the HA scenario.

12th Embodiment

The 12th embodiment in which the integrity of an HA scenario is detected using an HA state table will be described with reference to FIG. 32.

In execution, an HA script changes the process depending on only the contents of the HA state table. For this reason, if a portion related to the HA state table operation is extracted from an HA scenario, the integrity of the control strategy of the HA scenario can be detected from the viewpoint of the HA state table.

Figure 32:
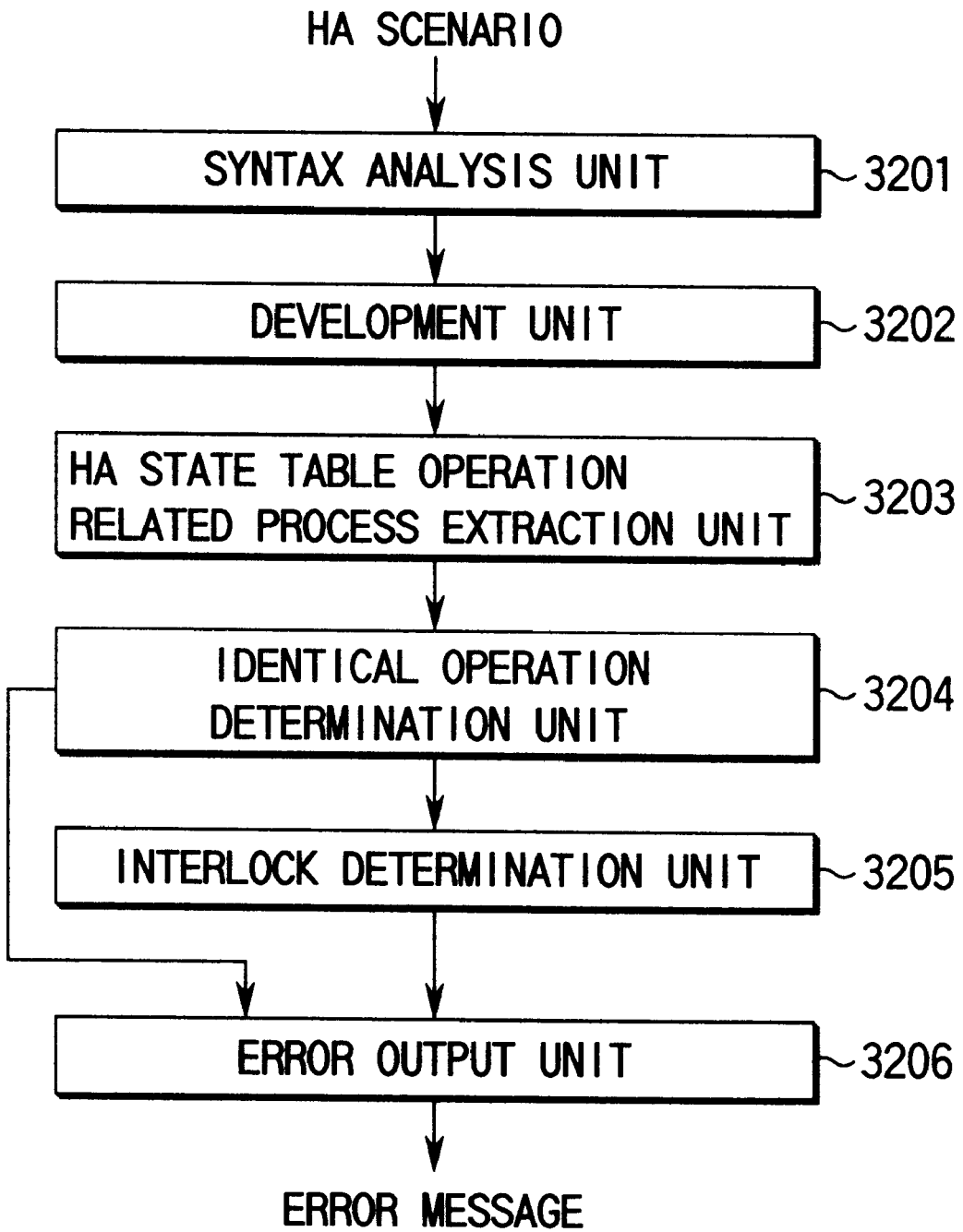
FIG. 32 is a block diagram of an HA scenario compiler having a function of checking the integrity of an HA scenario by using an HA state table that is applied in a multi-computer system according to the 12th embodiment of the present invention.

As shown in FIG. 32, an HA scenario compiler in this embodiment comprises a syntax analysis unit 3201 and a development unit 3202 (corresponding to the syntax analysis unit 3001 and the development unit 3002 in FIG. 30), and in addition an extraction unit (HA state table operation related process extraction unit) 3203 which extracts only a process related to the HA state table operation, an identical operation determination unit 3204 which determines whether the extracted HA state table operations of the respective computers are the same, an interlock determination unit 3205 which determines whether the extracted HA state table operation satisfies designated conditions (interlock), and an error output unit 3206 which outputs an error message on the basis of the determination results of the determination units 3204 and 3205. The HA scenario describes the interlock conditions (conditions which the HA state table should satisfy); no single application simultaneously operates in a plurality of computers, no computers having the same priority exist, and the like.

Figure 33:
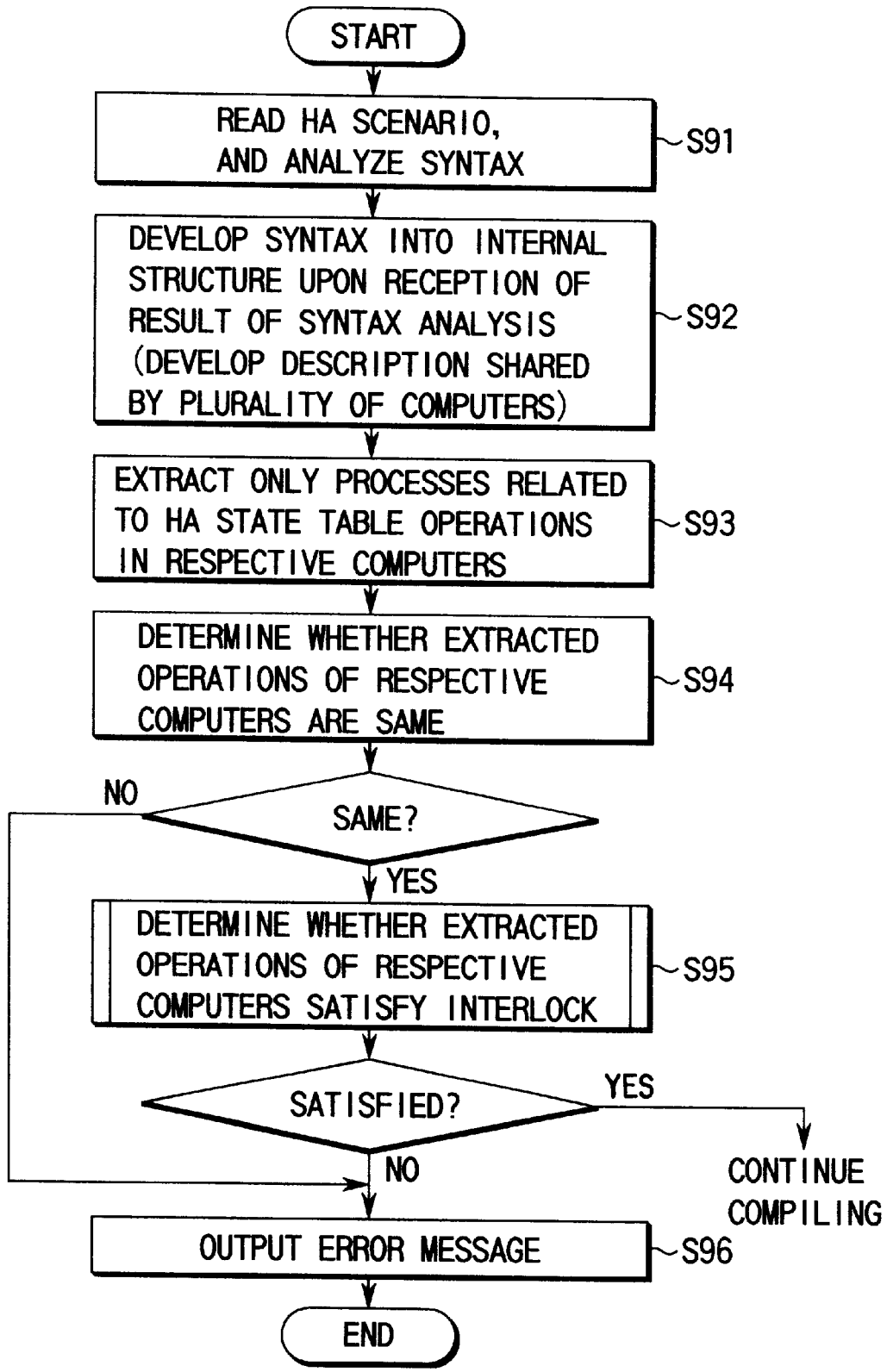
FIG. 33 is a flow chart for explaining the main operation of the HA scenario compiler having the arrangement in FIG. 32.
Figure 34:
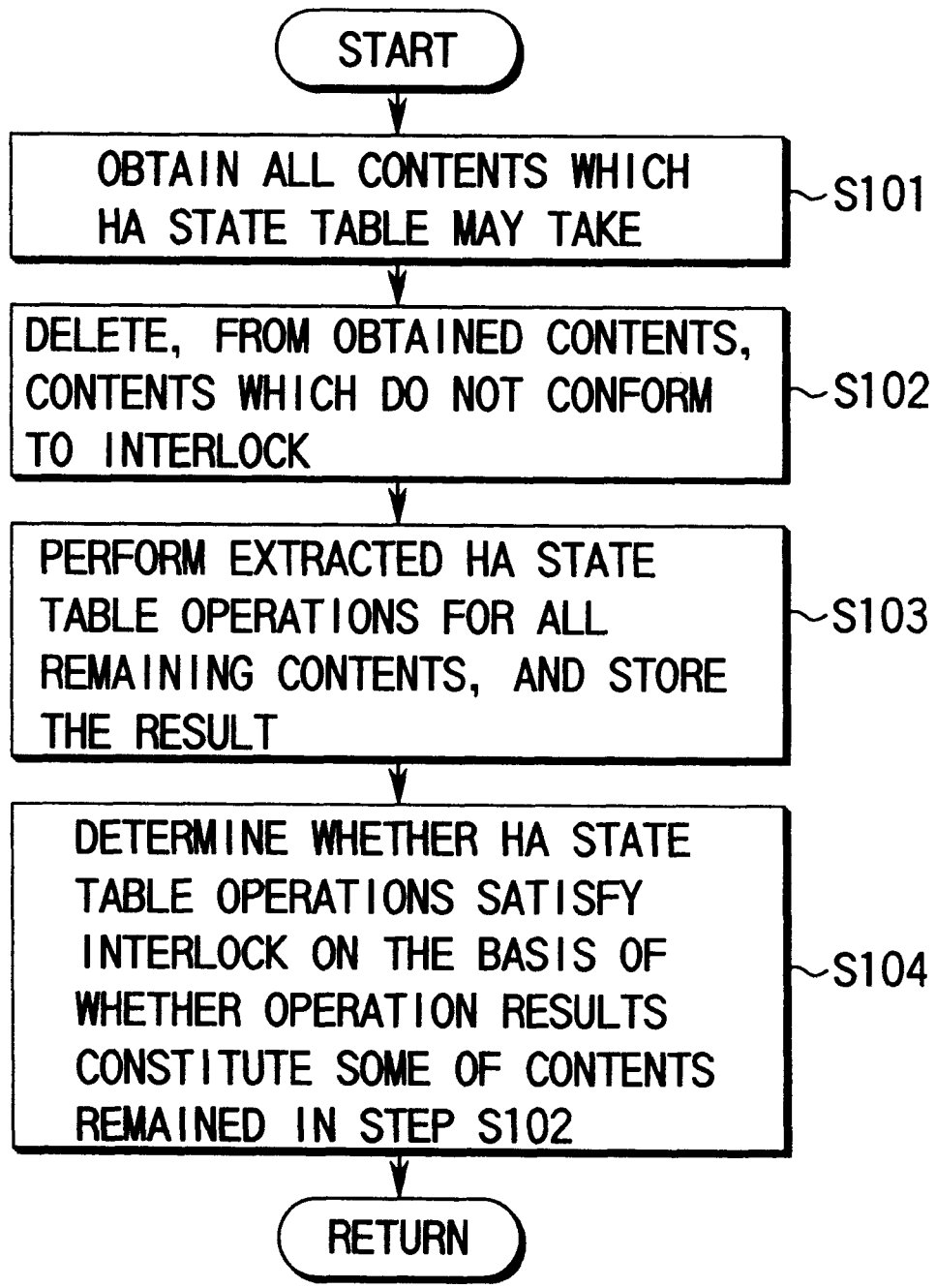
FIG. 34 is a flow chart showing the detailed procedure of a process in step S95 in FIG. 33.

The operation of the HA scenario compiler having the arrangement in FIG. 32 will be described with reference to flow charts in FIGS. 33 and 34.

The syntax analysis unit 3201 in the HA scenario compiler reads an HA scenario to analyze its syntax (step S91). The development unit 3202 develops the syntax into an internal structure upon reception of the results of the syntax analysis of the syntax analysis unit 3201 (step S92). With this process, e.g., a description shared by a plurality of computers is developed into descriptions corresponding to a plurality of scripts.

The HA state table operation related process extraction unit 3203 extracts all processes related to HA state table operations in the respective computers from the internal structure developed by the development unit 3202 (step S93).

The identical operation determination unit 3204 determines whether (the contents) of the extracted HA state table operations are the same in the respective computers (step S94).

If the extracted operations are the same in the respective computers, control is passed to the interlock determination unit 3205.

When the extracted HA state table operation is performed, the interlock determination unit 3205 determines whether the interlock is satisfied in the respective computers (step S95). Details of interlock determination in the interlock determination unit 3205 will be described with reference to a flow chart in FIG. 34.

The interlock determination unit 3205 obtains for each computer all contents which the HA state table may take, and forms a list of combinations (step S101). If each computer in a multi-computer system constituted by, e.g., four computers takes seven conditions: "execution in progress", "priority level 1", "priority level 2", "priority level 3", "priority level 4", "leave", and "fault detection", a list consisting of a total of 7×7×7×7=2,401 state combinations is formed.

The interlock determination unit 3205 deletes from the formed state combination list combinations which do not conform to the interlock (e.g., a combination in which a plurality of computers have the same priority) (step S102).

The interlock determination unit 3205 performs the HA state table operation extracted by the HA state table operation related process extraction unit 3203 (in step S93) for the state (in each computer) of each of the combinations left in the list, and stores the results (step S103).

The interlock determination unit 3205 checks whether the combinations of the respective states upon performing the HA state table operation constitute part of all the combinations left in the list. Only when this is the case, the interlock determination unit 3205 determines that the HA state table operations in the respective computers satisfy the interlock (step S104).

When the interlock determination unit 3205 determines that the HA state table operations in the respective computers do not satisfy the interlock, or when the identical operation determination unit 3204 determines that the HA state table operations in the respective computers are not the same, the interlock determination unit 3205 determines that the HA scenario is inaccurate. The error output unit 3206 outputs an error message to stop the operation of the HA scenario compiler (step S96).

In this embodiment, since whether the same HA state table operation is performed for the same HA event in all the computers is confirmed to ascertain the meanings of the description contents of an HA scenario, the HA state table can be guaranteed to be the same in the computers of the HA group. Although the interlock has conventionally been used frequently in the field of control, this embodiment is characterized by using this interlock in not execution but compiling to warrant high integrity of the HA scenario.

When an operation with respect to a shared device is included in an HA scenario, the consistency of operations performed by a plurality of computers must be checked, which cannot be dealt with by a conventional compiler technique.

13th Embodiment

The 13th embodiment in which inconsistency of operations with respect to a shared device is detected will be described with reference to FIG. 35.

Figure 35:
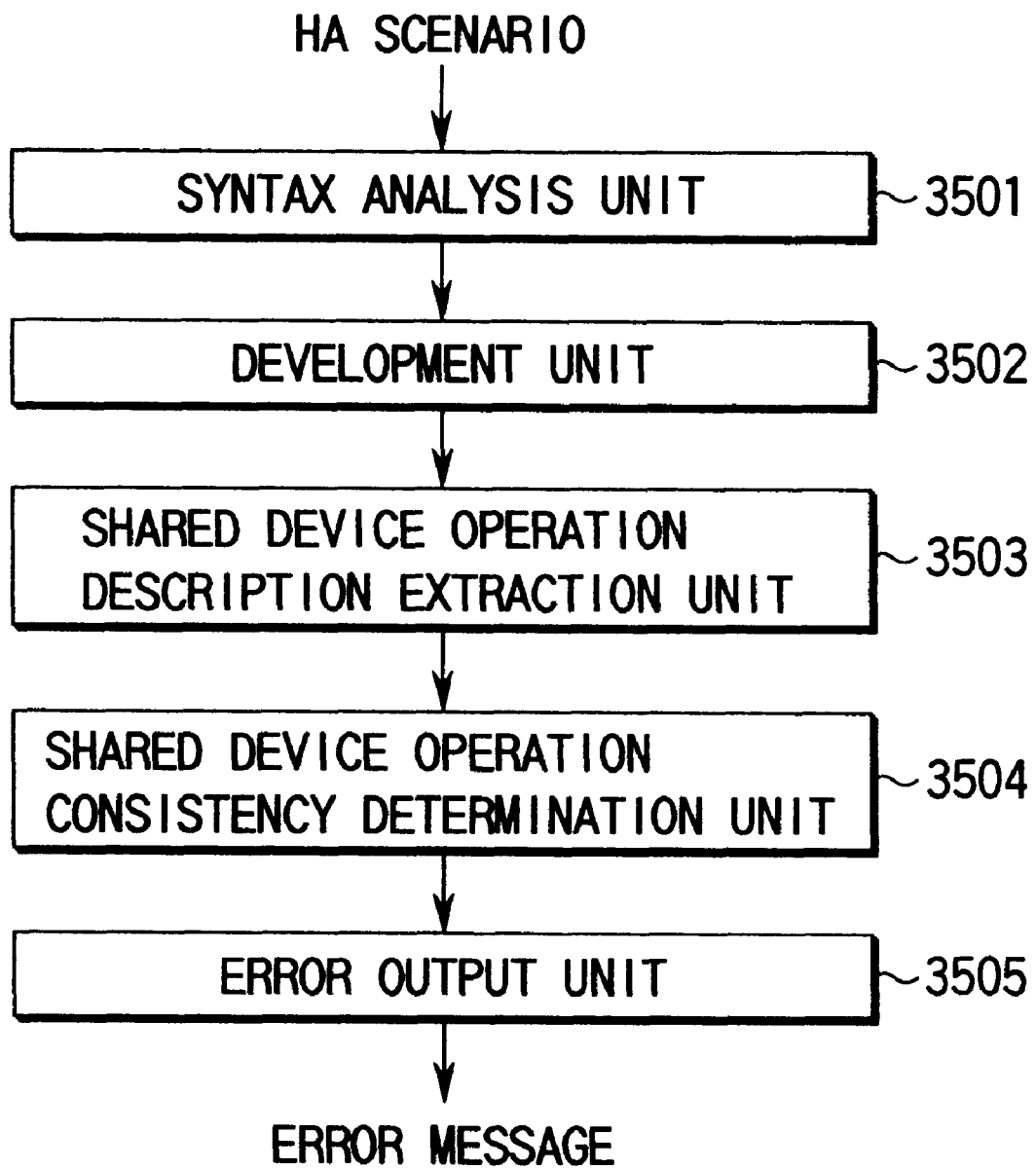
FIG. 35 is a block diagram of an HA scenario compiler having a function of detecting operation inconsistency with respect to a shared device that is applied in a multi-computer system according to the 13th embodiment of the present invention.

As shown in FIG. 35, an HA scenario compiler in this embodiment comprises a syntax analysis unit 3501 and a development unit 3502 (corresponding to the syntax analysis unit 3001 and the development unit 3002 in FIG. 30), and in addition a shared device operation description extraction unit 3503 which extracts a shared device operation description, a shared device operation consistency determination unit 3504 which determines operation consistency for a pair of extracted shared device descriptions, and an error output unit 3505 which outputs an error message on the basis of the determination results of the determination unit 3504.

In the arrangement of FIG. 35, the shared device operation description extraction unit 3503 searches an internal structure obtained from an HA scenario by the syntax analysis unit 3501 and the development unit 3502 to extract all the operation descriptions of a shared device (e.g, a shared disk). Most of the shared device operation descriptions are conditional in accordance with the contents of the HA state table. Therefore, the operation description cannot be determined from only whether the description exists, and whether conditions are simultaneously satisfied in different computers must be determined.

The shared device operation consistency determination unit 3504 therefore compares conditions between different computers exploiting the fact that the contents of all the HA state table are the same in the respective computers. Particularly when the interlock (conditions which the HA state table should satisfy) as explained in the 12th embodiment is described in the HA scenario, it is also used to compare the conditions. More specifically, the shared device operation consistency determination unit 3504 searches shared device operation descriptions extracted by the shared device operation description extraction unit 3503 for all pairs of conditional shared device operation descriptions which may be simultaneously satisfied, i.e., all pairs of shared device operation descriptions which may be simultaneously executed, and determines operation consistency of the pairs.

When it is detected that a plurality of computers set the same address in a network (inconsistency of network addresses), or that a plurality of computers simultaneously access a shared device, and thus the shared device operation consistency determination unit 3504 determines no consistency (inconsistency), the error output unit 3505 outputs an error message to stop the operation of the HA scenario compiler.

In this embodiment, generation of inconsistency of operations can be prevented by confirming the meanings of the description contents of an HA scenario for the operation of a shared device.

FIG. 36 shows an example of the shared device operation description.

In FIG. 36, a description 3601 "get s=state (event.cpu)" is an HA state table reference command instructing to get as a variable s the state in an self-node HA state table of a computer ("event.cpu") having a fault detected.

A description 3602 starting from "if (s=="execution in progress")" describes a process which each computer ("localcpu") should perform when the state of the HA state table represented by the variable s, i.e., the state of the HA state table of the faulty computer ("event.cpu") is "execution in progress".

Since the contents of the HA state table are the same in all computers, the condition indicated by "if (s=="execution in progress")" must be simultaneously satisfied for all the computers, which is used for consistency determination.

The description 3602 includes a description 3603 instructing take-over in which, if a variable (var) t that represents the state in the self-node HA state table is "priority level 1", a function "mktkdisk" is called to forcibly ("-f") connect, to the self node (computer having "priority level 1"), a shared disk (shared device; identified by "vg1") connected to the faulty computer ("event.cpu").

Owing to the interlock in which only one computer has "priority level 1", the condition that the variable t has "priority level 1" must not be simultaneously satisfied for two or more computers, which is used for consistency determination.

The 10th through 13th embodiments in which the HA scenario compiler has various determination functions for guaranteeing the integrity of an HA scenario have been described above. In these embodiments, an analysis may fail for an HA event, an argument, an assignment statement, a conditional statement, and the like which are described using variables.

14th Embodiment

The 14th embodiment in which the determination function applied in the 10th through 13th embodiments effectively functions for an HA event, an argument, an assignment statement, a conditional statement, and the like which are described using variables will be described with reference to FIG. 37.

In the 14th embodiment, as shown in FIG. 37, a first variable-constant replacement unit 3701, a second variable-constant replacement unit 3702, and a constant propagating unit 3703 are added to the development unit (2802, 3002, 3202, 3502) of the HA scenario compiler in the 10th through 13th embodiments.

In internally developing a description shared by computers, the first variable-constant replacement unit 3701 replaces a special variable indicating an self node with a constant. If the process of the first variable-constant replacement unit 3701 is applied to, e.g., the service description 113 (see FIG. 6) in an HA scenario describing a shared process for a leave HA event in the first embodiment, the special variable indicating the self node "localcpu" can be replaced with any one of "cpu1" through "cpu4", and these variables can be further replaced with actual computer names (constants) "A" through "D".

In internally developing a description shared by HA events, the second variable-constant replacement unit 3702 replaces a special variable indicating an HA event portion with a constant. If the process of the second variable-constant replacement unit 3702 is applied to the service description 113 in the HA scenario describing a shared process for a leave HA event shown in FIG. 6, similar to the first variable-constant replacement unit 3701, the special variable indicating the HA event portion "event.cpu" can be replaced with any one of "cpu1" through "cpu4", and these variables can be further replaced with the actual computer names (constants) "A" through "D".

The constant propagating unit 3703 propagates a constant substituted for a variable in service and system descriptions. If the process of the constant propagating unit 3703 is applied to, e.g., an HA scenario shown in FIG. 8 which has a description shared by the respective services in the second embodiment, and a constant is internally propagated, all variables "master" and "slave" referred to at the portions 804-1 through 804-3 of the service descriptions 801 through 803 (portions (1), (2), and (3) in FIG. 8) can be replaced with any of "cpu1" through "cpu4", and these variables can be further replaced with the actual computer names (constants) "A" through "D".

As described above, since a description shared by computers, and a description shared by HA events are internally developed, variables are replaced with constants, and constants are propagated to variables substituted in the service and system descriptions, the mechanism of determining the integrity of an HA scenario description that is applied in the 10th through 13th embodiments can effectively function even for a description using a variable.

Constant propagation is a technique applied in a conventional compiler, and is used as one of optimization methods for high-speed operations. To the contrary, the 14th embodiment employs constant propagation to increase the precision of error analysis (determination of the integrity of an HA scenario) in the HA scenario compiler, so the application method and effect of the constant propagation technique are different from those of the conventional one.

To increase the precision of error analysis in the HA scenario compiler, a loop variable-constant replacement unit (not shown) for internally developing a description written by a loop statement, and replacing a loop variable with a constant can be added to the HA scenario compiler.

FIG. 38 shows an example of a description written by a loop statement. This description is an HA scenario description used when a start request for all applications is generated as a pseudo HA event, as in the seventh embodiment. In this description, s represents a loop variable indicating each of all services (applications), and "event.cpu" represents a computer to be joined. A description like the one in FIG. 38 is convenient because it remains the same even if a service is added. In this state, however, the integrity of the HA scenario description is difficult to determine.

If the loop variable-constant replacement unit is arranged in, e.g., (the development unit 2802 of) the HA scenario compiler applied in the 10th embodiment, a description written by a loop statement is internally developed, and loop variables are replaced with constants (service names in this case), the detection precision of an endless loop of HA events (as the error analysis precision of an HA scenario) can be increased.

Further, it is also possible to use an operation simulation mechanism for testing an operation upon occurrence of various faults in accordance with the description contents of an HA scenario in the HA scenario compiler, and to, before distributing each HA script (event process script) obtained by compiling the HA scenario, make the operation simulation mechanism interpret and simulate the contents described in the HA scenario to check whether a state appearing at this time (contents of an HA state table), or a process has any contradiction.

In this case, the operation simulation mechanism starts from an initial state, arbitrarily combines events (faults or user operations) which may asynchronously occur, and interprets each HA script. At this time, contradiction is checked; whether the respective computers (in an HA group) hold the same contents of the HA state tables, whether two or more computers do not simultaneously use a shared device, and whether two or more computers do not simultaneously execute a single service (application).

The above simulation can be executed on the HA scenario compiler without constructing an actual system.

In addition to the above operation simulation mechanism, the HA scenario compiler may comprise the mechanism of determining the integrity of an HA scenario (mechanism of confirming the accuracy of the description contents of the HA scenario) that is applied in the 11th embodiment, and the mechanism of determining the integrity of the HA scenario (mechanism of confirming the meanings of the description contents of the HA scenario) that is applied in the 10th, 12th, and 13th embodiments.

Although the first embodiment has exemplified the case wherein a product in the HA scenario compiler is an HA script (set) for an HA event process, the product is not limited to this.

15th Embodiment

The 15th embodiment in which various scripts used for an HA event process and other purposes, and products other than the script are generated by an HA scenario compiler will be described with reference to FIG. 39.

Figure 39:
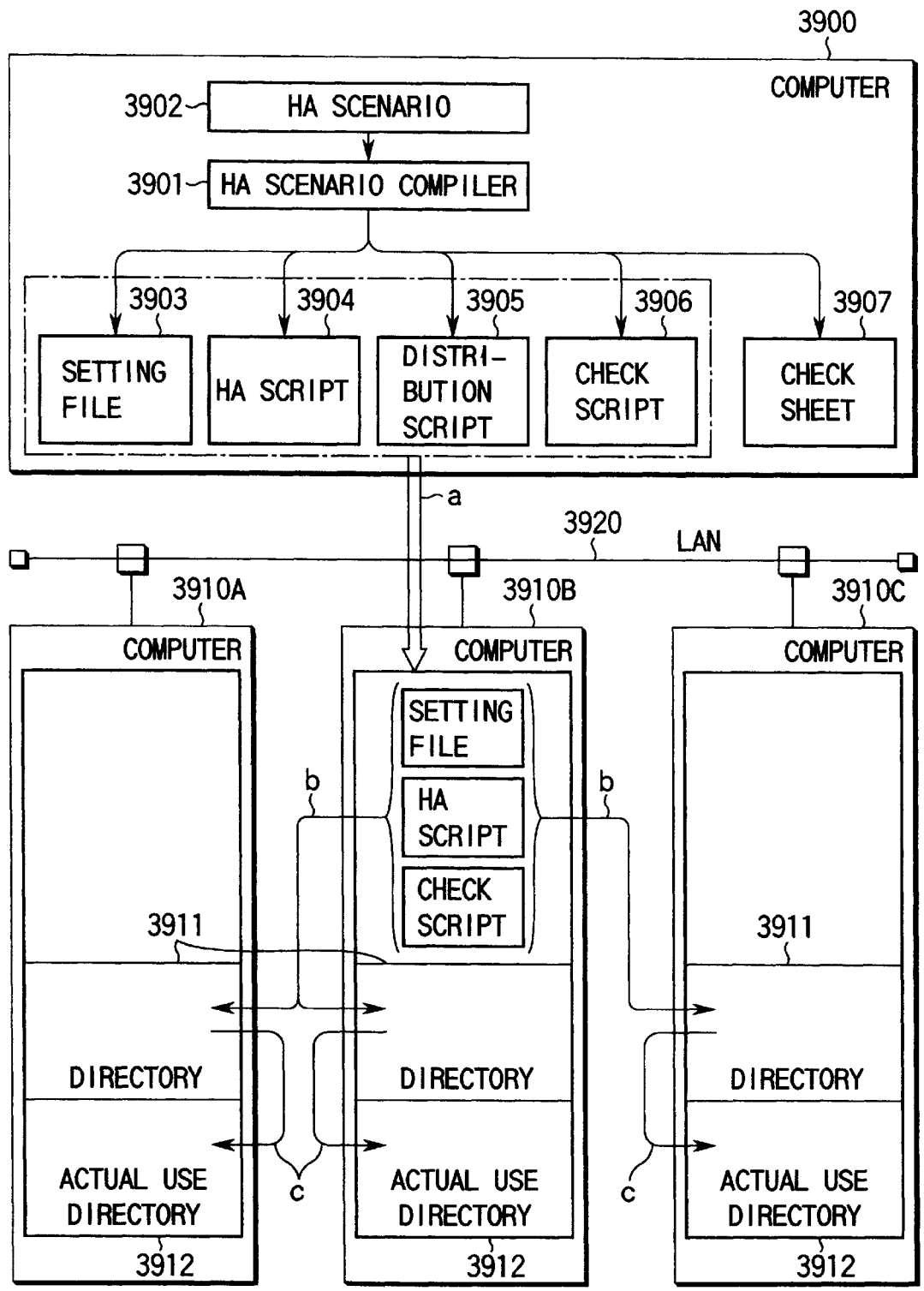
FIG. 39 is a block diagram of a multi-computer system according to the 15th embodiment of the present invention.

In FIG. 39, a computer 3900 provides a program development environment. Assume that the computer 3900 does not constitute an actual system, unlike the computer 100A in FIG. 1 in the first embodiment.

An HA scenario compiler 3901 in the computer 3900 reads an HA scenario 3902 to generate the respective products, i.e., a setting file 3903 which defines the system configuration of a target multi-computer system (in this case, a multi-computer system constituted by three computers 3910A through 3910C), an HA script 3904 (set) for an HA event process, a distribution script 3905 for distributing the setting file 3903, the HA script 3904 (set), and a check script 3906 (to be described next) to the respective computers (3910A through 3910C) indicated by computer names (server names) described in the HA scenario 3902, the check script 3906 for determining whether a new scenario is applied online, and a check sheet 3907. The check sheet 3907 is a list of check items for allowing the user to check whether the system is actually constituted as described in the HA scenario compiler, and is printed out (displayed) from the computer 3900. The setting file 3903 and the HA script 3904 are generated for each computer constituting the multi-computer system.

Of the products generated by the HA scenario compiler 3901 on the computer 3900, the setting file 3903, the HA script 3904, the distribution script 3905, and the check script 3906 are stored in a large-capacity storage medium such as a magnetic tape, then moved to one (in this case, the computer 3910B) of the three computers 3910A through 3910C constituting the multi-computer system (actual system), and stored in a large-capacity storage device of the same type (magnetic tape in this case) of the computer (3910B), as indicated by reference symbol a in FIG. 39. Since the computers 3910A through 3910C are connected to a LAN 3920, if the computer 3900 is also connected to the LAN 3920, each product may be transferred to the large-capacity storage device of the computer 3910B (any one of the computers 3910A through 3910C) via the LAN 3920. When the computer 3900 is the computer 3910B (any one of the computers 3910A through 3910C), the above-described product movement is unnecessary.

The computer 3910B executes, of the respective products generated by the HA scenario compiler 3901, the distribution script 3905, and delivers and copies the remaining products, i.e., the setting file 3903, the HA script 3904 set, and the check script 3906 in directories 3911, as one type of buffer, of the computers 3910A through 3910C (with server names constituting the multi-computer system described in the HA scenario 3902), as indicated by reference symbol b in FIG. 39. Since the distribution script 3905 itself is a product obtained by compiling the HA scenario 3902, the distribution destinations of the setting file 3903, the HA script 3904 set, and the check script 3906 as remaining products can be correctly set to prevent the setting file 3903, the HA script 3904 (set), and the check script 3906 from being distributed to erroneous distribution destinations. The computers 3910A through 3910C receive only the setting files 3903 and (set of) HA scripts 3904 for the computers 3910A through 3910C. The computer 3910B delivers the products to the computers 3910A and 3910C via the LAN 3920.

Each of the computers 3910A through 3910C copies, of the products delivered to the self-node directory 3911, the setting file 3903 and the HA script 3904 in an self-node actual use directory (execution directory) 3912 in order to actually use them.

Each of the computers 3910A through 3910C executes the check script (3906) present in the self-node directory 3911 to compare the file (3903) and HA script (3904) present on the directory 3911 with the setting file (3903) and HA script (3904) (copied from the directory 3911) present in the self-node actual use directory 3912, as indicated by reference symbol c in FIG. 39.

When the setting file (3903) (in the self-node actual use directory 3912) of the self node is different (from that in the directory 3911), each of the computers 3910A through 3910C outputs (e.g., displays) a message indicating that software constituting the multi-computer system must be restarted (after the system is temporarily stopped).

When the HA script (3904) (in the actual use directory 3912) of the self node is different (from that in the directory 3911), each of the computers 3910A through 3910C generates an HA script update event, and outputs (e.g., displays) a message representing that a corresponding HA script must be updated. When the setting file (3903) and the HA script (3904) are not different from those in the directory 3911, the setting file (3903) and the HA script (3904) in the actual use directory 3912 (corresponding to the new HA scenario 3902) are determined to be usable online.

Additional advantages and modifications will readily occur to those skilled in the art. Therefore, the invention in its broader aspects is not limited to the specific details and representative embodiments shown and described herein. Accordingly, various modifications may be made without departing from the spirit of scope of the general inventive concept as defined by the appended claims and their equivalents.

We claim:

1. A multi-computer system including a plurality of computers, said system comprising:
   a description of
      a configuration of said multi-computer system and
      a plurality of system operations for a plurality of events which occur in said plurality of computers, wherein system setting values of said multi-computer system include
      a closed variable and
      a scenario describing a process shared by a group of said plurality of computers, said scenario including
         a computer description which includes information unique to a particular one of said group of said plurality of computers,
         a system description which includes a description of an action of said system for each one of said plurality of events, and
         a service description which includes a description of an action of an application for said each one of said plurality of events;
   scenario compiling means
      for decomposing aid scenario into at least one separate process for respective ones of said plurality of computers, and for generating from said scenario, a plurality of separate process scripts serving as command strings in a form directly executable by said respective ones of said plurality of computers; and script execution means, arranged in each one of said group of said plurality of computers, for executing an applicable one of said plurality of separate process scripts corresponding to a computer state.

2. A multi-computer system including a plurality of computers, said system comprising:

a description of
a configuration of said multi-computer system and
a plurality of system operations for a plurality of events which occur in said plurality of computers, wherein system setting values of said multi-computer system include
a closed variable and
a scenario describing a process shared by a group of said plurality of computers, said scenario including
a computer description which includes information unique to a particular one of said group of said plurality of computers,
a system description which includes a description of an action of said system for each one of said plurality of events, and
a service description which includes a description of an action of an application for said each one of said plurality of events;

scenario compiling means
for decomposing said scenario into at least one separate process for respective ones of said plurality of computers, and
for generating, from said scenario, a plurality of separate process scripts serving as command strings in a form directly executable by said respective ones of said plurality of computers;

script distribution means for distributing said plurality of separate process scripts to memory areas of corresponding ones of said respective ones of said plurality of computers; and script execution means, arranged in each one of said group of said plurality of computers, for executing one of said plurality of separate process scripts corresponding to a computer state.

3. A multi-computer system including a plurality of computers, said system comprising:

a description
a configuration of said multi-computer system and
a plurality of system operations for a plurality of events which occur in said plurality of computers, wherein system setting values of said multi-computer system include
a closed variable and
a scenerio describing a process shared by a group of said plurality of computers, said scenario including
a computer description which includes information unique to a particular one of said group of said plurality of computers,
a system description which includes a description of an action of said system for each one of said plurality of events, and
a service description which includes a description of an action of an application for said each one of said plurality of events;

scenario compiling means
for decomposing said scenario into at least one separate process for respective ones of said plurality of computers, and
for generating, from said scenario, a plurality of seperate process scripts serving as command strings in a form directly executable by said respective ones of said plurality of computers; and script execution means, arranged in each one of said group of said plurality of computers, for executing an applicable one of said plurality of separate process scripts corresponding to one of said plurality of events, when said one of said plurality of events occurs.

4. A multi-computer system including a plurality of computers, said system comprising:

a description of
a configuration of said multi-computer system and
a plurality of system operations for a plurality of events which occur in said plurality of computers, wherein system setting values of said multi-computer system include
a closed variable and
a scenario describing a process shared by a group of said plurality of computers, said scenario including
a computer description which includes information unique to a particular one of said group of said plurality of computers,
a system description which includes a description of an action of said system for each one of said plurality of events, and
a service description which includes a description of an action of an application for said each one of said plurality of events;

scenario compiling means
for decomposing said scenario into at least one separate process for said respective ones of said plurality of computers, and
for generating, from said scenario, a plurality of separate process scripts serving as command strings in a form directly executable by respective ones of said pluralty of computers;

script distribution means for distributing said plurality of separate process scripts to memory areas of corresponding ones of said respective ones of said plurality of computers; and script execution means, arranged in each one of said group of said plurality of computers, for executing one of said plurality of separate process scripts corresponding to one of said plurality of events, when said one of said plurality of events occurs.

5. A multi-computer system including a plurality of computers, comprising:

input means for inputting a description of
a configuration of said multi-computer system and
a plurality of system operations for a plurality of events which occur in said plurality of computers, wherein system setting values of said multi-computer system include
a closed variable and
a scenario describing a process shared by a group of said plurality of computers, said scenario including
a computer description which includes information unique to a particular one of said group of said plurality of computers,
a system description which includes a description of an action of said system for each one of said plurality of events, and a service description which includes a description of an action of an application for said each one of said plurality of events;

scenario compiling means for decomposing said scenario into at least one separate process for respective ones of said group of said plurality of computers, and for generating, from said scenario, a plurality of separate process scripts serving as command strings in a form directly executable by said respective ones of said group of said plurality of computers;

script distribution means for distributing said plurality of separate process scripts to corresponding respective ones of said group of said plurality of computers; and script execution means, arranged in each one of said group of said plurality of computers, for executing an applicable one of said plurality of separate process scripts corresponding to one of said plurality of events, when said one of said plurality of events occurs, said script execution means including a synchronous control unit for managing synchronous control for controlling said each one of said group of said plurality of computers in performing an event process in cooperation with each other one of said group of said plurality of computers.

6. A process script generation apparatus for generating process scripts executed by a plurality of computers which constitute a multi-computer system, comprising:

input means for inputting a description of
a configuration of said multi-computer system and
a plurality of system operations for a plurality of events which occur in said plurality of computers, wherein system setting values of said multi-computer system include
a closed variable and
a scenario describing a process shared by a group of said plurality of computers, said scenario including
a computer description which includes information unique to a particular one of said group of said plurality of computers, a system description which includes a description of an action of said system for each one of said plurality of events, and
a service description which includes a description of an action of an application for said each one of said plurality of events; and scenario compiling means for decomposing said scenario into at least one separate process for respective ones of said group of said plurality of computers, and for generating, from said scenario, a plurality of separate process scripts serving as command strings in a form directly executable by said respective ones of said group of said plurality of computers.

7. A process script generation and distribution apparatus for generating process scripts executed by a plurality of computers which constitute a multi-computer system, and distributing the process scripts to corresponding one of said plurality of computers, said apparatus comprising:

input means for inputting a description of
a configuration of said multi-computer system and a plurality of system operations for a plurality of events which occur in said plurality of computers, wherein
system setting values of said multi-computer system include
a closed variable and
a scenario describing a process shared by a group of said plurality of computers, said scenario including
a computer description which includes information unique to a particular one of said group of said plurality of computers,
a system description which includes a description of an action of said system for each one of said plurality of events, and
a service description which includes a description of an action of an application for said each one of said plurality of events;

scenario compiling means for decomposing the scenario into at least one separate process for respective ones of said group of said plurality of computers, and for generating, from said scenario, a plurality of process scripts serving as command strings in a form directly executable by said respective ones of said group of said plurality of computers; and script distribution means for distributing said plurality of separate process scripts to corresponding respective ones of said group of said plurality of computers.

8. A control method in a multi-computer system constituted by a plurality of computers, said method comprising the steps of:

describing a configuration of said multi-computer system and a plurality of system operations for a plurality of events which occur in said plurality of computers, wherein
system setting values of said multi-computer system include
a closed variable and
a scenario describing a process shared by a group of said plurality of computers, said scenario including
a computer description which includes information unique to a particular one of said group of said plurality of computers,
a system description which includes a description of an action of said system for each one of said plurality of events, and
a service description which includes a description of an action of an application for said each one of said plurality of events;

decomposing said scenario into at least one separate process for respective ones of said group of said plurality of computers;

generating, from said scenario, a plurality of separate process scripts serving as command strings in a form directly executable by said respective ones of said group of said plurality of computers;

distributing said plurality of separate process scripts to corresponding respective ones of said group of said plurality of computers; and executing an applicable one of said plurality of separate process script corresponding to one of said plurality of events, when said one of said plurality of events occurs.

9. An article of manufacture comprising:
a computer usable medium having computer readable program code means embodied therein for causing a multi-computer system constituted by a plurality of first computers to be controlled, the computer readable program code means in said article of manufacture comprising:
computer readable program code means for causing a second computer to generate a description of a configuration of said multi-computer system and a plurality of system operations for a plurality of events which occur in said plurality of first computers, wherein a plurality of system setting values of said multi-computer system include a closed variable and a scenario describing a process shared by a group of said plurality of first computers, said scenario including
- a computer description which includes information unique to a particular one of said group of said plurality of computers,
- a system description which includes a description of an action of said system for each one of said plurality of events,
- a service description which includes a description of an action of an application for said each one of said plurality of events;

computer readable program code means for causing a second computer to decompose said scenario into at least one separate process for respective ones of said group of said plurality of computers, and for generating, from said scenario, a plurality of separate process scripts serving as command strings in a form directly executable by said respective ones of said group of said plurality of computers;

computer readable program code means for causing a third computer to distribute said plurality of separate process scripts to corresponding respective ones of said group of said plurality of computers; and computer readable program code means for causing a fourth computer to execute an applicable one of said plurality of separate process scripts corresponding to one of said plurality of events, when said one of said plurality of events occurs.

* * * * *